US010296853B2

(12) United States Patent
Block et al.

(10) Patent No.: US 10,296,853 B2
(45) Date of Patent: *May 21, 2019

(54) AUTOMATED INTERNET BASED INTERACTIVE TRAVEL PLANNING AND MANAGEMENT SYSTEM

(71) Applicant: AIRPORT AMERICA, Miami, FL (US)

(72) Inventors: David Block, Key Biscayne, FL (US); Jaro Volny, Key Biscayne, FL (US); Sharyn A. Brotz, Key Biscayne, FL (US); Scott Allen Mueller, Key Biscayne, FL (US)

(73) Assignee: AIRPORTAMERICA, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,213

(22) Filed: Mar. 12, 2018

(65) Prior Publication Data

US 2018/0260743 A1 Sep. 13, 2018

Related U.S. Application Data

(60) Continuation of application No. 12/572,778, filed on Oct. 2, 2009, now Pat. No. 9,916,543, which is a division of application No. 10/210,182, filed on Aug. 2, 2002, now Pat. No. 7,599,847, which is a (Continued)

(51) Int. Cl.

| | |
|---|---|
| ***G06Q 10/00*** | (2012.01) |
| ***G06Q 10/02*** | (2012.01) |
| ***G06Q 20/20*** | (2012.01) |

(52) U.S. Cl.

CPC .......... *G06Q 10/02* (2013.01); *G06Q 20/206* (2013.01)

(58) Field of Classification Search

CPC .... G06Q 10/02; G06Q 50/30; G06Q 20/3274; G06Q 20/3276; G06Q 20/3278; G06Q 20/40; G07B 15/00; G07B 15/063; G07F 17/0014; H04L 67/10

See application file for complete search history.

(56) References Cited

U.S. PATENT DOCUMENTS

| | | | |
|---|---|---|---|
| 3,622,995 | A | 11/1971 | Dilks et al. |
| 4,375,097 | A | 2/1983 | Ulug |
| 4,862,357 | A | 8/1989 | Ahlstrom et al. |

(Continued)

OTHER PUBLICATIONS

"Robert Axline of Plastic Card Systems Calls for Improved Secure ID at Airports—Plastic Card Systems Helps Secure Airports From LAX to Boston's Logan", PR Newswire, pp. 1, Mar. 23, 2000.

*Primary Examiner* — George Chen
(74) *Attorney, Agent, or Firm* — Oliff PLC

(57) ABSTRACT

An interactive rapid response Internet accessed air travel management system. The system includes a web-based planning and reservation interface system and an interactive access device. The system responds to details of a member's desired travel, to thereafter act in real time to contact the domains of associated travel service providers to arrange for every aspect of the member's trip, from airline and hotel reservations, ticket issuance, and ground transportation, to restaurant and theater reservations, and any other travel related needs of the member. The system stores identification information to verify access device possession to prohibit unauthorized use of the system and to provide security pre-clearance to system members.

10 Claims, 37 Drawing Sheets

Related U.S. Application Data continuation-in-part of application No. 09/875,454, filed on Jun. 6, 2001, now abandoned.

(60) Provisional application No. 60/210,498, filed on Jun. 9, 2000.

(56) References Cited

U.S. PATENT DOCUMENTS

| | | | |
|---|---|---|---|
| 5,021,953 | A | 6/1991 | Webber et al. |
| 5,195,130 | A | 3/1993 | Weiss et al. |
| 5,225,990 | A | 7/1993 | Bunce et al. |
| 5,237,499 | A | 8/1993 | Garback |
| 5,331,546 | A | 7/1994 | Webber et al. |
| 5,401,944 | A | 3/1995 | Bravman et al. |
| 5,432,508 | A | 7/1995 | Jackson |
| 5,521,966 | A | 5/1996 | Friedes et al. |
| 5,570,283 | A | 10/1996 | Shoolery et al. |
| 5,598,477 | A | 1/1997 | Berson |
| 5,623,552 | A | 4/1997 | Lane |
| 5,724,520 | A | 3/1998 | Goheen |
| 5,732,398 | A | 3/1998 | Tagawa |
| 5,764,981 | A | 6/1998 | Brice et al. |
| 5,781,892 | A | 7/1998 | Hunt et al. |
| 5,793,639 | A | 8/1998 | Yamazaki |
| 5,832,453 | A | 11/1998 | O'Brien |
| 5,832,454 | A | 11/1998 | Jafri et al. |
| 5,832,541 | A | 11/1998 | Rock |
| 5,864,818 | A | 1/1999 | Feldman |
| 5,866,888 | A | 2/1999 | Bravman et al. |
| 5,884,271 | A | 3/1999 | Pitroda |
| 5,897,620 | A | 4/1999 | Walker et al. |
| 5,906,946 | A | 5/1999 | Sausa et al. |
| 5,912,981 | A | 6/1999 | Hansmire et al. |
| 5,914,671 | A | 6/1999 | Tuttle |
| 5,920,053 | A | 7/1999 | DeBrouse |
| 5,926,798 | A | 7/1999 | Carter |
| 5,948,040 | A | 9/1999 | DeLorme et al. |
| 5,953,705 | A | 9/1999 | Oneda |
| 5,953,706 | A | 9/1999 | Patel |
| 6,002,605 | A | 12/1999 | Iwasaki et al. |
| 6,003,009 | A | 12/1999 | Nishimura |
| 6,018,715 | A | 1/2000 | Lynch et al. |
| 6,023,679 | A | 2/2000 | Acebo et al. |
| 6,038,551 | A | 3/2000 | Barlow et al. |
| 6,044,353 | A | 3/2000 | Pugliese, III |
| 6,085,976 | A | 7/2000 | Sehr |
| 6,089,611 | A | 7/2000 | Blank |
| 6,094,640 | A | 7/2000 | Goheen |
| 6,101,241 | A | 8/2000 | Boyce et al. |
| 6,101,477 | A | 8/2000 | Hohle et al. |
| 6,105,010 | A | 8/2000 | Musgrave |
| 6,108,636 | A | 8/2000 | Yap et al. |
| 6,119,096 | A | 9/2000 | Mann et al. |
| 6,119,932 | A | 9/2000 | Maloney et al. |
| 6,122,620 | A | 9/2000 | Weber |
| 6,122,642 | A | 9/2000 | Mehovic |
| 6,144,848 | A | 11/2000 | Walsh et al. |
| 6,158,658 | A | 12/2000 | Barclay |
| 6,199,077 | B1 | 3/2001 | Inala et al. |
| 6,229,621 | B1 | 5/2001 | Kulakowski et al. |
| 6,233,683 | B1 | 5/2001 | Chan et al. |
| 6,249,767 | B1 | 6/2001 | Okayama et al. |
| 6,275,808 | B1 | 8/2001 | DeMarcken |
| 6,289,315 | B1 | 9/2001 | Calvi |
| 6,292,830 | B1 | 9/2001 | Taylor et al. |
| 6,295,521 | B1 | 9/2001 | DeMarcken et al. |
| 6,304,850 | B1 | 10/2001 | Keller et al. |
| 6,309,098 | B1 | 10/2001 | Wong |
| 6,314,402 | B1 | 11/2001 | Monaco et al. |
| 6,317,594 | B1 | 11/2001 | Gossman et al. |
| 6,324,517 | B1 | 11/2001 | Bingham et al. |
| 6,360,205 | B1 | 3/2002 | Iyengar et al. |
| 6,698,653 | B1 | 3/2004 | Diamond et al. |
| 6,735,632 | B1 | 5/2004 | Kiraly et al. |
| 6,748,359 | B1 | 6/2004 | Colnot |
| 6,910,628 | B1 | 6/2005 | Sehr |
| 6,925,440 | B1 | 8/2005 | Shkedi |
| 7,039,951 | B1 | 5/2006 | Chaudhari et al. |
| 7,588,180 | B1 | 9/2009 | Carmichael et al. |
| 2001/0016825 | A1 | 8/2001 | Pugliese et al. |
| 2001/0037303 | A1 | 11/2001 | Mizrahi |
| 2001/0044321 | A1 | 11/2001 | Ausems et al. |
| 2001/0056473 | A1 | 12/2001 | Arneson et al. |
| 2002/0013718 | A1 | 1/2002 | Cornwell |
| 2002/0073646 | A1 | 6/2002 | Von Gutfeld et al. |
| 2002/0107947 | A1 | 8/2002 | Moragne et al. |
| 2002/0174073 | A1 | 11/2002 | Nordman et al. |
| 2002/0178034 | A1 | 11/2002 | Gardner et al. |
| 2003/0127511 | A1 | 7/2003 | Kelly et al. |
| 2003/0210139 | A1 | 11/2003 | Brooks et al. |
| 2004/0186902 | A1 | 9/2004 | Stewart |
| 2005/0005172 | A1 | 1/2005 | Haala |
| 2005/0033634 | A1 | 2/2005 | Pugliese |
| 2006/0061453 | A1 | 3/2006 | Tuttle |
| 2006/0243799 | A1 | 11/2006 | Kelly et al. |
| 2006/0288229 | A1 | 12/2006 | Hamid et al. |
| 2008/0209024 | A1 | 8/2008 | Shapira et al. |

Air Cargo/Air Freight
Aircraft Maintenance
Airlines
Airlineterminals.com
Airport area business
Airport area Lodging
Baggage checkin
Business information
Business Opportunities
Car rentals/limo
City Map
City Trains
Commercial Aviation Centers
Concessions
Connecting
Contractors
Customer Feedback
Departing
Directions
Executive Conference Center
Ezairlinetickets
Ezairportpark.com
Ezcharters.com
Ezflightinfo.com
Ezflightinsurance.com
Facts
Free email address for AA members
Jet Fuel
Lost & Found
Parking
Parking Locator
Parking EzAirportTracking
Parking/ezairportpark
Realtimeflightinfo.com
Search Airport name (see also worldmap Homepage)
Terminal/Layout Maps
USAirportinformation.com Quick Search ---------- 60 54a
Our Mission is to give you the BEST AIRPORT FLIGHT and TRAVEL EXPERIENCE you ever had making it ez, fast, cheap and friendly by exceeding your expectations!

Getting to: Atlantahartsfield Airport-car-train-cab
City Trains:
City of: Atlanta
Useful Links Are you in a hurry? Go
Are you late? Go
Did you miss your flight? Go
Link Justntimeticketing.com Go
(includes tickets printed out from your computer or via I-cell phone to your credit t card and printout) in Airportamericakiosk
AirportAmerica VIP Lounge Go Please remember to tune in to Airport America Radio 800 am WQAA for the Latest Parking Information. There always be 5 spaces for AirportAmerica customers, just email us at airportamerica@aol.com or visit us online @ezairportpark.com 55 JustnTime Ticketing
56 Arriving
57 Departure
58 Connecting
59 General Info Passenger Info

FIG. 7

Quick Search

From Air cargo Subheading 62

Cargo Airlines
Cargo Facts
Cargo Handlers
Intl Courier Services
Crating & Packing
Customs Brokers
Foreign Forwarders
Overland Carriers
Perishables & Animal Complexes
Railroads
Warehousing

FIG. 8

Ezairportparking.com 74

| Parking Lot | Current Status | Parking Lot | Current Status |
|---|---|---|---|
| North Daily | OPEN | South Daily | OPEN |
| North Economy | FULL | South Economy | FULL |
| North Hourly | OPEN | South Hourly | OPEN |
| Park-N-Ride-A | FULL | Park-N-Ride-B | OPEN |
| Park-N-Ride-C | OPEN | | |

*Updated last on May 30, 2000 at 10:15 A.M.
E-mail us 30 minutes prior departure for your immediate slot and pin number at ezairportparking.com Departing Passengers Flight Information 75

Flight Search
See worldmap at Home
Page Worldairportinfo.com

Terminal Information 76

Terminals
Airlines at City
Ticketing and Baggage
Check-in
Concessions
Terminal Layout Parking 77

Terminals
Airlines at City
Ticketing and Baggage
Check-in
Concessions
Terminal Layout

FIG. 10

From General Information/Passenger Information 90

Passenger Information 92

AirportAmerica Kiosk Locations
Customer Service
Concessions
US Customs
Air Cargo
Airport Tours
Security
Lost and Found
US Post Office
Banks and ATMs
VIP Lounges Medical Care
Interfaith Chapel
Currency Exchange
Airportsearch.com (details on all world major airports)

Ground Transportation 93

Ground Transportation
Getting to: Name of City
City Trains
Taxicabs
Limousine/Sedans
Metro and Non Metro Share
Ride Shuttles
Car Rentals/Valet Parking Other Interest 94

Facts
Tell us how are we doing?

FIG. 12

Passenger Information 104

Quick Search

Passenger Information 106

Flight Information
Customer Service
Concessions
Consulates
Chambers of Commerce
Airport Area Hotels/Inns
US Customs
Air Cargo
Airport Tours
Lost & Found
Security
US Post Office
Banks & ATMs
AirportAmericabanc.com
AirportAmericabank.com
Airportbanc.com
Airportbankamerica.com
VIP Lounges
Medical Care
Interfaith Chapel
Currency Exchange
Shopezfly.com
Shopnflyairports.com Information in other Languages 108

Spanish
French
Portuguese
Italian
Japanese

FIG. 22
208
'891668'326689'
E-TICKET
AJAX Airlines
206
Name: Jane C Traveler
Date: Fri 18 May 00
Flight: AJ9438k1
204
0156□□ 0□□
Gate: G-5
Seat 8A
Depart: Miami (MIA) 11:40 am
Arrive: NYC (JFK) 2:20 pm
Boarding: 11:05
Thank You For Flying AJAX Airlines
BOARDING PASS

WEBSITE FLOW CHART

| | | | |
|---|---|---|---|
| Airlines | Airline List | Airline Information | Maps Directions |
| Ticket Info | Airline List Ticket input | Status | Reservations |
| Pass. Info | Airline List Ticket input | | |
| Connections | Airline List Ticket input | | |
| Customs Brokers | City List | | |
| Foreign Trade Zones | | | |
| Overland Carriers | | | |
| Perishables Animals | | | |
| Railroads | City List | | |
| Warehousing | City List | Local List | Business Information |
| Terminal Info | | | |
| Directions | City List | Detailed | |
| City Maps | City List | Detailed | |
| Area Business | City List | | |
| Local Destinations | City List | | |
| Terminal Layout | City List | | |
| Check In | Airline List Ticket input | | |
| Locations | Airline List Ticket input | | |
| Concessions | Airline List Ticket input | | |
| Area links | City List | Local List | |
| Lost n Found | Airline List Ticket input | Detailed Information | |
| Disclaimer | | | |

FIG. 24A

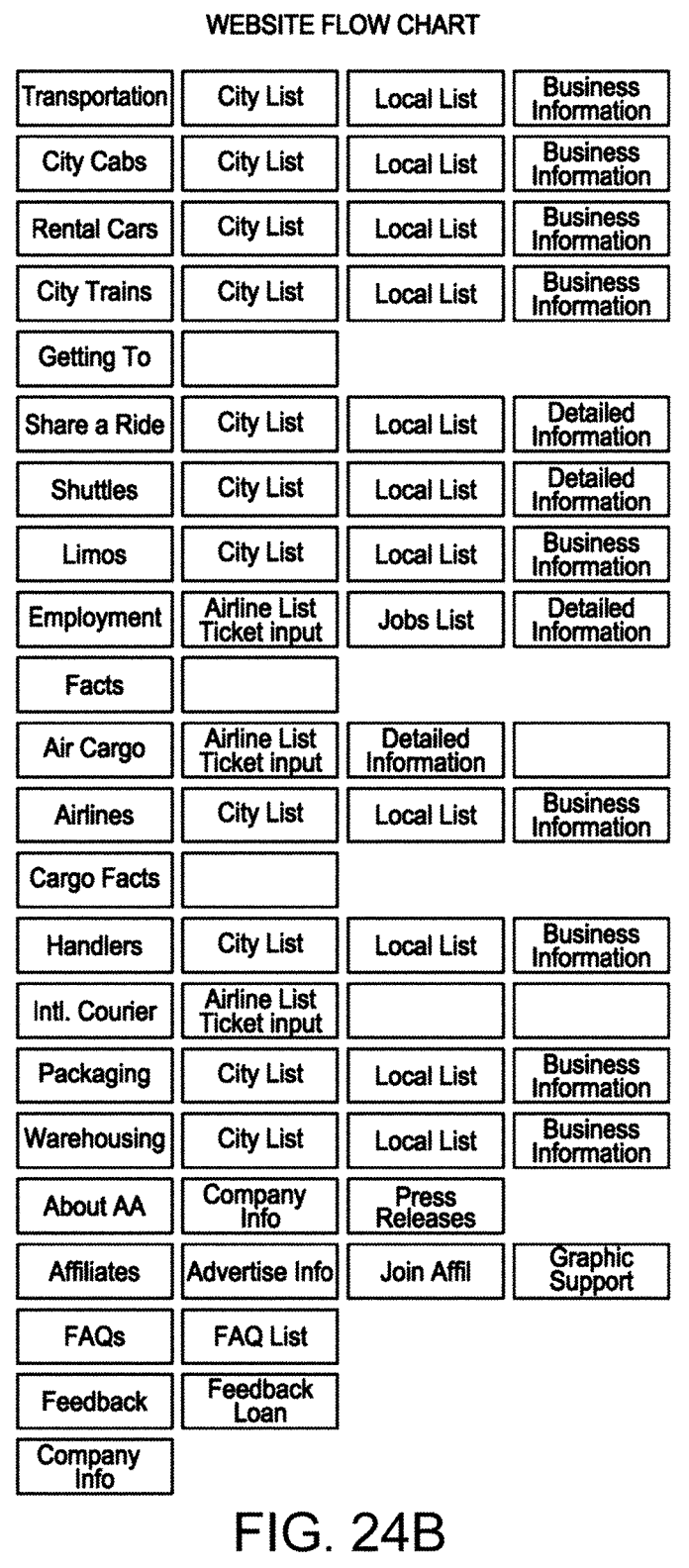

WEBSITE FLOW CHART

| | | | |
|---|---|---|---|
| Transportation | City List | Local List | Business Information |
| City Cabs | City List | Local List | Business Information |
| Rental Cars | City List | Local List | Business Information |
| City Trains | City List | Local List | Business Information |
| Getting To | | | |
| Share a Ride | City List | Local List | Detailed Information |
| Shuttles | City List | Local List | Detailed Information |
| Limos | City List | Local List | Business Information |
| Employment | Airline List Ticket input | Jobs List | Detailed Information |
| Facts | | | |
| Air Cargo | Airline List Ticket input | Detailed Information | |
| Airlines | City List | Local List | Business Information |
| Cargo Facts | | | |
| Handlers | City List | Local List | Business Information |
| Intl. Courier | Airline List Ticket input | | |
| Packaging | City List | Local List | Business Information |
| Warehousing | City List | Local List | Business Information |
| About AA | Company Info | Press Releases | |
| Affiliates | Advertise Info | Join Affil | Graphic Support |
| FAQs | FAQ List | | |
| Feedback | Feedback Loan | | |
| Company Info | | | |

FIG. 24B

AUTOMATED INTERNET BASED INTERACTIVE TRAVEL PLANNING AND MANAGEMENT SYSTEM

RELATED APPLICATIONS

This Application is a continuation of U.S. patent application Ser. No. 12/572,778, filed on Oct. 2, 2009, which in turn is a divisional of U.S. patent application Ser. No. 10/210,182, filed Aug. 2, 2002 under the title "Automated Internet Based Interactive Travel Planning and Management System", and has since issued as U.S. Pat. No. 7,599,847 on Oct. 6, 2009, which is a continuation-in-part of U.S. patent application Ser. No. 09/875,474, filed Jun. 6, 2001, under the title "Automated Internet Based Interactive Travel Planning and Reservation System", which has since issued as U.S. Pat. No. 7,315,567 on Jan. 1, 2008, which in turn is a Non-Provisional application of Provisional U.S. Patent Application No. 60/210,498, filed on Jun. 9, 2000, under the title "AirportAmerica.com." All references are hereby incorporated by reference in their entirety.

FIELD OF THE INVENTION

The present invention relates generally to information management and security systems. The present invention is particularly useful in the fields of travel management systems, improved methods of communication, and device management and consolidation. Specific embodiments of the present invention more particularly relate to Internet based travel planning, reservation, clearance and security systems.

BACKGROUND OF THE INVENTION

Over the past ten years both business and personal travel have been increasing at a dramatic rate. In order to accommodate and facilitate the increased travel being made by both business and personal travelers, whether by air, train, ship, bus, limousine, personal automobile, or other modes of transportation, much time, effort, and resources have been spent on an ongoing basis by the travel industry. The travel industry includes airlines, charter services, railroads, hotels, rental car companies, cruise lines, limousine companies, credit card and debit card companies, restaurants, tour operators, travel agents, government entities, airports, ports, train stations, helicopter operators, and so forth. It is important to the travel industry as a whole, and particularly to the airline industry, to provide user friendly, secured, and rapid response reservation and travel planning systems. Such efforts have led the industry to make extensive use of the Internet, for permitting travelers to make numerous travel arrangements and plans through use of their personal computer linked to the Internet to access a desired travel related website. However, it is recognized that the travel industry has much room for improvement in providing travelers easier, less expensive, more user friendly and faster methods and systems for both planning travel needs and making appropriate reservations for such travel. Travelers want to feel secure but do not want to sacrifice precious time more than absolutely required. Travelers also want a balance between preserving individual privacy and receiving measures of security.

SUMMARY OF THE INVENTION

An object of the present invention is to provide an improved method and system for enabling travelers to rapidly and interactively communicate via the Internet or other networks with desired websites or other devices for making all necessary travel arrangements for a desired trip.

It is another object of the invention to provide travelers with a means for making last minute ticketing and travel reservations with travel carriers, simultaneous with planning their itineraries.

Yet another object of the invention is to provide travelers and other interested parties with a means for receiving alerts, messages and travel advisories at any given time, no matter where the traveler or user of the inventive system might be located.

It is another object of the invention to provide travelers with expedited clearance to facilitate processing through transportation facilities, such as airport security checkpoints.

It is still another object of the invention to provide travelers with an interactive device permitting access to enhanced travel features, the travelers' preferences and identification verification information in conjunction with other convenient uses such as credit card and/or debit card functionality and communication functionality.

It is another object of this invention to honor the personal preferences of the traveler by enabling any entry of personal data to be a voluntary decision and to assure the traveler that private data will remain encrypted and secured from all other persons, even persons associated with the system.

With these and many other objects in mind, the present invention provides a method and system that permits travelers to register as members for receiving access to the main website of the system and that interactively provides the member with access to numerous other websites for facilitating whatever travel arrangements the member wishes to make. The member is provided with means to log onto the system website through use of the member's personal computer, mobile telephone, hand-held palm computer, web tv, Internet cell phone, iCell (for example the OneTouch disclosed below), cell phone, or other specially designed, integrated device for communicating through the system to secure travel reservations with air, land, and sea carriers, and to secure reservations for lodging, restaurants, entertainment, and other desired services. The system includes voice recognition means for permitting a user to communicate via voice commands, even while the user or member may already be pursuing travel on a last minute basis, while using the system to complete all further and necessary travel arrangements. The system further provides means for permitting a member to select specific travel carriers or service providers, and also provides means for analyzing the general travel requirement of the user, such as a desired airport, departure date and time, arrival city, length of stay, and so forth. The system will provide a user with reservations for a carrier or travel provider best able to meet the member's travel needs, such as hotel reservations, limousine services, and so forth. These services are all based upon a member's previously provided travel preferences and personal needs, all of which are stored in the system in the member's profile or portfolio. The system allows the member to use interactive voice response (IVR) systems to call in and book a reservation by voice or keypad. Dialing in or connecting from a compatible, identifiable, communication device allows the system to identify the member instantly, expediting the arrangements for travel including making the ticket buying process faster. Member preferences and payment settings are already pre-stored to expedite processing.

The system includes an Intranet or like system for better communication within the airport. The system also provides an Internet for communication between airports within and participating in the system. Both the system's Intranet and the Internet provide standard templates used for intranet and internet sites for use by airport employees and other travel provider employees to notify the system about situations that affect travelers. Anything that would delay or change a traveler's plans is recorded by an authorized user that has been granted security access to do so. These events trigger actions specified by the traveler to notify them and interested parties (including but not limited to those expecting to meet the traveler). The system intranet may access more detailed gate information as posted by the various airlines and as maintained typically on flight boards that are visible throughout the airport. By accessing the Flight Board information or other travel provider information by using their OneTouch either within or outside of the travel facility, members will have a chance to see, for example, the flight status, the departure gate, the status of boarding, if a gate is changed, or if the flight is cancelled. The same principle applies to non-airport related modes of travel, such as trains, buses, ships, and so forth.

Besides fulfilling personal preferences, the system directly recognizes members with special needs such as those requiring wheelchairs for travel or those who have special dietary needs or medical conditions. Any data that will help fulfill a member's travel requirements are available for storage in the member's portfolio.

Data available for storage are voluntarily provided by the member and not accessible to any unauthorized person without the express knowledge and approval of the member.

BRIEF DESCRIPTION OF THE DRAWINGS

Various embodiments of the invention are described in detail below, with reference to the drawings, in which like items are identified by the same reference designation wherein:

FIG. 7 shows a pull-down menu of the invention for a particular airport for accessing desired information;

FIG. 8 shows a pull-down menu of the invention obtained through selection of the sub-menu of FIG. 7;

FIG. 10 shows a pull-down menu of the invention for obtaining departing passenger information (such as departure gate and real time status, such as "Boarding," "Delayed," or "Gate Change") and other information;

FIG. 12 shows a pull-down menu of the invention for obtaining "General Information/Passenger Information;"

FIG. 14 shows a pull-down menu of the invention for obtaining certain "Passenger Information;"

FIGS. 24A and 24B show site maps detailing a method for inputting and obtaining information from the system.

DETAILED DESCRIPTION OF THE INVENTION

Figure 1:
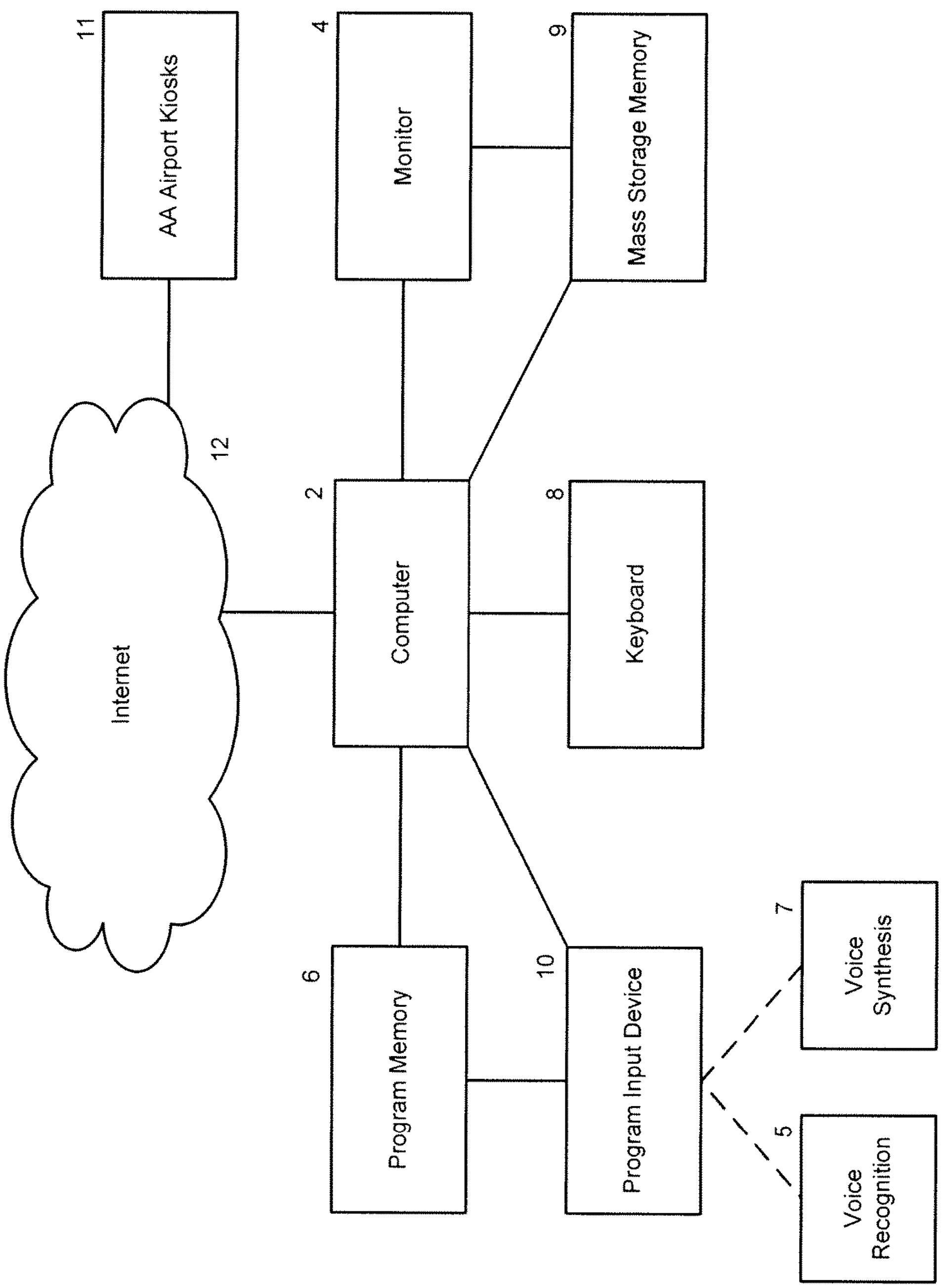
FIG. 1 shows a simplified block schematic diagram of a computer system connected to the Internet for providing the home website for the present invention that provides a Portal for members to obtain desired travel services.

As shown in FIG. 1, a computer 2 connected to a monitor 4, program memory 6, and input device 10, are necessary for providing the website of the present system. The computer 2 is connected to the Internet 12 for permitting members or system users access to the main website of the system. For purposes of illustration, the present invention is described below mainly in association with air travel, and trip planning and reservations associated with such travel, including pre-flight and post flight travel. However, the invention is not meant to be so limited, and is equally applicable in association with multiple other forms of travel beside air travel, including railroad travel, ship travel, helicopter travel, and so forth. With further reference to FIG. 1, note that the program memory 6 is loaded with programs via the program input device 10 for providing the operating system of the present invention, and necessary programming for carrying out the methodology of the invention. Programs for voice recognition 5, and voice synthesis 7 are used in one embodiment.

Figure 2:
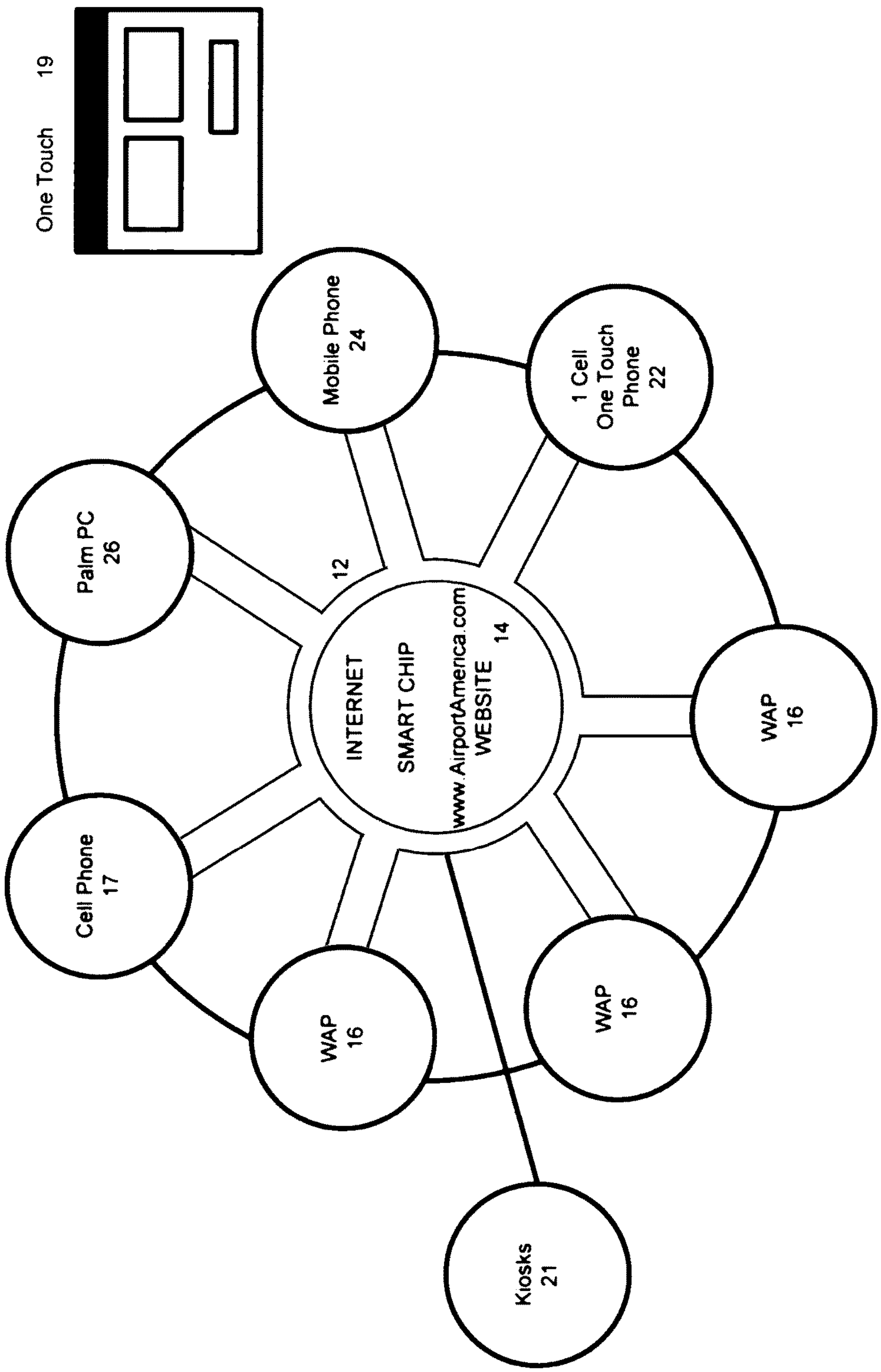
FIG. 2 is a simplified block schematic diagram showing how members can communicate through the Internet with the system website of the present invention.

Access to the website of the system is via the Internet 12, as previously indicated. As shown in FIG. 2, members or users of the present inventive system can gain access to the system website 14 via a number of available devices. As shown in FIG. 2, these devices include but are not limited to a Wireless Application Protocol (WAP) 16, a cell phone 17, a WebTV 18, a personal computer 20, an iCell, phone 22, a OneTouch 19, a kiosk 21, a mobile telephone 24, or a palm computer 26. As will be described in greater detail below, users of the system must join or become members. Each member has a profile stored within the system in association with the member's identification verification information, which may include a PIN number, biometrics and so forth. At the present time the inventor has named the present system "AirportAmerica" (A Trademark of AirportAmerica.com). In portions of the following description, AirportAmerica is referred to under the acronym "AA" (A Trademark owned by AirportAmerica.com). Throughout this document, the features of the invented system may be referred to as either AirportAmerica or AA or AirportAmerica.com or aa.

In order for a user to have access to the present system, the user must first enroll on the system. In doing so, the user must provide a profile including name, address, telephone number, credit card information, desired class of air travel (e.g., coach, business, first), airline carrier preference, seating preference, self park or valet parking, rental car preferences, and so forth. The users profile is stored in the system, and the user is provided a PIN number, to permit the new member user to gain access to the system.

Once access is obtained, the user is presented a home page, where the user or member can then select a number of pull-down menus for making reservations and other travel arrangements. As previously indicated, the member can make various selections through direct inputs from a personal computer 20, OneTouch 19, or WebTV 18, whereby typed data or cursor selected responses are provided to the system 14. Otherwise, voice commands can be used via a iCell phone, OneTouch 22, or the mobile telephone 24, or cell phone 17, for example.

Figure 3:
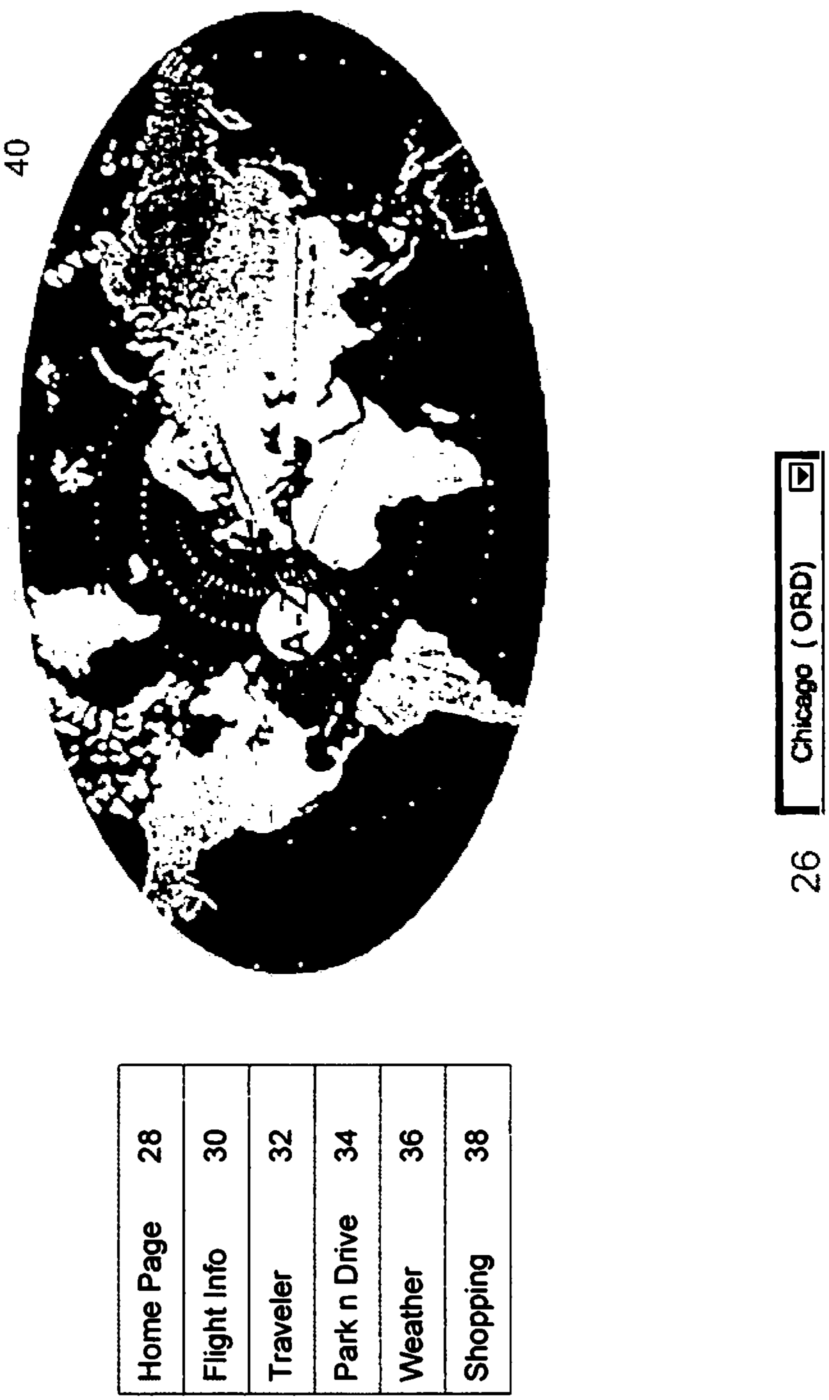
FIG. 3 shows a pull down menu for an embodiment of the invention for selectively obtaining flight information, or traveler information, or park/drive information, or weather information, or shopping information, and also for addressing a Portal for selecting a particular airport or other travel facility.

A pull-down menu 26 can be obtained, as shown in FIG. 3. Through use of this menu, a user or member can select flight information, traveler information, parking and related driving information, weather information, and shopping information, relative to a particular flight. With regard to the flight itself, first the member must select a particular airport for departure, and another airport for arrival. In one embodiment of the invention, the member moves a cursor into the world map region 40, and selects the central Portal 42 of FIG. 4, to obtain the pull-down menu 44 of FIG. 4. By placing the cursor on any one of the identified airports shown in FIG. 4 by both airport name, and code, the member then obtains access to that particular airport in a very particular manner. Once the airport is selected, the member can return to the pull-down menu of FIG. 3 for selecting specific information relative to that airport, as provided on the left hand side of the pull-down menu 26. Such specific information may include such information as gradation level as discussed below.

Figure 5:
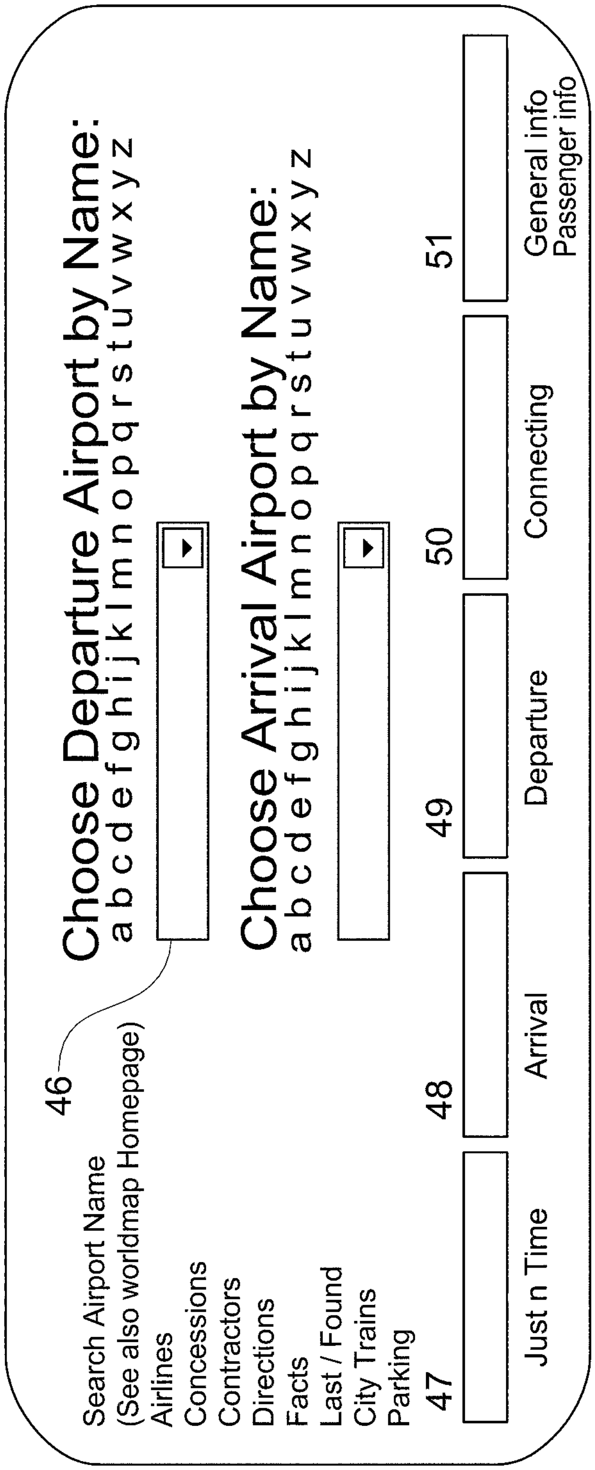
FIG. 5 shows a pull-down menu of the invention for choosing a departure and an arrival airport by name, and specific information regarding the selected airport.

The member can also select a pull-down menu 46, as shown in FIG. 5, for selecting a departure airport by name, and an arrival airport by name. Once the airports are selected, the member can click onto any one of the word icons shown, such as 47 through 51, for example, or on any one of the icons shown at the left of menu 46. In another embodiment, the user may interact with the system via voice or interactive video.

Figure 6:
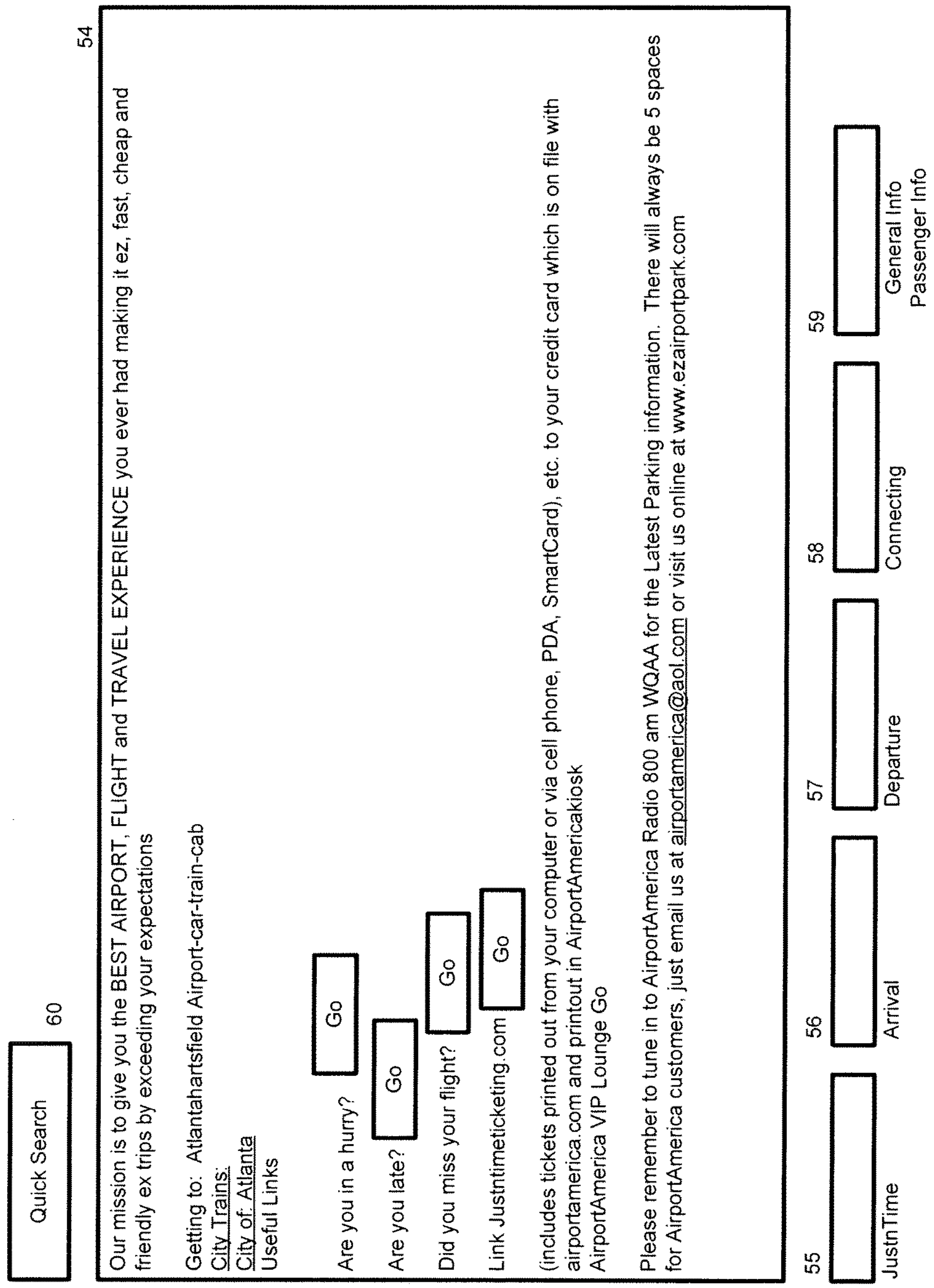
FIG. 6 shows a pull-down menu of the invention relative to selection of a particular airport.

The member can also select the pull-down menu 54 of FIG. 6, for obtaining specific information relative to a particular airport, and for answering certain questions as indicated, for permitting direct access to other pull-down menus to permit the member to pursue various options associated therewith. In the pull-down menu 54, an airport name has been inserted into "Getting To:", and the city associated with the airport, in this example, Atlanta, Ga. Any of the word icons, as shown can be addressed for providing or obtaining certain information, as indicated. For example, anyone of the word icons 55 through 59, can be individually addressed for obtaining the indicated function, or information. The member can also address the icon Quick Search 60, shown in the upper left in the pull-down menu 54. If the member does address Quick Search 60, the pull-down menu 54 will be modified as shown in FIG. 7, to present word icons for selection by the member via the "Quick Search 60" function.

With further reference to the modified pull-down menu 54 of FIG. 7, assume for example that the member selects the icon "Aircargo/Air Freight." If so, the pull-down menu 62 of FIG. 8 will be obtained. The member can then address any one of the icons indicated at the left, for obtaining detailed information associated therewith, such as "Warehousing."

Figure 9:
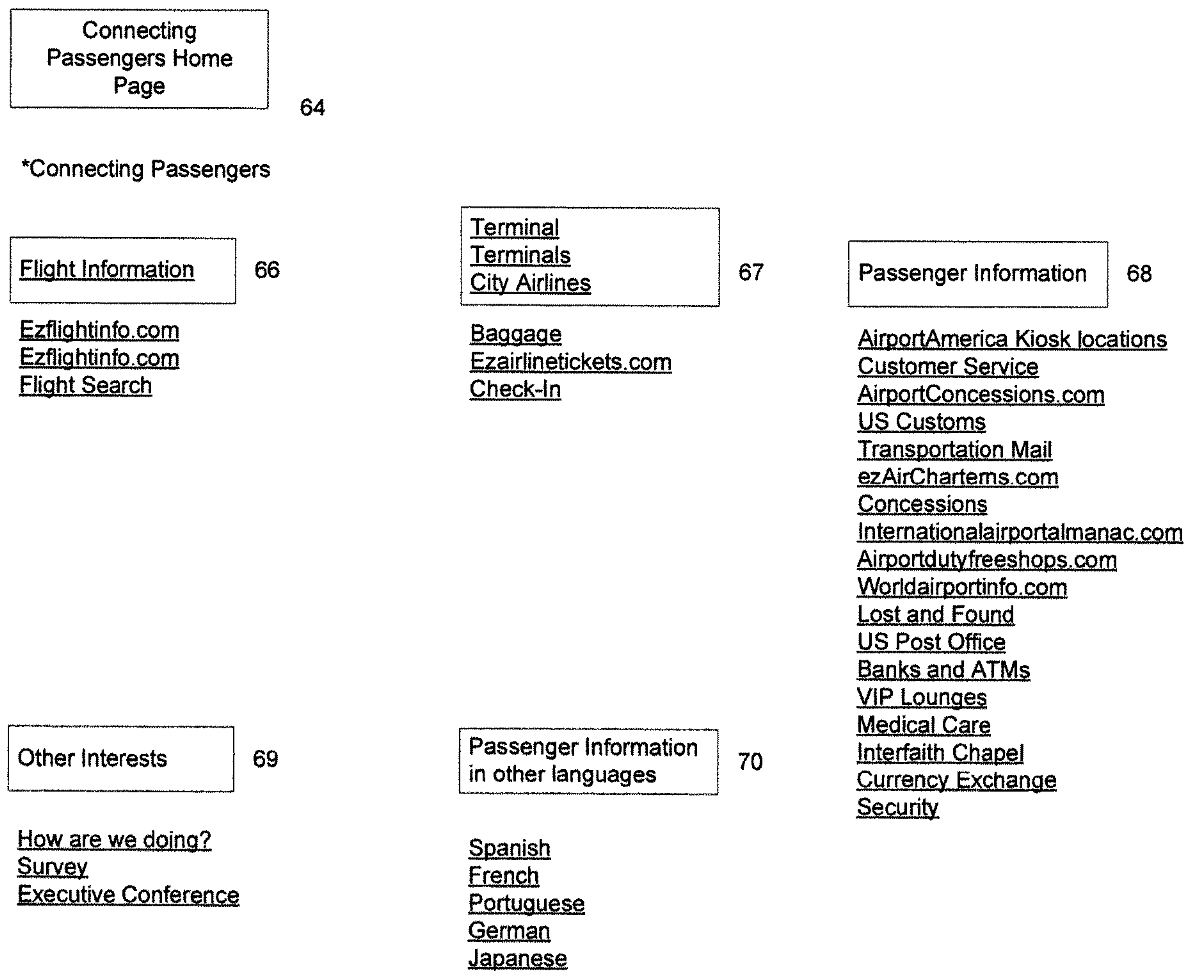
FIG. 9 shows a pull-down menu of the invention for obtaining connecting passenger information.

A member can also select the pull-down menu 64, as shown in FIG. 9, for obtaining information about "Connecting Passengers" by individually addressing any one of the icons under the headings Flight Information 66, Terminal Information 67, Passenger Information 68, or "Other interests" 69, the member can obtain indicated information relative to Connecting Passengers. Also, by selecting anyone of the icons under "passenger information in other languages," the member can select a desired language other than English 70.

The member can select the pull-down menu of 72 of FIG. 10, for obtaining information relative to "Departing Passengers." Note that for the particular airport, icons are provided for obtaining Parking Information 74, Flight Information 75, Terminal Information 76, and other detailed "parking" 77 information.

Figure 11:
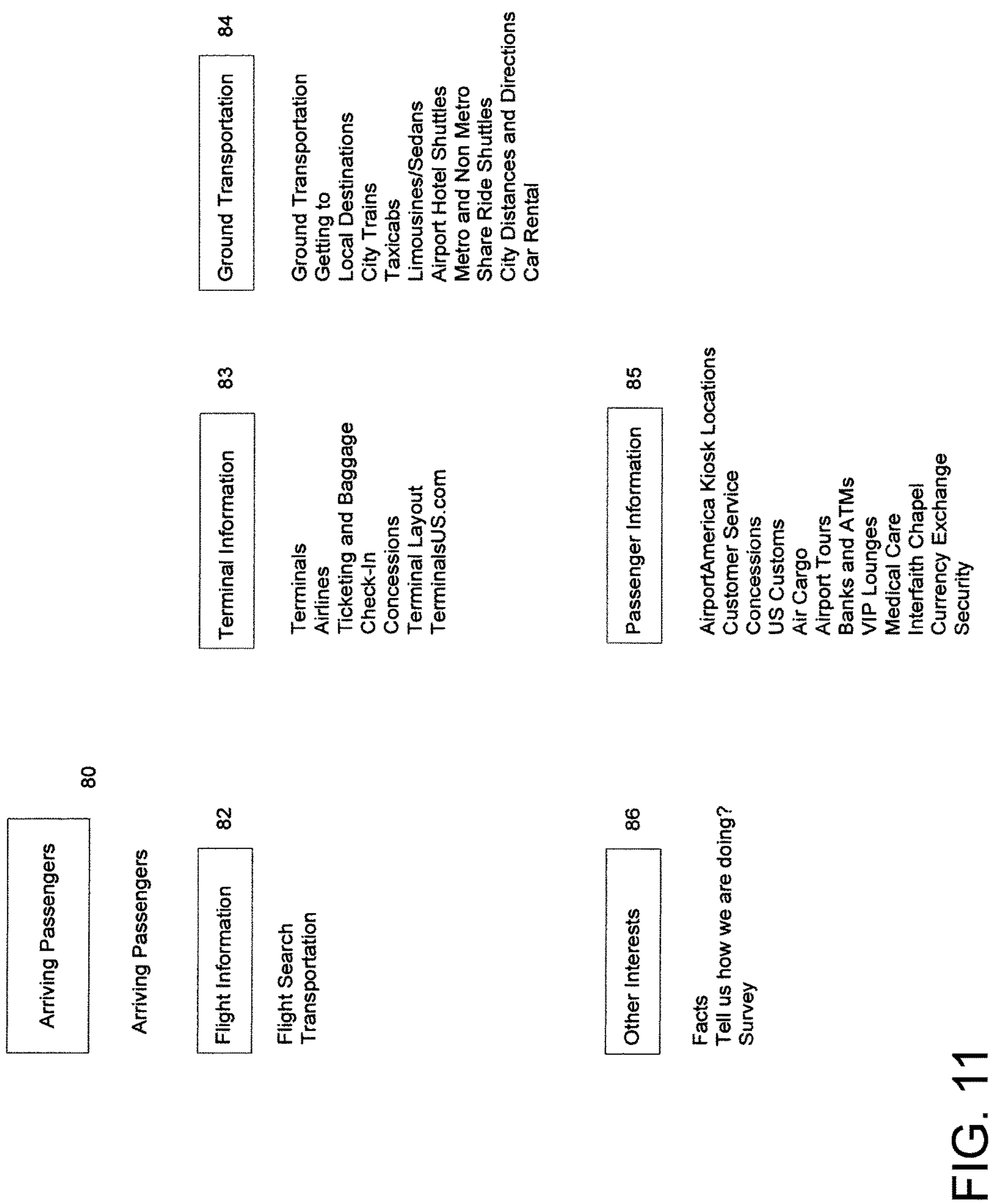
FIG. 11 shows a pull-down menu for obtaining arriving passengers information, for an embodiment of the invention.

The pull-down menu 80, for obtaining information relative to "Arriving Passengers", as shown in FIG. 11, can be selected. Various of the icons shown can be addressed for obtaining Flight Information 82, Terminal Information 83, Ground Transportation Information 84, and Passenger Information 85. Also, by addressing the icons under Other Interests 86, other facts can be obtained, and also the member is provided an opportunity for letting AirportAmerica know how they are doing in providing the related service.

The pull-down menu 90, shown in FIG. 12, can be obtained for gaining Passenger Information 92, Ground Transportation 93, and Other Interests 94, by addressing the respective icons associated therewith, as shown.

Figure 13:
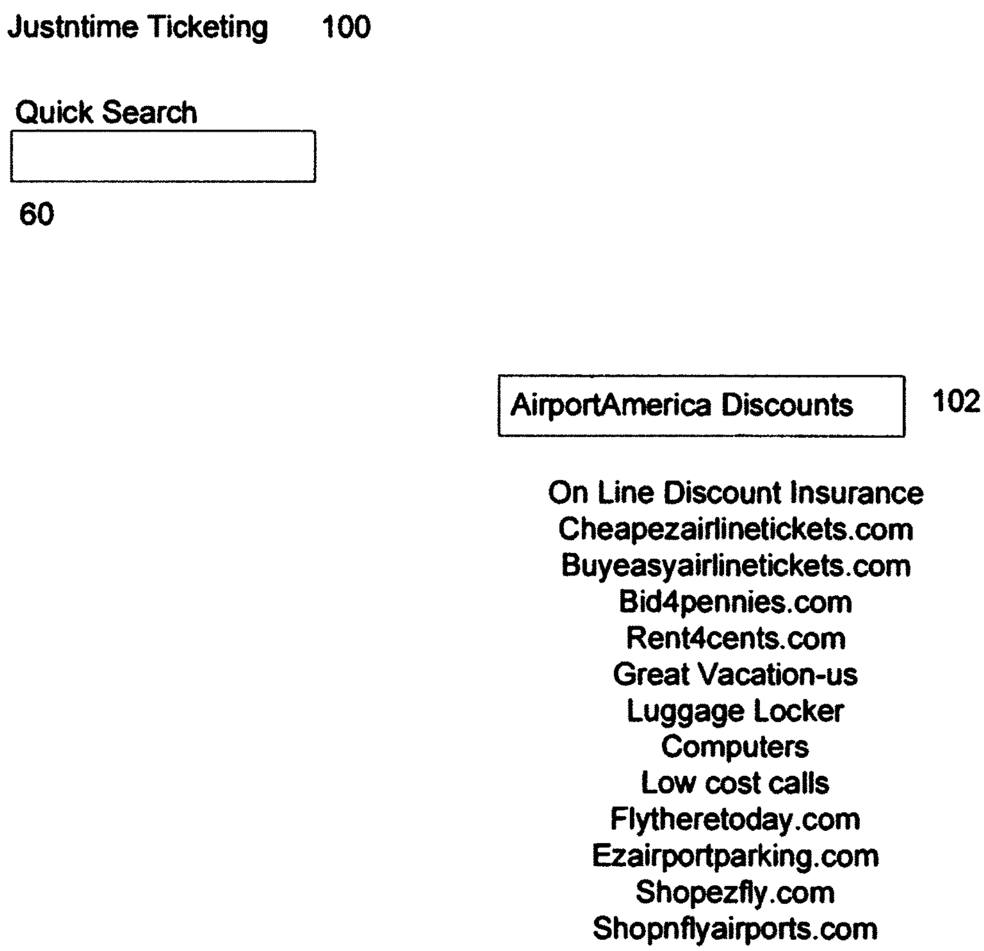
FIG. 13 shows a pull-down menu of the invention for obtaining "Justntime ticketing;"

If in the pull-down menu 46 of FIG. 5, or the pull-down menu 54 of FIGS. 6 and 7, the member selected "Justntime ticketing 47" relative to flowchart 46, or the same function indicated as 55 in the flowchart 54 of FIGS. 6 and 7, the pull-down menu 100 of FIG. 13 will be obtained. As shown, a Quick Search 60 can be addressed, and the individual icons under "AirportAmerica discounts 102" can be addressed for obtaining associated information as indicated by each icon.

The pull-down menu 104, shown in FIG. 14, can be obtained for obtaining specific "passenger information" 106, as shown by the individual and selectable icons thereunder. Also, as shown under "Information in other languages" 108, a member can select other than English.

Figure 15:
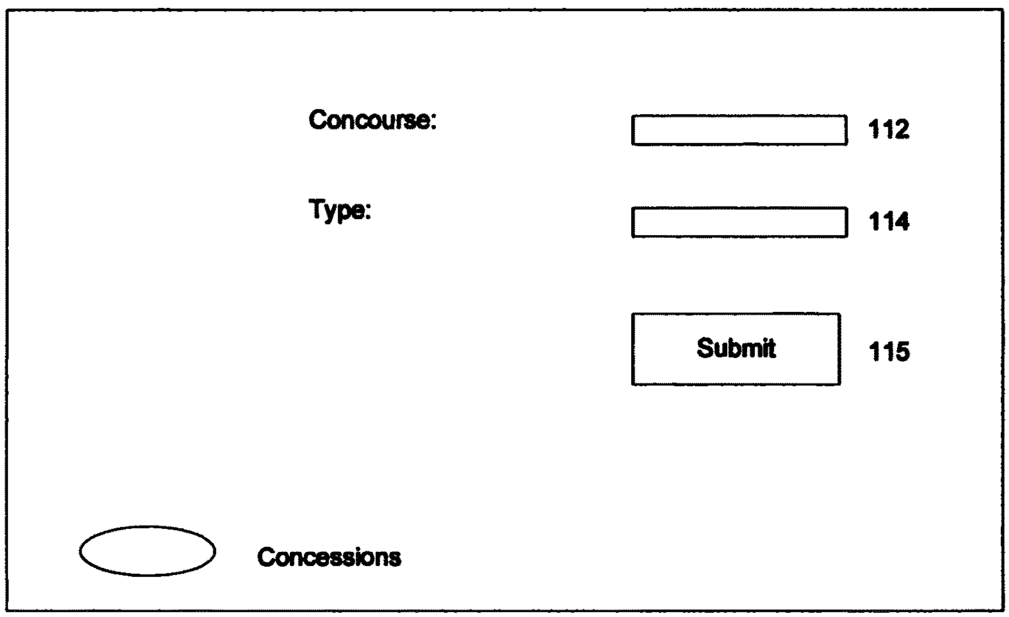
FIG. 15 shows another pull-down menu of the invention for obtaining information regarding the concourse of an airport, and the type of airport.

The pull-down menu 110 of FIG. 15 can be obtained for a specific airport, for obtaining information regarding a Concourse 112 of the airport, in a particular "Type" 114 concession associated therewith by inputting the appropriate information, and submitting it, the system will provide the location of the particular concession in that concourse. As shown, after inputting the information desired, the member must address the icon 115 for submitting the same.

Figure 16:
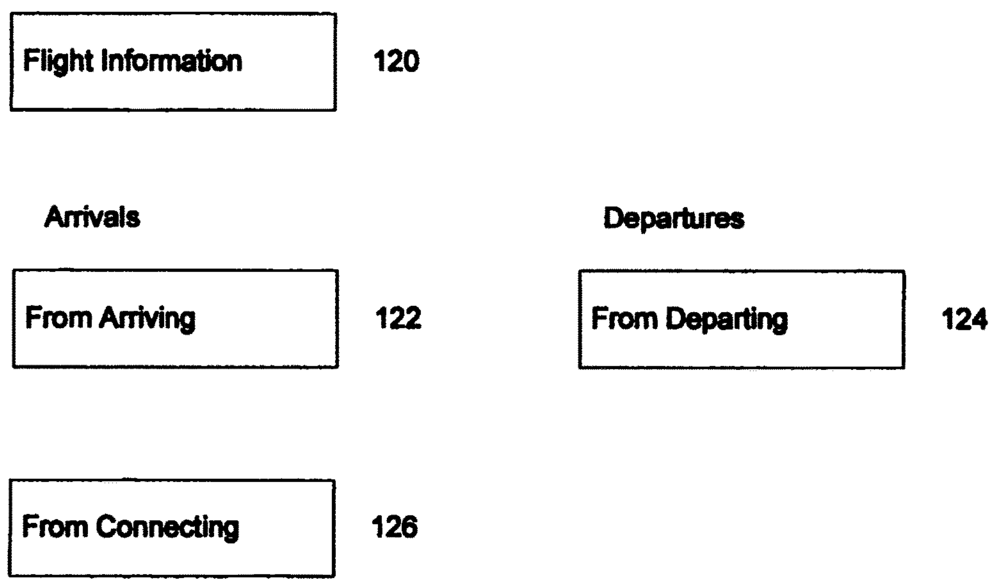
FIG. 16 shows a pull-down menu of the invention for obtaining arrival and departure flight information for a particular airport.

The pull-down menu 120 for showing "Flight Information" can be obtained as shown in FIG. 16. The icons "From Arriving" 122, "From Departing" 124, or "From Connecting" 126 can be individually addressed for obtaining information associated with the indicated functions.

Figure 17:
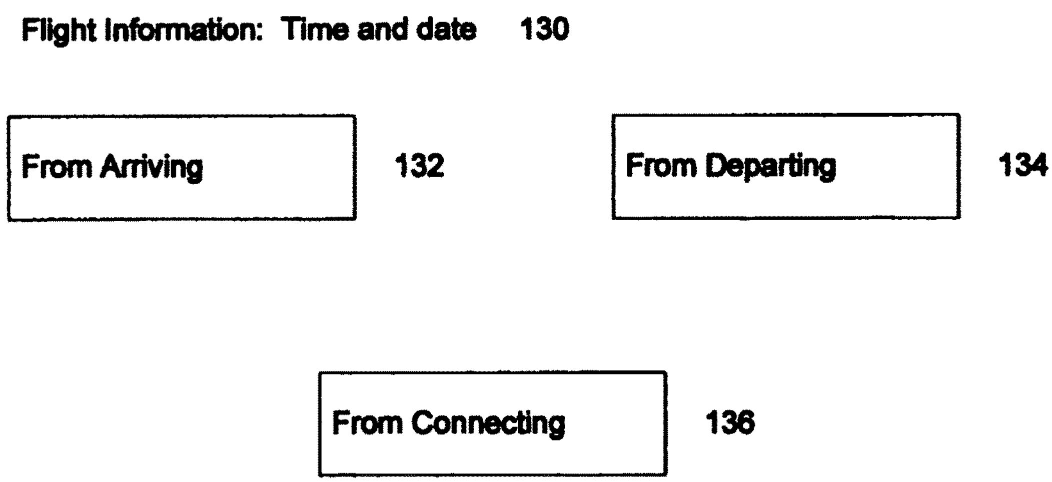
FIG. 17 shows a pull-down menu of the invention for obtaining additional flight information specific to the time and date of flights at a particular airport.
Figure 18:
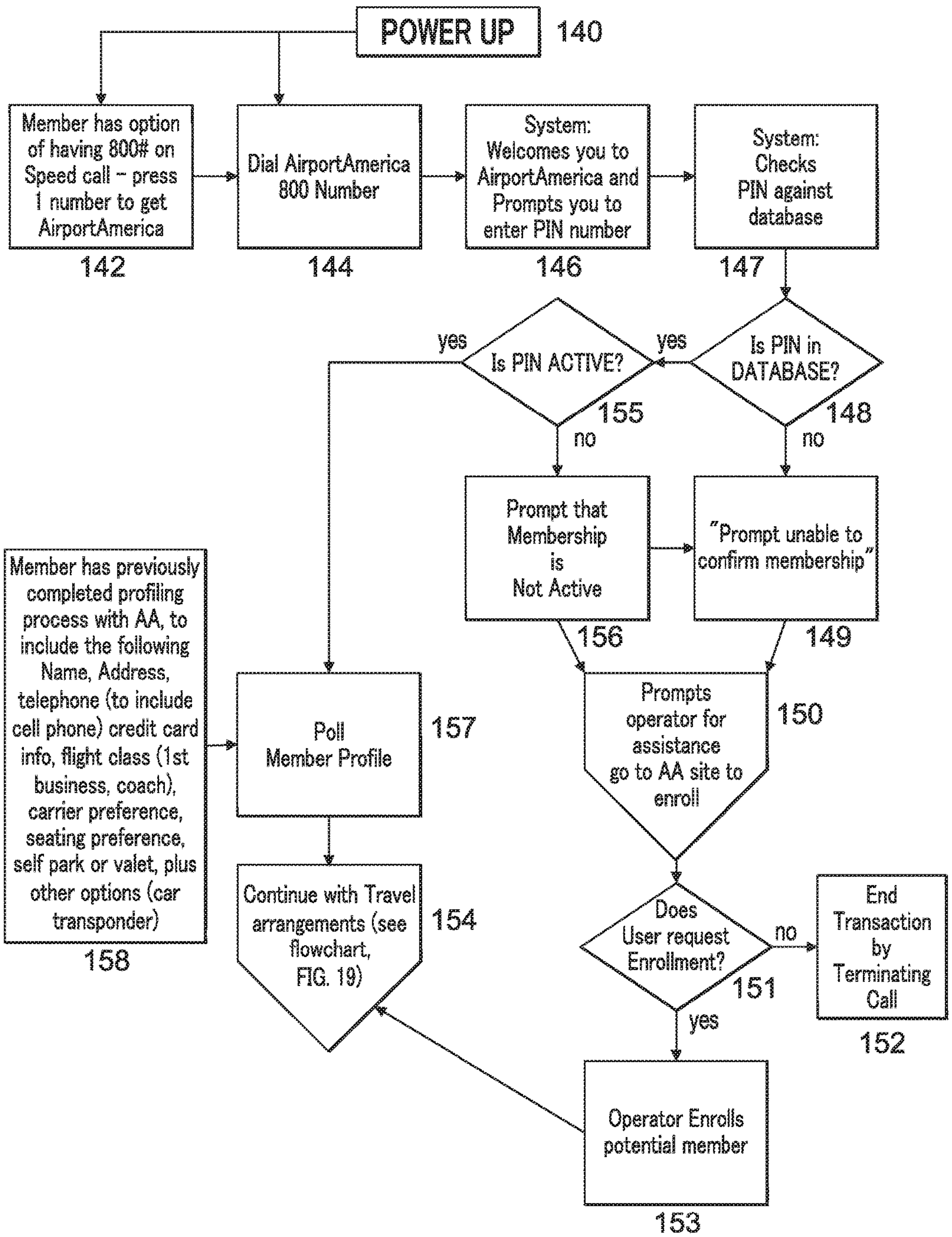
FIGS. 18 through 20 show flowcharts detailing the various steps for a method of the invention for permitting a member or user to make travel reservations and arrangements or plans.

The pull-down menu 130, as shown in FIG. 17, can be selected for obtaining flight information associated with a particular time and date to be inputted into the flowchart 130 by the member. Once the time and date are provided, the member can then select individually the icons "From Arriving" 132, "From Departing" 134 and "From Connecting" 136.

An example of various steps involved in a member using the present system, and the steps required of the System, is illustrated in the flowcharts of FIGS. 18 through 21. With reference to the flowchart of FIG. 18, the first step 140 is for the member to turn on or "power-up" his/her device for entering the Internet 12 to obtain access to the system website 14. Next, the member either uses speed dialing via step 142, or direct dialing via step 144 for dialing up AirportAmerica's 800 number. In step 146, the system welcomes the member, and prompts the member to then enter the PIN number, biometric information, or other identifying data. Thereafter, steps 147 through 152 are performed, and the transaction is ended by terminating the call (step 152), if in the sequence of prior steps, a PIN number, or membership cannot be confirmed, as indicated. If in the sequence of steps 147 through 151, a user requests enrollment via step 153, enrollment is completed, and step 154 is processed for entering into the steps of the flowchart of FIG. 19. Alternatively, if in step 148 a valid membership is confirmed by the database, step 155 is entered for determining whether the membership is active. If the answer is no, step 156 is entered for prompting the user that their membership is not presently active, followed by steps 150, and 151 for determining whether the user requests enrollment, as previously indicated. As before, if enrollment is not requested, step 152 is entered for ending the transaction, or if enrollment is requested, steps 153 and 154 are pursued. Lastly, if in decision step 155, the membership is determined to be active, step 157 is entered for obtaining from memory 9 the information shown in block 158 for the identified member. Processing then proceeds to step 154 for transferring to the steps shown in the flowchart of FIG. 19.

Figure 19:
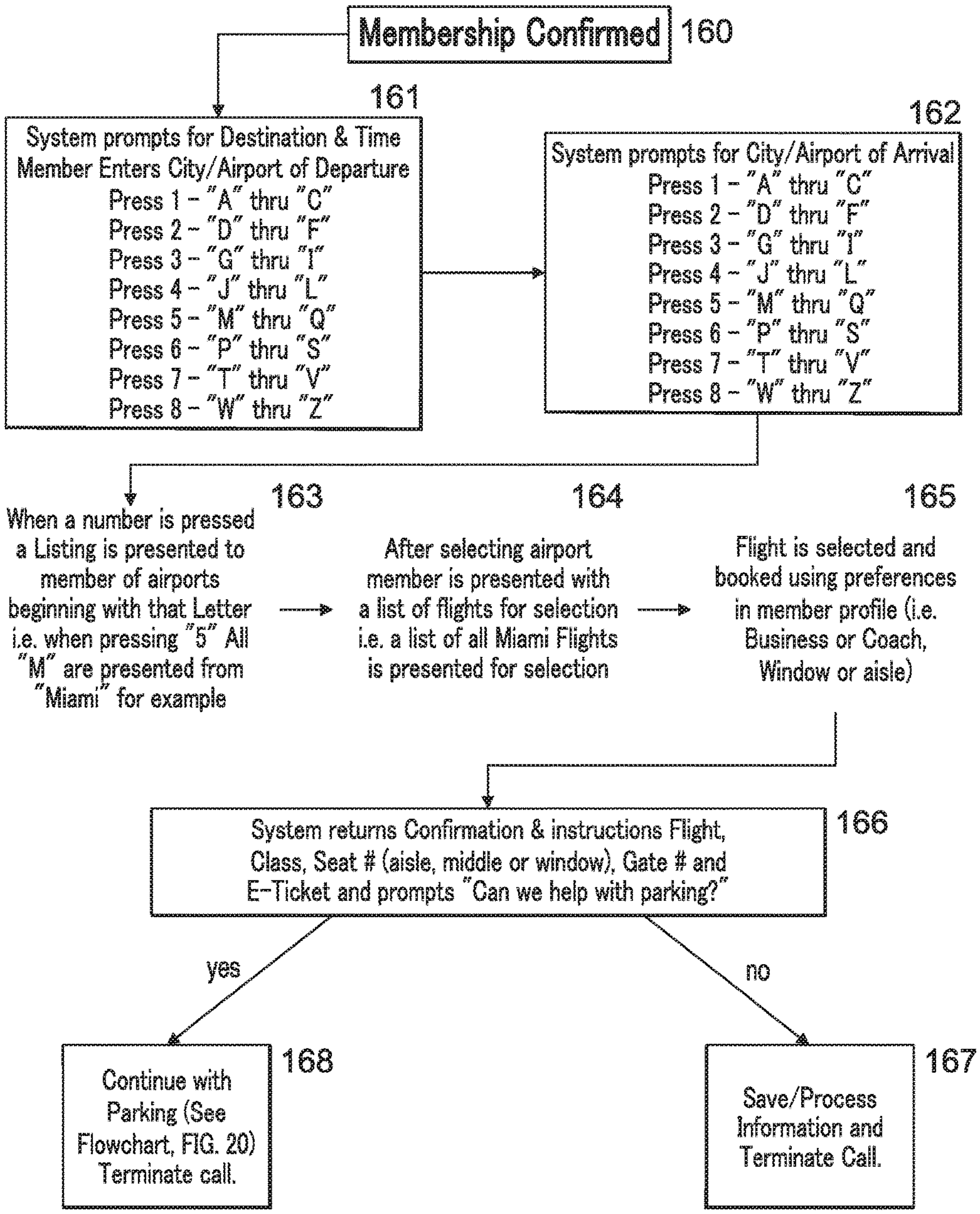

With further reference to the flowchart of FIG. 19, with membership confirmed via step 160 by transfer from step 154, steps 161 through 166 are carried out as indicated. As shown in step 166, if the member does not request help with parking, step 167 is entered for saving the processed information, and terminating the call. However, if the member does request help with parking, step 168 is entered for transferring to the steps of the flowchart of FIG. 20.

Figure 20:
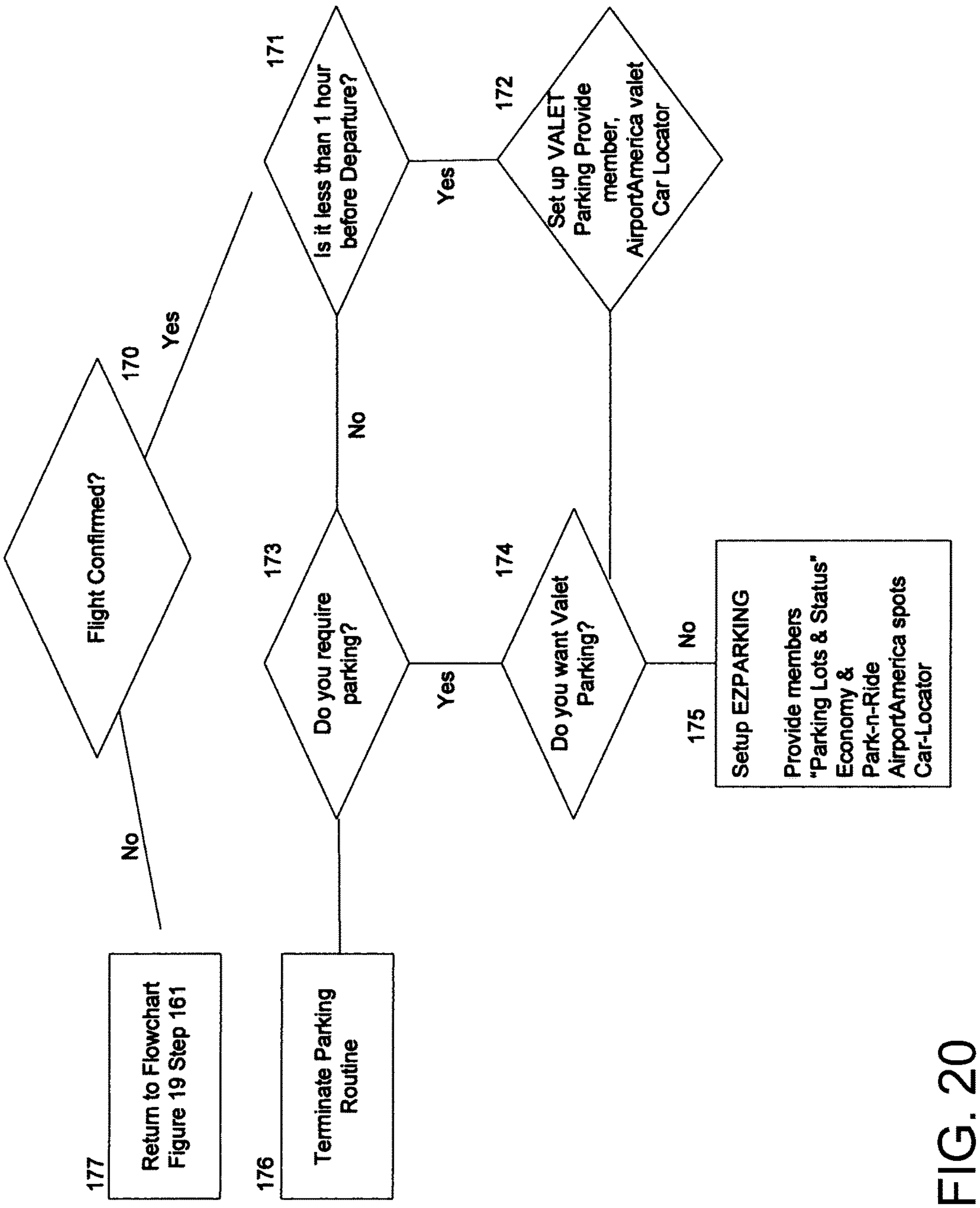

With further reference to the flowchart of FIG. 20, step 170 is entered for confirming the flight information. If the flight is confirmed, next in step 171 it is determined whether there is less than one hour before departure time. If the answer is yes, step 172 is entered for setting up valet parking. If there is more than one hour before the flight departure, step 173 is the next step after step 171, for prompting the member as to whether they require parking. If so, step 174 is entered to prompt the member for valet parking. If valet parking is selected, step 172 is next entered for taking the necessary steps to set up the valet parking, and notifying the member of the details. Alternatively, if the member chooses ezparking, step 175 is entered for setting up the reservation of a parking spot, and providing to the member the parking lot information. Note also in step 172, for setting up valet parking, after doing so, the member is provided with the location and directions for going to the valet parking area.

A member can plan to make all arrangements for their return flight in a similar manner. The member can do so at a later time, or at the time of first making the arrangements for the initial departing flight, by returning to the pull-down menu of FIG. 5, and addressing one of icons 47 through 51, or some combination thereof, for obtaining the appropriate reservations and required information. The system would establish the return flight using the steps of the flowcharts of FIGS. 19 and 20, as previously described.

Figure 21:
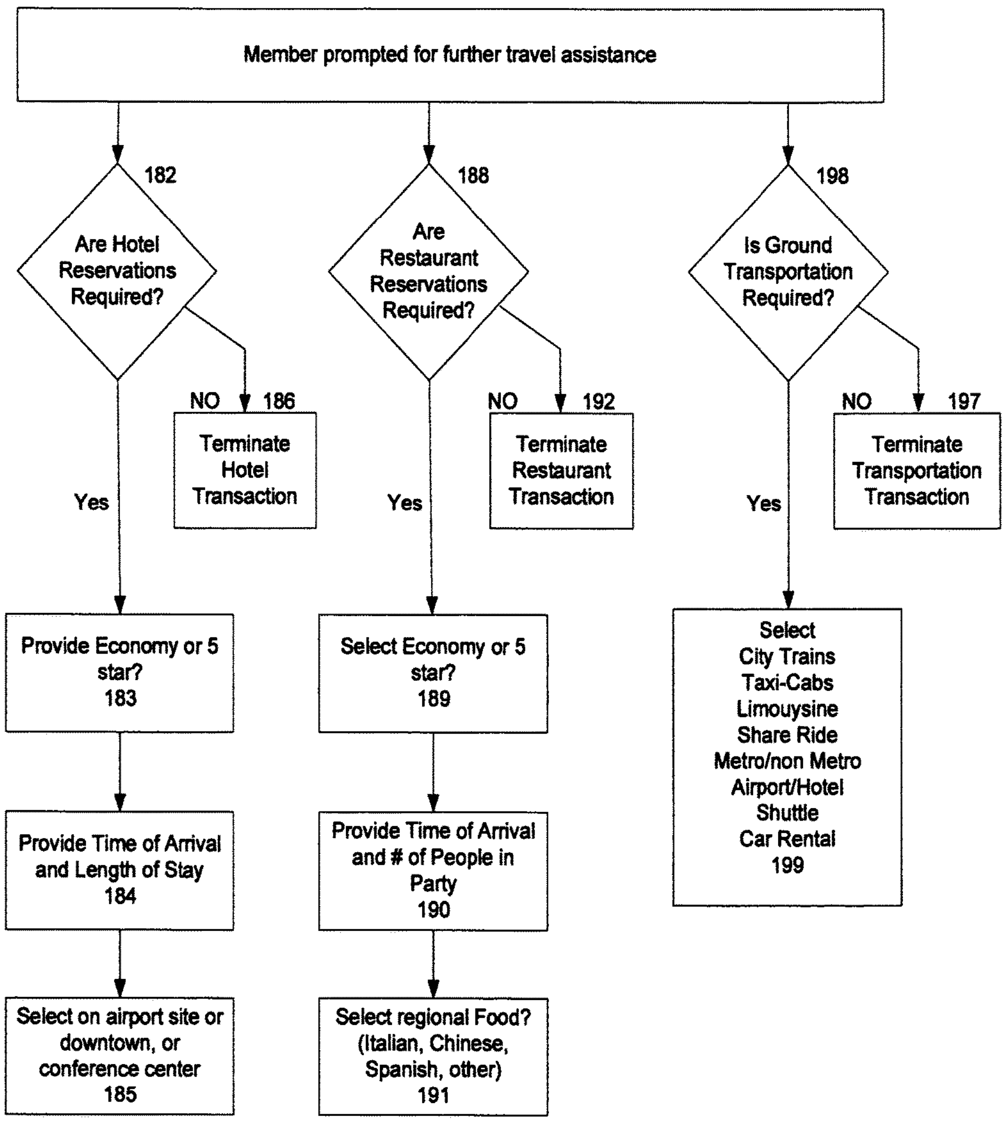
FIG. 21 shows a flowchart detailing the various steps for a method of the present invention for permitting a member or user to make arrangements for a hotel, restaurant reservations, and/or ground transportation.

After the member has completed their flight reservations, the system operates to prompt the member for further travel assistance as shown by step 180 in the flowchart of FIG. 21. A pull-down menu will be presented having icons asking the member whether they require car rental reservations, parking reservations, hotel reservations, restaurant reservations, ground transportation, and so forth. The system responds, as shown in the flowchart of FIG. 21, to the members selections. If in step 182 the member confirms that hotel reservations are required, the member is further prompted in step 183 to indicate whether economy, five star, or some other class of hotel or lodging is needed. Next in step 184, the member is prompted to provide their time of arrival, and length of stay. Next, in step 185, the member is prompted to select their desired hotel location, as indicated in the flowchart. If hotel reservations are not required, step 186 is entered for terminating the hotel transaction. Similarly, if restaurant reservations are required via prompting step 188, steps of 189 through 191 are carried out as prompting steps to permit the system to then automatically make the necessary restaurant reservations. If restaurant reservations are not required in step 188, the transaction is terminated in step 192. If ground transportation is required via step 198, prompt step 199 is entered for requesting the member to select one of the indicated modes of transportation. Once the member indicates their choice, the system responds by arranging the necessary transportation, and advising the member of the arrangements made. Note that the member is prompted in each of steps 182, 188, and 198 to advise whether or not hotel, restaurant, and/or ground transportation reservations are required to ensure the member does not in making hasty travel plans forget to pursue the same. Also, the system depending upon the mode of communication with the member, will either present a screen display of the reservations made, or provide a voice synthesized message of the same for the requested hotel, and/or restaurant, and/or ground transportation arrangements made.

Figure 4:
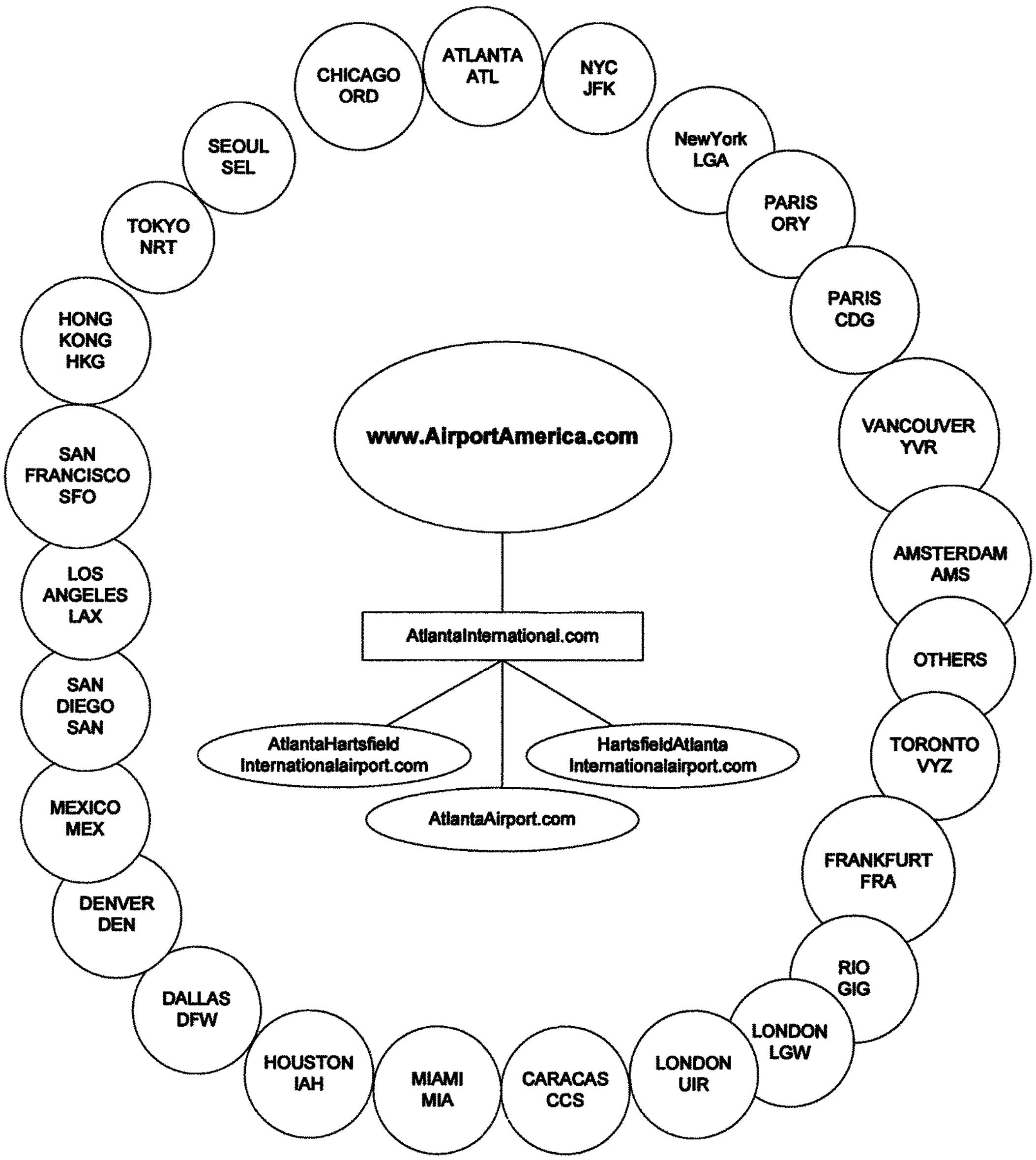
FIG. 4 shows a pictorial diagram of a pull-down menu of the invention obtainable from the pull-down menu of FIG. 3 for permitting rapid selection of a particular airport website from a plurality of addressable airport websites.

With further reference to FIG. 4, the present AA system utilizes the following airport and transportation related domain names owned by AirportAmerica.com:

| |
|---|
| 1clickbagchk.com |
| 1clicktx.com |
| aaaairdiscounts.com |
| aaaairfare.com |
| aaaairport.com |
| aaaairport.net |
| aaaairportal.com |
| aaaairporthotel.com |
| aaaairporthotels.com |
| aaaairportinns.com |
| aaaairports.com |
| aaaairports.net |
| aaaairportstay.com |
| aaaairtravel.com |
| aaaairtrips.com |
| aaaamsterdamairport.com |
| aaacheapairtix.com |
| aaacheaptix.com |
| aaachicagoairport.com |
| aaachicagoairports.com |
| aaachinatrips.com |
| aaacorpsuites.com |
| aaadiscounttix.com |
| aaafrankfurtairport.com |
| aaahongkongairport.com |
| aaaintlairports.com |
| aaairportpark.com |
| aaairportvalet.com |
| aaairportvaletpark.com |
| aaairportworld.com |
| aaairtx.com |
| aaasuites.com |
| aaaticketrez.com |
| aaavalet.com |
| aaaworldairports.com |
| aabeamtx.com |
| aairportpark.com |
| aairportvalet.com |
| aakiosk.com |
| aaticketrez.com |
| aatx.com |
| aeropuertointernacionaljosemarti.com |
| aeropuertosdeestadosunidos.com |
| aeropuertosdemiami.com |
| aeropuertosdemiami.net |
| aeropuertosus.com |
| aeropuertosusa.com |
| airlineterminals.com |
| airport2airport.com |
| airportalmanac.com |
| airportalmanac.net |
| airportamerica.com |
| airportamericabanc.com |
| airportamericabank.com |
| airportapartments.com |
| airportapartments.net |
| airportapartmentsuites.com |
| airportbanc.com |
| airportbancamerica.com |
| airportbankamerica.com |
| airportco.com |
| airportconcessions.com |
| airportdomain.com |
| airportdutyfreeshops.com |
| airportfueling.com |
| airportfurnishedapartments.com |
| airporthotelsuites.com |

-continued

| |
|---|
| airporthotelsuites.net |
| airportinc.com |
| airportindustrial.com |
| airportinformation.net |
| airportjetfuel.com |
| airportmotel.net |
| airportmotelsearch.com |
| airportoffices.net |
| airportofficesuite.com |
| airportrans.com |
| airportrentals.net |
| airportsamerica.net |
| airportsroundtheworld.com |
| airportsrus.com |
| airportsrus.net |
| airportsuites.com |
| airportsus.com |
| airportsusatoday.com |
| airportsusatoday.net |
| airportsworldb2b.com |
| airportus.com |
| airportvalet4u.com |
| airportvaletpark.com |
| airportvillas.com |
| airportwarehouse.net |
| airportworldalmanac.com |
| alaskaairport.com |
| alaskaairports.com |
| alaskaairports.net |
| alaskavacations.net |
| allaboutairports.com |
| almacenaeropuerto.com |
| amsairport.com |
| amsterdamairportinfo.com |
| amsterdamairportschiphol.com |
| amsterdamairportschipol.com |
| amsterdamamsairport.com |
| amsterdamintairport.com |
| amsterdamschiphol.com |
| ancairport.com |
| anchorageintairport.com |
| apartamentosdelaeropuerto.com |
| apartamentosdemiami.com |
| apartmentsus.net |
| apartmentsusa.net |
| asiaairtrips.com |
| atlantaairport.net |
| atlantaairportapartments.com |
| atlantaairportcarrentals.com |
| atlantaairportcorporatesuites.com |
| atlantaairporthotel.com |
| atlantaairporthotels.net |
| atlantaairportlodging.com |
| atlantaairportlodging.net |
| atlantaairportmotels.com |
| atlantaairportmotels.net |
| atlantaairportoffices.com |
| atlantaairportrentalcars.com |
| atlantaairports.com |
| atlantaairportsuites.com |
| atlantaairporttransportation.com |
| atlantaairportwarehouses.com |
| atlantahartsfieldinternationalairport.com |
| atlantahartsfieldinternationalairport.net |
| atlantainternationalairport.com |
| atlantainternationalairport.net |
| atlhartsfieldairport.com |
| atlhartsfieldintlairport.com |
| atlhartsfieldintlairport.com |
| atlintairport.com |
| atlinternationalairport.com |
| atlintlairport.com |
| ausairport.com |
| austinairport.net |
| austinausairport.com |
| b2bairport2airport.com |
| b2bairportcargo.com |
| b2bairportfreight.com |
| b2busairports.com |

b2bworldairports.com
bahamatrips.com
baltimorewashingtonintlbwiairport.com
bancamericaairports.com
bangkokairport.net
bankamericaairport.com
bankamericaportal.com
banknairports.com
beijingairport.net
beijingchinaairport.com
beijingpekairport.com
berlintxlairport.com
bid4pennies.com
bkkairport.com
bogotaairport.com
bogotaairport.net
bosairport.com
bostonairport.net
bostonloganintairport.com
brusselsbruairport.com
buenosairesairport.com
buenosairesairport.net
buenosairesezeizaintlairport.com
bushhoustonairport.com
bushhoustonintairport.com
bushhoustonintercontinentalairport.com
bushintairport.com
bushintercontinentalairport.com
buyeasyairlinetickets.com
bwiintairport.com
caracasairport.com
caracasairport.net
caracasintlairport.com
caracasmaiquetiaintlairport.com
ccsairport.com
cghairport.com
charlotteairport.net
charlotteclairport.com
charlotteintlairport.com
cheapairportfuel.com
cheapairportoffice.com
cheapchinatrips.com
cheapezairlinetickets.com
cheaptx.com
chicagoairports.net
chicagoairtrips.com
chicagointernationalairport.com
chicagoohareairport.net
chicagooohareintairport.com
chicagoohareinternationalairport.com
chicagoohareinternationalairport.net
chicagoord.com
chicagoordairport.com
chicagotairrips.com
chinaairport.net
chinaairports.net
cincinnaticvgairport.com
cltairport.com
coloradospringsairport.net
cvgintairport.com
dallasairport.net
dallasairports.com
dallasftworthairport.com
dallasftworthairport.net
dcaairport.com
dcnationalairport.com
denairport.com
denintairport.com
denverairport.net
denverairports.com
departamentosmiami.com
detroitairport.net
detroitwaynecntymetroairport.com
dfwintairport.com
dfwintlairport.com
dfwterminal.com
diaairport.com
discountfueling.com
disneyworldairport.com dtwairport.com
dtwmetroairport.com
eairportcommerce.com
easyairlinetickets.com
easyairportvalet.com
esmaart.com
eurairport.com
eur-airport.com
europeairtrips.com
everyairport.com
ewrairport.com
experiencedsecretary.com
ezaircharters.com
ezairlinetickets.com
ezairportfuel.com
ezairportoffice.com
ezairportpark.com
ezairportparking.com
ezairportvalet.com
ezbaggage.com
ezcheapairportfuel.com
ezcheapfuel.com
ezcheckn.com
ezchinatrips.com
ezeintairport.com
ezeverest.com
ezfastairports.com
ezfastairports.net
ezflightinfo.com
ezflightinsurance.com
ezjetfuel.com
ez1-touch.com
ez1touch.com
ezone.com
eztixrez.com
eztxrez.com
ezworldairports.com
fastezairports.com
fastezairports.net
fcoairport.com
fllairport.com
floridakeyshotelrooms.com
flyatlantaairport.com
flyaustraliaairports.com
flybeach.com
flybeaches.com
flybrasilia.com
flychicagoairport.com
flychinatrips.com
flydenverairport.com
flyeuropeairports.com
flymexicocity.com
flymountains.com
flynassau.com
flyoverseasairports.com
flytheretoday.com
flyusairport.com
flyusairports.com
flyusatoday.net
flyustrips.com
fraairport.com
frankfurtairport.net
frankfurtfraairport.com
frankfurtintairport.com
freeairtx.com
freeportintlairport.com
ftlairport.com
ftlairport.net
ftlauderdaleintlairport.com
ftlauderdaleintlairport.net
ftlauderdalintl.com
gigairport.com
giveutix.com
giveutx.com
givutix.com
habanacubaaeropuerto.com
hartsfieldatlantainternationalairport.com
hartsfieldatlantainternationalairport.net
havanainternationalairport.com havanajosemartiairport.com
helsinkihelairport.com
helsinkivantaaairport.com
higheverest.com
highhimilaya.com
himalayatrips.com
hkgairport.com
hkinternationalairport.com
hndairport.com
hnlairport.com
hongkongairports.com
hongkongairtrips.com
hongkonginthkgairport.com
hongkongintrntnlairport.com
honoluluairport.net
honoluluintlairport.com
hoteldelaeropuerto.com
houstonairport.net
houstonbushintercontintalairport.com
houstongbushintercontinentalairport.com
houstoniahairport.com
houstonintercontinentalairport.com
iahhoustonairport.com
iahintercontinentalairport.com
informacionaeropuerto.com
internationalairportalmanac.com
internationalairportalmanac.net
internationalairportinfo.com
internationalairportsalmanac.com
internationalairportsalmanac.net
internationalairtrips.com
interrnationalairportalmanac.com
jacksonvilleflairport.com
jetplanesinc.com
justintimeairport.com
justintimeflight.com
justntimeairport.com
justntimeflight.com
justntimeticketing.com
justntimetickets.com
justntimetrips.com
kennedyairport.net
kennedyjfkairport.com
keylargolodge.com
laairport.net
laairports.com
laguardialgaairport.com
lainternationalairport.com
lasairport.com
lasvegasairport.net
lasvegasmcarranintairport.com
lauderdaleairport.com
laxairport.com
laxtrips.com
lgwairport.com
lhrairport.com
limairport.com
limajorgechavezintlairport.com
limaperuairport.com
londonairportinfo.com
londongatwickairport.com
londongbairports.com
londonheathrow.net
londonheathrowlhrairport.com
londonlgwairport.com
londonlhrairport.com
madairport.com
madridairport.net
manchestermanairport.com
mcoairport.com
mdwairport.com
memairport.com
memphisairport.net
memphismemairport.com
mexairport.com
mexicocityairport.com
miaairport.com
miaairport.net
miaairportauthority.com miaairportauthority.net
miaairporttrip.com
miaairporttrips.com
miainternationalairport.com
miainternationalairport.net
miamiairportapartments.com
miamiairportcorporatesuitrs.com
miamiairportcorpsuites.com
miamiairporthotel.com
miamiairportlodging.com
miamiairports.com
miamiairporttransportation.com
miamiairporttrips.com
miamiairprtcorpratesuites.com
miamiapartments.net
miamiintairport.com
miamiinternationalairport.net
miamiintlairport.com
milanintairport.com
milanmxpairport.com
minneapolisairport.net
minneapolisstpaulinternationalairport.com
minneapolisstpaulmspairport.com
moscowintlairport.com
mspairpor.com
mucairport.com
mundialaerolineas.com
mundialaeropuertos.com
mundialaviones.com
mundialterminal.com
mundialterminales.com
munichmucairport.com
mxpairport.com
nassuaairport.com
newarkewrairport.com
neworleansairport.net
neworleansintairport.com
neworleansmsyairport.com
newyorkairport.net
newyorkairports.net
nrtairport.com
nyjfkairport.com
nylgaairport.com
nylgwairport.com
oficinadelaeropuerto.com
oharechicagoairport.com
ohareord.com
ohareordintlairport.com
ordairport.com
ordairport.net
orlandoairport.net
orlandointairport.com
orlandomcoairport.com
oryairport.com
osakaintairport.com
osakakixairport.com
palmademallorcaairport.com
panamaairport.com
parisairport.net
pariscdgairport.com
parisoryairport.com
paristrips.com
pbiairport.com
pbiinternationalairport.com
philadelphiaphlairport.com
phlairport.com
phoenixairport.net
phxairport.com
pittsburgairport.com
pittsburghpitairport.com
pmiairport.com
rent4cents.com
rentairportoffice.com
rioairport.net
riodejaneirointlairport.com
rockymountainairtrips.com
rockymountaintrips.com
romeairports.com
romefcoairport.com -continued

| |
|---|
| ronaldreagandcaairport.com |
| ronaldreaganwashingtonnationalairport.com |
| saltlakeairport.com |
| saltlakeairport.net |
| saltlakecityairport.net |
| saltlakecityslcairport.com |
| sanairport.com |
| sanfransiscoairport.com |
| sanintairport.com |
| sanjoseirport.com |
| sanjoseirport.net |
| sanjosesjcairport.com |
| sanjosesjcintairport.com |
| sanjosesjoairport.com |
| sanjuanairport.com |
| sanjuanairport.net |
| santiagochileairport.com |
| santiagointernationalairport.com |
| saopaulocongonhasintlairport.com |
| saopaulointlairport.com |
| sclairport.com |
| seaairport.com |
| seattleairport.net |
| seattleintairport.com |
| seattleinternationalairport.com |
| seattleseaairport.com |
| seattletacomaintairport.com |
| selairport.com |
| seoulintairport.com |
| seoulkoreaairport.com |
| seoulkrairport.com |
| seoulselairport.com |
| sfointairport.com |
| sfointlairport.com |
| shopezfly.com |
| shopnflyairports.com |
| sinairport.com |
| singaporeairport.net |
| singaporechangiairport.com |
| sjcintairport.com |
| stlouisairport.com |
| stlouisairport.net |
| stlouisstlairport.com |
| sydairport.com |
| sydneysydairport.com |
| tampaairport.net |
| tampaairportsuites.com |
| tampahotel.net |
| tampaintairport.com |
| tampaintlairport.com |
| tampatpaairport.com |
| tarmacfuel.com |
| tarponflats.com |
| telavivintairport.com |
| tokyoairport.net |
| tokyoairports.com |
| tokyohndairport.com |
| tokyointairport.com |
| tokyonrtairport.com |
| tokyotrips.com |
| torontoairport.net |
| torontoyyzairport.com |
| tpaairport.com |
| travelstopamerica.com |
| travelstopamerica.net |
| travelusatoday.com |
| travelusatoday.net |
| txntime.com |
| usairport.net |
| usairporthotels.net |
| usairportinfo.com |
| usairportinfo.net |
| usairportinformation.com |
| usairportlodging.com |
| usairportlodging.net |
| usairportrentacar.com |
| usairportrentacar.net |
| usairports.net |
| usairportspark.com |

-continued

| |
|---|
| usairportsparking.com |
| usairporttransportation.com |
| usairporttrips.com |
| usairporttrips.net |
| usairportwarehouse.com |
| usairtrips.com |
| ustrips.net |
| vegasairport.net |
| viajarus.com |
| viajarusa.net |
| viajesbarato.com |
| wapairportsamerica.com |
| wapairtix.com |
| wapairtx.com |
| wapflightsaroundtheworld.com |
| washingtonairport.net |
| washingtonairportbiz.com |
| washingtonairportoffice.com |
| washingtondcaairport.com |
| washingtondcairport.com |
| washingtondcairport.net |
| washingtondciadairport.com |
| washingtondullesairport.com |
| washingtonnationalairport.com |
| westerntravel.net |
| westerntrips.com |
| worldairportinfo.com |
| yvrairport.com |
| yyzairport.com |
| zapairtix.com |
| zaptrip.com |
| zaptrips.com |
| zrhairport.com |
| zurichintlairport.com |

The system is further programmed to utilize these domains in responding to a member's selection of a particular airport for departure and/or return flights. Also, for providing various services the system is designed to provide additional sites related to travel and passenger conveniences including restaurants and currently utilizes the following Internet addresses:

| |
|---|
| Airlineterminals.com |
| AirportConcessions.com |
| Airportdutyfreeshops.com |
| Airportindustrial.com |
| Airportoffices.net |
| Airportrentals.net |
| Airportsuites.com |
| Airportvalet4u.com |
| Airportvaletpark.com |
| Allaboutairports.com |
| Airportamericabanc.com |
| Airportamericabank.com |
| Aiportbanc.com |
| Airportbankamerica.com |
| Buyeasyairlinetickets.com |
| Cheapezairlinestickets.com |
| Cheaptx.com |
| Easyairlinetickets.com |
| Ezairlinetickets.com |
| Ezairportparking.com |
| Ezaircharters.com |
| Ezfastairports.com |
| Ezflightinsurance.com |
| Fastezairports.com |
| Freeairtx.com |
| Justintimeairport.com |
| Justintimeflight.com |
| Justintimetrips.com |
| Justntimeticketing.com |
| Lotterygivutix.com |

-continued

| |
|---|
| Rent4cents.com |
| Usairportspark.com |
| Shopezfly.com |
| Shopnflyairports.com |

As previously indicated, AA membership is obtained by simply logging in the first time and following filling out of name, address, phone, fax, e-mail, cell phone number, the member's credit card is assigned a pin number. Members receive a free e-mail if they so desire. After enrollment the AA member simply logs-on with member password and then scans Flight information and orders tickets which are delivered online via ezflightinfo.com, eztxrez.com, or 1clicktx-.com. All domain names (e.g. .coms) mentioned herein are owned by AA. If the member is cutting it close, or on the way to the airport, the member can go online or electronically communicate through a palmtop, laptop computer, cell phone, or WAP phone (WAPairtx.com, WAPairtix.com). Tickets can be printed out either at AirportAmerica Kiosks 11 (see FIG. 1) located strategically throughout the airport through a partnering with the local sponsor airport, or on a computer printer. The reservations are verified visually at the gate, or verified electronically at the gate (1clicktx, buyeasyairlinetickets, easyairlinetickets, ezairlinetickets).

If a member's plans unexpectedly change or if a flight is cancelled or delayed the member is instantly notified by an AA automatic alarm on a palm or computer, or via cellular phone on the go thru AA chip or Internet connect thru AA icon on a WAP phone. If really tight for time the member can elect to go to justntimetrips.com, justntimeairport.com, justntimeflight.com; airportvaletpark.com or airportvalet4u.com. Through justntime the member can arrange to drive to the terminal where the valet station closest to his concourse will take the member's car, check his bag, and point out the required concourse and gate. The member also can use an AA computer terminal to print out tickets and itineraries as the member rushes right to the gate. If the AA member needs a cart to expedite travel to the gate, it is there, he leaves it at the gate and it will be picked up later. All this is automatically billed to the AA member. A member can check AA for up to the minute weather en route via just 1 click to ezweatherck.com. If the flight is missed, the member can just click to ezaircharters. AA will arrange for charters from the departing airport that by agreement are on standby. The charter operators selected by AA for inclusion ensure that standby a and equipment are available based on pre-set agreements.

A member can change travel plans on the run thru use of a palm, an iCell phone 22, cell phone 17, laptop 20, or at an AA kiosk 11 and/or connectors provided at the airport (for example—ATL). The member can obtain a text confirmation at an AA kiosk 11 (computer printout) or at a gate airline link.

The member can have rent-a-car pickup and return at an AA affiliate valet stand. The valet will have a car ready at a destination airport valet stand when the AA member deplanes in a destination city. The valet gives the member an AA stub. At the end of the trip the AA member may opt to leave the rent a car at the valet stand airportvalet4u.com. All AA affiliated airport hotels and suites must provide pickup and return of AA member and luggage.

For reserved parking in the building, AA e-mails to the member the location of the reserved parking spot, for example, "North daily 3$^{rd}$ level, any of spaces 45-56."

Through use of AA's Cartracker, a member can scroll thru a parking garage map displayed by AA on a monitor, permitting the member to, by palm, iCell phone 22 or cell phone 17, mark the location in the parking building. Upon return to a home city, and while going to the parking garage, a member can just scroll through maps of parking structures to locate a blinking light on iCell parking garage map indicating the location of car. In one embodiment, an infrared beam crosses reserved parking spaces. The beam is released by the member inserting their AA pin number in a key pad on adjacent stanchion, otherwise interruption of the beam sets off the alarm. Release of the beam is sent to an affiliate's computer in the garage, and sent on to AA local web parking page. When the member plugs in a pin number that disengages the beam, such action notifies the parking garage computer that the space reserved for the member is occupied by someone else. If a nonmember drives a car in the space the interrupted beam sets off an alarm.

An AA member is also eligible for lottery and AA points toward freeairtx.com, freetix.com, and giveutx.com and can collect visa miles for AA affiliate purchases in addition to the discounts.

A courier delivery service can be used by a member to retrieve needed merchandise from local stores for delivery to a hotel or airport (subcontractors/affiliate).

A member can order a personal valet to directly pick up baggage, and drive the member to an airport from a hotel, and assist with check in.

As previously indicated, a member can connect to AA semi-official websites of the world's major airports (which are AA owned and controlled domains). AA owns at least one and usually several of the most common domain names of the fifty or more busiest airports in the world, each of which is cross-linked so that reference to any portion of an airport name by an AA member will lead to the web site and to an AA portal through metatags. AirportAmerica is the portal to domestic and overseas AA owned websites.

Members are provided discounts via AA bids to affiliates who provide rent-a-car, hotels, apartments, temporary office suites, restaurants, travel packages thru AA owned websites such as rent4cents.com, ezairportoffice.com and cheapairportoffice.com.

AA provides Airport Facilities Information to members via pull-down menus or choice communication for the following (this list may be expanded):

A. Airline lounges

B. Conference Center

C. Financial Services—AA sponsored ATM, cash advances on credit cards, travelers checks, money orders, foreign currency exchanges, ATM D. Locker Rental E. Lost and Found F. Parking G. Post Office H. Visitor Info I. Information translated into passenger's choice of 7 languages A unique function provided by the AA system is STANDARDIZATION—a complete range of services available in each member airport set out in the AA web site credited to that airport, are linked like spokes of a wagon wheel to the AA hub/portal. The AA portal is the brains, the operations center (OP. Center) and the clearing house. The OP. center continuously updates all information, individual of member airport websites, and maintains and continuously improves the website for the benefit of the airport. When a member logs on to the site the airport gets primary billing at a fraction of the cost of attempting to maintain such a site itself. All services listed are available at all AA airports.

Queries are instantly transmitted to the AA OP Center via interactive computer-Kiosks 11 at the intersections of concourses, and gates and other strategic high traffic areas of the terminal. For example, assume a 1-800-400-1024 connection to AA for cell phone users for Ft Lauderdale (FLT), weather, and other information providing reservation and, ticketing information. Any other areas can be simultaneously connected. Thru affiliate relationships with companies in the cutting edge of WAP technology, iCell and cell phone access will become the Internet access for mobile links to AA, and all information a member requires while on the run. AA stores the information accessed thru pin numbers or cookies.

Figure 22:
FIG. 22 shows a diagram of a boarding pass for an AA member.

Printouts of justntimeticketing.com can be obtained by downloading to the 3"×3" wireless printer which can be clipped to the waist or printed while in briefcase, at AA interactive remote-Kiosks 11 located at the intersection of each concourse and terminal and/or out in concourse or local airport information center. An example of an AA e-ticket 202 is shown in FIG. 22. Note that the coded marks 204 to the right of the "Flight:" number provide a security clearance means for a member to obtain fast security screening or checkout.

AA Pre-Clearance—this is an important part of the AA seamless airport and air travel concept. Seamless connotes without bottlenecks. One of the major annoyances of the airport experience is the holdup at security when going from the central terminal to board the flight, so eliminating this delay helps to promote the AA seamless argument. Pre clearance involves AA as an agent for the FAA. AA conducts a sufficient inquiry of those members who elect this aspect of membership to enable AA to provide adequate information to the FAA to conduct a thorough security check, in order to obtain an expeditious security clearances to bypass or breeze through security.

As indicated, AA expedited pre-clearance is the key to a member obtaining expedited Access through security to the gate. This is accomplished by an FAA approved pre-clearance security check of an AA member who volunteers for the Fast Security Check Program as a result of the AA member filling out an AA Electronic Personal Security Questionnaire [ESPQ] which is then submitted to the FAA. Upon approval by the FAA of the member following computer investigation, the AA member will be eligible for preflight implementation of pre flight security clearance through a security checkpoint to the gate which is evidenced by an encrypted code 204 or security stamp on e-ticket 202 (see FIG. 22).

The questionnaire requires:

Member name,

Address,

Phone numbers,

Social security number, photo, and electronic finger and face print for identification.

This ESPQ form provides fast encrypted security verification for each trip based on computer update of ESPQ. This usually results in pre-clearance, and the AA member just walks through the unmanned automated security gate. As the bar code 208 on the AA member's e-ticket makes contact with the infra-red beam at this unmanned station, the automated gate opens. The AA member goes through the security station en route to gate.

In the alternative, the AA member presents the e-ticket with encrypted security code or stamp to an attendant, who verifies through a computer check by passing a wand over the e-ticket bar code 208. If the AA member passes this five to fifteen second process, the AA member is waived through a manually operated Green Lane, thus bypassing any queue or hold up at the security checkpoint. Approval gives clearance and the levels of access through Green Lane.

Note that AA provides the system with domains associated with pre-clearance. For example, Preclearsecurity.com, and Fastsecuritychek.com are provided.

Figure 23:
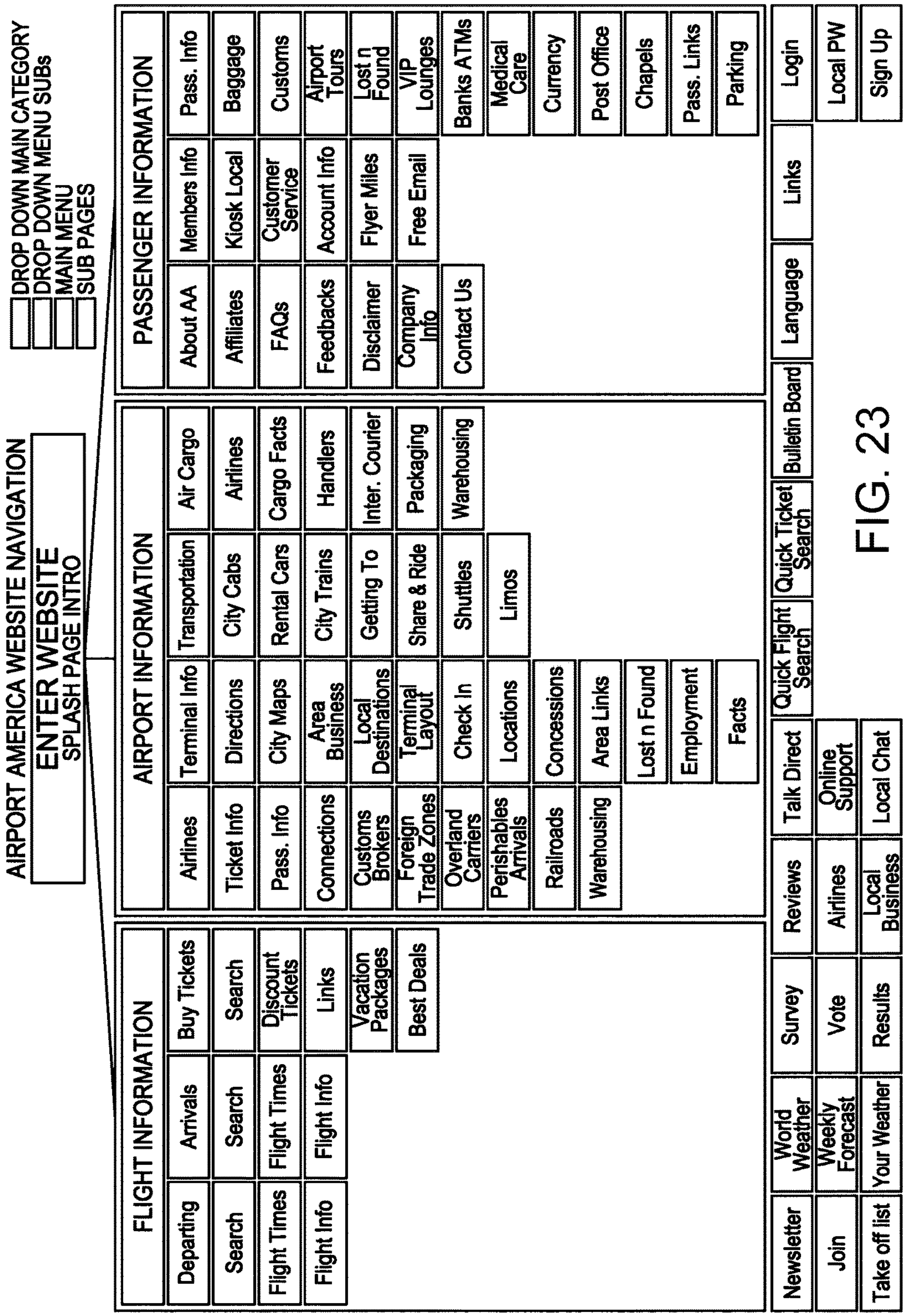
FIG. 23 shows a flowchart detailing a method for inputting and obtaining information from the system.

FIGS. 3 through 17 show examples of pull-down menus available to a member for obtaining desired travel information and making reservations. Other pull-down menus can be configured for expanding the usefulness of the system. FIGS. 23 and 24 show additional views of the sort of information that may be provided as part of the standard web site.

An example of an AirportAmerica (AA) member utilizing the present system to make his/her airport, flight and travel experience easier, faster, cheaper and friendlier, will now be given. It is the inventor's understanding that the following combination of unique and non-obvious features provide what no other airport site is currently offering. AA owns at least one .com domain name of every major (top 50) airport in the world and of the largest five or ten AA owns several. For example, Atlanta: Atlantahartsfield.com, atlantainternationalairport.com, atlintlairport.com, Hartsfieldatlantainternationalairport, atlhartsfieldairport.com, atlinternationalairportcom, atlhartsfieldintlairport.com and atlintairport.com are all separate AA owned domain names. They will be separate-linked web sites, all linked, and all leading to the AA portal. The links are the spokes to the hub: AA is the hub. Each Atl web site or any combination of words for that airport through meta-tags, etc, will lead to the standardized Atl website, and then to the AA portal. For example, say an AA member, Bond is his name, is in the company office in Cincinnati, who at 4:00 pm notices that a conference for the Americas is starting today in Miami and a member of the Chilean delegation is speaking tomorrow a.m. is the business contact he has been trying to reach in Chile. He normally could never make a flight to attend.

Bond can attend through use of this AA membership. He clicks to AA, goes to "C" for Cincinnati in the "Departing Airport", and "M" for Miami for "Arrival Airport" and obtains all of the flights for today. In luck, there is one last flight leaving in just over one hour. Bond runs down to the parking garage, jumps in his car and takes out his iCell phone, and using voice recognition says "Internet", then "AirportAmerica Depart CIN after 4:00 pm today Arrive MIA today." AA responds "you are booked business class, aisle 24*b*, as is your preference Mr. Bond (from profile on file) you may proceed to concourse "A, gate 4" to pick up your ticket (with AA the maximum discount is automatically credited), and board or get a printout at any AA kiosk 11, one is located at the information booth or in the terminal at the intersection of concourse A. Do you wish to go ezairportparking.com or aaavalet.com? If you select ezairportparking.com north daily is open, but we notice it is less than one hour until your departure, we recommend aaavalet.com" Bond clicks ezparking and requests expedited as an option in justintimeairport.com. He then clicks on up to the minute traffic map to the airport and sees a bottleneck flash on the interstate, exits around the fender bender, pulls up to valet fifteen minutes later and leaves the car. He is pre-cleared through security by hand wand by security personnel at valet who have been notified that he has elected expedite. The security person accompanies him through the security bypass and around those long lines, and he then places his briefcase and hand luggage in a waiting AA cart and proceeds to board just in time. He then settles in the seat, but before turning off his electronic equipment, he orders the I-phone or WAP phone to have a club limousine waiting at MIA, and to make reservations at the closest airport suites hotel, and bids $75 for one bedroom with a computer port. In a few seconds a confirmation number appears with the AA discount built in. He then commands Miami downtown restaurants. In a flash a list of preferred restaurants and a rating for price and quality appear. He picks the Biltmore in the expensive category because the conference is there and he can have a drink. He makes rez.com for 8:30 P.M. Bond arrives in Miami, flicks on the iCell, reviews the e-mail and finds the Black Lincoln town car club limo is waiting upstairs concourse B at the AA valet stand. He stops at the AA kiosk 11 near his gate, selects general information from the home page, and then clicks terminal layout. He locates the AA valet at Concourse B. Bond then puts in his AA trip PIN number and in a few seconds receives page one of hard copy of a reservation at Airport Villas with a map and a note that an AA travel pac (drop kit) is in his room. Page 2 of the printout confirms the Biltmore. Page three confirms the Ralph Lauren blue dress shirt, underwear and socks he ordered from AA "airportvalet4u.com" will be delivered to his hotel by "airportvalet4u.com" courier by 7:00. p.m. If he has any questions the driver's cell number and store location and telephone number are included.

The AirportAmerica system establishes a set of standardized, user-friendly airport information templates and websites. Uniformity creates familiarity that makes for easier, faster member and public use of the aa-airport websites. (every airport that is a member of AA is provided an AA website that is for the most part identical to all other member airport websites and still incorporating unique features and services, etc. of that airport. AA encourages conformance with AA template). This can be seen in FIGS. 23 and 24.

As previously indicated, AA membership is obtained by simply logging in the first time and following filling out of name, address, phone, fax, e-mail, cell phone number, the member's credit card and/or debit card is assigned a pin number. Members receive a free e-mail if they so desire. After enrollment the AA member simply logs-on with member password and then scans Flight information, orders tickets which are delivered online via ezflightinfo.com, eztxrez.com, 1clicktx.com. All .coms mentioned herein are owned by AA. If the member is cutting it close, or on the way to the airport, the member can go online or electronically communicate through a palmtop, laptop computer, cell phone, WAP phone (WAPairtx.com, WAPairtix.com) or iCell/smart card. Tickets can be printed out either at AirportAmerica Kiosks 11 (see FIG. 1) located strategically throughout the airport through a partnering with the local sponsor airport, or on a computer printer. The reservations are verified visually at the gate, or verified electronically at the gate (1clicktx, buyeasyairlinetickets, easyairlinetickets, ezairlinetickets).

If a member's plans unexpectedly change or if a flight is cancelled or delayed the member is instantly notified by an AA automatic alarm on a palm or computer, or via cellular phone on the go thru AA chip or Internet connect thru AA icon on phone device. If really tight for time the member can elect to go to justntimetrips.com, justntimeairport.com, justntimeflight.com; airportvaletpark.com or airportvalet4u.com. Through justntime the member can arrange to drive to the terminal where the valet station closest to his concourse will take the member's car, check his bag, and point out the required concourse and gate. The member also can use an AA computer terminal to printout tickets and itineraries as the member rushes right to the gate. If the AA member needs a cart to expedite travel to the gate, it is there, he leaves it at the gate and it will be picked up later. All this is automatically billed to the AA member. A member can check AA for up to the minute weather en route via just 1 click to ezweateherchk. If the flight is missed, the member can just click to ezaircharters. AA will arrange for charters from the departing airport that by agreement are on standby. The airport displays charter information on the flight schedule monitors.

For the convenience of AA members, AA maintains one or more lounges in each airport with an AA liaison who operates as a local liaison with the airport and as a personal concierge to AA members.

A member can change travel plans on the run thru use of a palm, an iCell 22, cell phone 17, laptop 20, or at an AA kiosk 11 and/or connectors provided at the airport (for example—ATL). The member can obtain a text confirmation at an AA kiosk 11 (computer printout) or at a gate airline link.

Information Management

In order for a user to have access to the present system, the user must first enroll on the system. As described in greater detail below, the user has the prerogative to provide varying levels of detail as part of both the enrollment and subsequent modification processes. Any information not initially provided by the member can later be added to the profile. Information may be deleted as well. In doing so, the user must provide some identification information for the profile, at least to the level of the minimum-mandatory information in order for the member to be classified as an AA certified traveler. The minimum-mandatory information is the minimum level that can qualify an AA member to be certified. The amount of information that constitutes minimum can be adjusted over time by the administrators of the AA central server. Beyond the minimum standard, the member may elect to submit to additional security scrutiny and testing in order to obtain a higher gradation level resulting in a more seamless travel experience. Enrollment also includes providing the system with personal data used to facilitate travel management.

The profile includes such information as name, address, telephone number, email, credit card and/or debit card information, desired class of air travel (e.g., coach, business, first class), airline carrier preference, seating preferences, travel time preferences, meal preferences, self park or valet parking, hotel preferences, rental car preferences, hologram animation of the applicant's face, full face profile, five second 360° facial video which over time may be extended to show prominent distinguishable features, retinal scan, fingerprints, facial scan, distinguishing marks, DNA, and so forth, all of which will be encrypted. A record of the user's profile is stored in a central memory of the system as discussed below. The user receives a PIN number for access to the system.

The system manages personal information for multiple purposes to expedite and facilitate the travel experience. For example, personal information such as travel preferences and credit card and/or debit card account information is stored to facilitate expedited reservation services that would otherwise require the member to provide large amounts of data for each transaction. Other personal information is stored and usable by security personnel to expedite security clearances. Some of the personal data that can be stored on the central AirportAmerica systems are:

- Name, addresses, phone numbers and emails
- Travel preferences
  - Class of service preference
  - Desired class of air travel (e.g., coach, business, first class)
  - Desired fare information (lowest fare with restrictions, least restrictive fares)
  - Typical departure airport preference
  - Travel criteria information (scheduled airline preference, non stop only, equipment type, airport gradation/level, etc.)
  - Priorities for travel recommendations and automatic booking
    - Gradation/level of participating travel companies
    - Method of travel (air, sea, car, bus, etc.)
    - Number of stops
    - Company preferences (American Airlines, Amtrak, etc)
  - Travel time preferences
  - Meal preferences
  - Car preferences
  - Hotel preferences
  - Frequent flyer data organized by Airline
  - Frequent traveler data for other travel providers (car, hotel, etc.)
  - Frequency of travel (also beneficial for sharing with airport parking facilities)
  - Preferred method of travel to or from the airport (self drive via private car or travel via bus, train, taxi; this information is useful to help forecast needs for auxiliary services such as parking facilities.)
  - Self park or valet parking
  - Rental car preferences
  - Other means of travel, i.e. train, short hop via car, limo, etc.
- Special Needs and Emergency Needs
  - Emergency Contact Information (e.g. Doctor, Lawyer, Wife, Husband, Father)
  - Special needs such as wheelchair, seasickness, underwater pressure, diet, etc. The system will capture any ADA supported needs honored by the airlines.
- Updateable Contact Information
  - Contact information that may vary based on traveler's current travels. For example, the name and phone and email of the person who the traveler is meeting can be input and updated as needed.
  - The updateable contact information plays a key role in ensuring that the appropriate people impacted by modifications to the traveler's travel plans can be notified via the reliable messaging process that is provided by the AA system.
- Biometric information
  - Hologram animation of face
  - Retinal scan
  - Fingerprints
  - Facial scan
  - Distinguishing marks
  - DNA The data that a member provides to AA is private and cannot be shared in its pure state with anyone without express permission by the user. There is an aggregation/demographic layer which rolls up the information provided for the purposes of gathering overall statistics of the utilization of the system. So, a member's passport number is not shared but the fact that this member is a U.S. male citizen between the ages of 40 and 50 may be useful to gain a better idea of the behavior patterns of the membership and also to provide a means for future targeted promotions of potential members. The travel preferences may also be beneficial in terms of gathering an understanding of areas that could be of greater value to the AA member. This provides the basis of the data that may be required in support of a "light" Customer Relationship Management. This system allows AA to preserve a respect for privacy while enabling information gathering for statistical purposes Each member's identification and authentication information is stored on the OneTouch issued to the member, as discussed below, and at the central memory or database in order to provide for a three-way security match and to insure against tampering with the OneTouch device. The central computer or server provides access to the web pages and other data stored in the memory of the system. Secure information is protected for the privacy of the members. Such information is available only by way of reference to matching data but not to directly access the secured information itself. To verify the identity of a member, the AA system may be accessed to confirm that the presented information matches the identification information in the central database and that the member remains in good standing. The central server, however, does not release identification information during this process. The physical identification exercise at the gate makes the minimum three-way match. If the security worker is not at the gate, a security worker may view the process remotely through multiple cameras mounted on the cart as the passenger goes through the security check at the gate and as the carry-on is scanned. This security check is fast because the AA member has trip pin information, radio transmitted information, and bar code and ticket number.

The additional identification information makes the matching of a member bag to the member an easier, faster process. This feature contributes to the faster boarding process for the member, requiring less lead-time at the airport. The match is quickly made between the member, the seat on the aircraft and the bag in the hold.

For added security, all of the communication between the system central server, kiosks, smart cards, and the web-site is always encrypted such as by means of a two-way SSL (Secured Socket Layer). Using two-way SSL allows the central server and the various clients to authenticate each other to make sure the clients are in fact communicating with the authentic system central server and the central server is in fact communicating with the specified client. In addition, all data sent back and forth between client and server is encrypted so that devices not meant to view the data cannot understand or alter the data. Furthermore, the system stores member passwords only in an encrypted form. The system can check a password for a match by encrypting the password with the same key that encrypted the stored password. The system then compares the two encrypted passwords for a match.

Gradation

Figure 25:
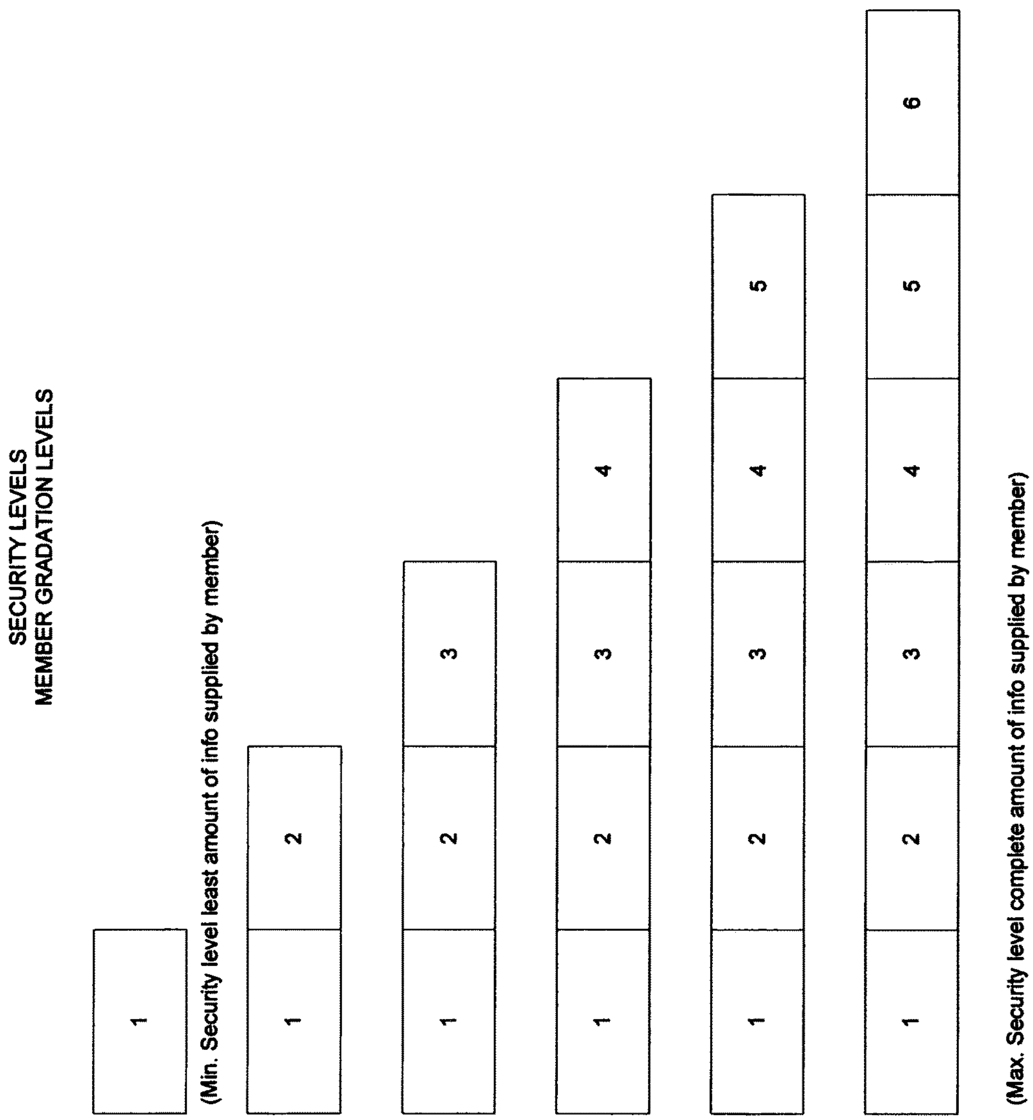
FIG. 25 shows a diagram of gradation levels for AA members indicating various levels of security levels that the AA member agrees to provide.

The system is of a flexible design that permits operation at a number of levels of personal information. These levels apply both to individual members and to travel facilities that integrate with AA. Examples of such travel facilities include airports, airlines, ports, terminals, security agencies, hotels, car rental agencies, charter companies, railroads, stations, taxi services, limousine services, bus lines, depots, ferries, and other travel provider facilities. The flexible levels of compliance for using personal information in the system are referred to as Gradation. Members may provide more or less information and in turn will meet the requirements of higher or lower compliance levels. FIG. 25 shows the various gradation levels with 1 representing the minimum amount of mandatory information and 6 representing the highest level. The actual set of gradations may vary and is system configurable. As discussed in further detail below, the member's OneTouch is able to display the gradation or security level that the member has obtained. The members receive benefits based on their level of compliance. Gradation levels for facilities are based upon how well the facility integrates with the AA system; a facility achieves a higher gradation level by having in place policies, procedures and technologies that will properly use and safeguard the information of each compliance level of the system to enhance the individuals travel experience.

This travel management system provides gradation levels to each individual member and to each participating facility or service provider. The gradation levels are also assigned to travel facility employees and other workers on the travel facility such a vendor's and vendor's employees. As seen in FIG. 25, the set of gradation levels also varies for the participating facilities or service providers. A level of ranking for airports and passenger is similar to distinctions used today for hotels (a five star hotel versus a three star hotel), and airline classes of service (first class, business class, economy). The concept of gradation introduces a new AirportAmerica ranking—the more sophisticated the airport in terms of integration with the AA system, adaptation of the technology, and the streamlining of the processes, the higher the ranking that airport achieves. The same gradation applies to passengers—those who have passed the criteria on a greater set of criteria will have higher rankings than those who simply complete the minimum mandatory requirements of information. For example, a passenger may be willing to provide some but not all requested membership information. The more information that is voluntarily provided by a passenger, the faster the processing time is likely to be, but nonetheless the level of information provided is a personal preference of the individual member. In applying compliance levels to facilities such as airports, it is likely that some airports may be more nimble and able to adapt the technology infrastructure than others. It is likely that not all participating airports will be able to take advantage of all the technological advances facilitated by AirportAmerica at once. The use of Gradation introduces a spectrum of the amount of information and capacity to utilize the data. Individual members attain a higher level of certification based upon degree of individual disclosure and submission to governmental scrutiny beyond the minimum mandatory level of scrutiny. Airports and other travel ports can attain different levels of AirportAmerica certification. These levels of certification, referred to as gradation, are based upon the airport or travel port's equipment, data utilization, and so forth.

The various grades that are available will be both color coded (gradients of green where light green is associated with least amount of data or Level 1 and dark green is associated with the maximum level of data or Level 2) as well as identifiable by a numeric value associated with the level of certification. Gradation and Level of Certification are synonymous as used in this document. The level of gradation will be indicated on the member's OneTouch as a color and/or number.

From a travel provider or facility perspective, the certification process will be a source of pride for the facility. The certification level provided to a facility (i.e. airport, port, etc.) is another parameter upon which a traveler may base his or her decision to travel. A traveler may select an airport that carries a darker shade of green or greater level certification than one that is not certified at all or one that has a lighter shade of green or lower level of certification. This gradation information allows travelers to base their flight plans around which airports will make their travel easier by making the most use of their AirportAmerica membership. The certification-level data will be shared with a number of the Global Distribution System providers (such as Sabre, Worldspan, Amadeus, Galileo) as well as the variety of Internet based booking engines (such as Travelocity, Expedia, Orbitz and others of similar function). Thus, flights can be prioritized based on criteria such as "1-Non Stops First, 2-Highest Level of Certification Airport" (applies particularly to multiple airport cities such as the choice among LGA, JFK, EWR in metropolitan New York City). Knowing the certification levels or gradation levels of travel facilities and providers (such as airports or charter operators) enables the traveler to include this criteria in determining what is important to him/her in his/her travel. Different travelers may order the priority of these factors differently: to one person, gradation level of airport may be extremely critical, placing that factor as the top priority, while the second priority of may be direct (as opposed to connecting) flights.

Data is stored at the AirportAmerica central servers, available as an interfaced data record to other systems, and on a device such as a OneTouch that individual members possess. The OneTouch of the present invention will be discussed in further detail below. The following table shows examples of gradation levels. Level 0 is considered no integration with the AirportAmerica system.

TABLE 1

Example Components of Airport gradation levels

| Level | Associated Color Gradient | Description |
|---|---|---|
| Level 1 | Lightest shade of green | Kiosks are available in the airport which automatically logs OneTouch holders in<br>Ticketing and gate agents verify identity by looking at the OneTouch instead of for example a driver's license |
| Level 2 | Kelly Green | Curbside check-in, ticketing agents and gate agents can verify traveler and get traveler's information by swiping OneTouch<br>OneTouch can be used in place of a passport (passport information is located within the OneTouch) |
| Level 3 | Darker Green | Security clearances make use of facial scans and security scores |
| Level 4 | Darkest Green-approaching charcoal | Security clearances make use of fingerprints and retinal scans |
| Level 5, 6 | | Additional levels for additional system configurations |

TABLE 2

| Example Requirements for Individual Traveler Members Gradation Levels | |
|---|---|
| Level 1 | Signed up with a simple name-based membership having taken a hologram picture for the OneTouch |
| Level 2 | Passport information is stored with AirportAmerica |
| Level 3 | Facial scans are stored with AirportAmerica<br>Criminal and credit history is accessible by AirportAmerica |
| Level 4 | Fingerprints and retinal scans are stored with AirportAmerica |
| Levels 5, 6 | Additional accessibility of information. |

The data to be collected about each member can be controlled on a member-owned basis. The member application requests many data elements. The data elements are either mandatory or optional. To attain a certain level of certification or gradation, each member is encouraged to complete as much information as possible. Mandatory elements will be stored in a secured, encrypted manner on the AirportAmerica Central Server. In addition to storing data that is also stored on the central server, the AirportAmerica member has an opportunity to store locally accessible data under "My Data Chip" that is available exclusively within his OneTouch discussed below or other devices with which the member may use to interface with the AA system. This unique concept can guarantee additional privacy of certain data elements of a person on a per-person basis. The "My Data Chip," as discussed below, stores data locally, (i.e. in the physical possession of the member) and not on the central server. The data stored in the "My Data Chip" is not included as part of the security level earned by the member. The data stored under "My Data Chip" is designed for personal, supplementary information, such as emergency phone numbers, pin numbers to certain favorite Web sites, passwords to particular financial entities, but not dynamically changing information such as passport or visa. The Gradation Level provides which level the member voluntarily selects to be included in. The higher the gradation level, the higher the level of expected benefits and level of expedited processing that member can anticipate. An example of an individuals member data profile is shown in Table 3.

TABLE 3

Representative Individual Member Data Profile

| Reference Number | Data Element | Example Value | May be Stored in central AA server? | Gradation Level |
|---|---|---|---|---|
| | | Level 1 Gradation | | |
| 11 | LastName | Bond | Yes | 1 |
| 12 | FirstName | Sharyn | Yes | 1 |
| 13 | aaPassword | &&**^^%%$$ | Yes | 1 |
| 14 | aaPasswordHint-What is the Name of your pet? | Bikky | Yes | NA |
| 15 | PassportNumber | 1234589999 | Yes | 1 |
| 16 | Nationality | USA | Yes | 1 |
| . . . | | | | |
| | | Level 2 Gradation | | |
| 20 | HologramHologram Picture | Image . . .☺ | Yes | 2 |
| . . . | | | | |
| | | Level 3 Gradation | | |
| 31 | Criminal Background: USA | No Record | Yes | 3 |
| 32 | Criminal Background-Interpol | No Record | Yes | 3 |
| 33 | IrisScan | Iris Scan data | Yes | 3 |
| . . . | | | | |
| | | Supplementary Data | | |
| 41 | PersonalCredit Card1Main- | MC-- 5555444466667777 | Yes | 2 |
| . . . | | | | |
| 42 | PersonalCreditCard2- | VI4444555566667777 | No | NA |
| 43 | My IDs and Passwords | Place to store required IDs and passwords for systems not fully integrated with AA | No | No |
| . . . | | | | |

Table 3 shows data elements and example values for representative data that is provided to the system by an individual member. For each data element the gradation level and whether the individual member has provided permission for the data to be stored in the AA central server is indicated. For example, at data reference number 13 shows that the member has opted to enable the central server to keep a copy of her password. As a result, if she loses her password, it can be re-supplied to her. The password hint at reference number 14 would not be requested had the member chosen to permit the system server to store the password. Data may be stored that is not required to achieve a gradation level from the system. For example, at data element 41 this individual member has opted to store her main credit card and/or debit card information to facilitate purchases. She has also opted to store another credit card and/or debit card information on her personal OneTouch but not to share it with the central server. This choice does not impact her gradation level.

The gradation level of an individual member and of the facilities and service providers he potentially may use is an extra component for scheduling travel arrangements. The AirportAmerica system will choose routes which are the most affordable, fastest and most convenient according to the member's preferences, located in the member's profile. If a traveler and an airport have a high gradation level then that traveler would be considered a lower security risk and that airport would be labeled by AA as a higher level. In all likelihood, a higher gradation level member will seek the higher gradation airport as his preference for travel. The priorities of these components to scheduling will be determined by the member.

The AA service performs detailed verification in signing up and certifying smart card holders. Accordingly, authorities such as governmental, quasi-governmental or other security organization in transportation facilities are able to identify properly verified OneTouch holders as minimal risk. The risk of a AA member who has reached the highest gradation level, in particular, presents the most minimum of the risks. It is anticipated that the service will conduct background checks, secure information, and verify identity using procedures that permit the service to be certified, licensed or otherwise recognized by security organizations as providing reliable information. The system pre-clears its members and verifies their security profiles, identification information, and ticketing information to a degree higher than airport standards. Therefore, airports can give preferential security treatment to the AA i-card or certified OneTouch holders. This special treatment may include providing special lines for security checks on OneTouch holders. These lines are much quicker because the security check needs only require a retinal or fingerprint scan. In addition, the system immediately identifies fraudulent use of a card. If the identity of the card holder does not match the information stored in the system, the system immediately notifies authorities at the location of the fraudulent use of the card so that the fraudulent card holder may be detained.

OneTouch

Figure 26:
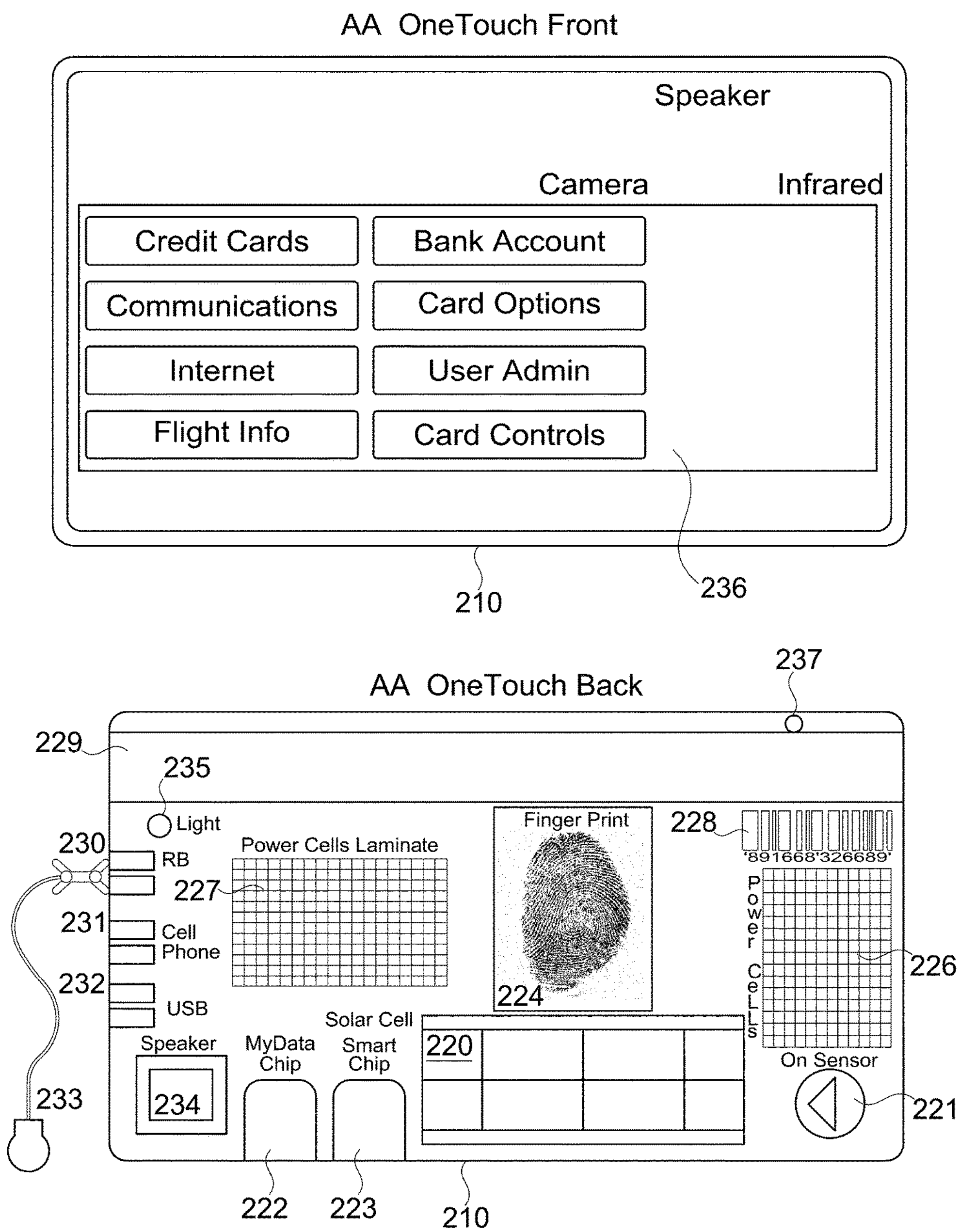
FIG. 26 shows a diagram of the various components of an OneTouch and a view of the front and back of the OneTouch.

A member can interact with the system by using any compatible portable access device. In this preferred embodiment an electronic wireless smart card 210 as shown in FIG. 26 is used. A preferred embodiment of this access device is referred to herein as the OneTouch. The OneTouch is provided by the service to member. The OneTouch is also provided to those workers who have access to secure areas of a travel facility. The OneTouch shows that the cardholder is a member and a safe and capable traveler with varying degrees of certification/gradation. The OneTouch is a flexible laminate, with a thumb recessed area on the back of the card that enables a non-OneTouch ATM card or credit card to be removed from the OneTouch case for use by older devices that cannot work with the more advanced OneTouch.

On the back of the card is located a programmable magnetic strip 229, a fingerprint image 224, power cells 226 and 227, a speaker and microphone 234, a solar cell 220, an "on" sensor 221 (aka "on" button), mydata chip 222, AirportAmerica smart chip 223, a bar code 228, a ringer and beeper 230 a cell phone connection 231, a data port such as a USB port 232, and a light 235.

The front of the card includes a camera 237 and a display screen that is incorporated into the full face of the card 236. The top edge of the card contains a projection device that can display a virtual keyboard on any flat surface. The card has a flexible, embedded polymer composite, ultra thin film transistor screen display, polymer silicon back-pane, and flexible circuits. A low temperature, organic, light emitting diode provides the technology platform with low profile miniaturized transistor stacks. The hardware can be flexed without damage; thus, the AA-member can put the card in his wallet without fear of crushing or otherwise damaging it.

Figure 28:
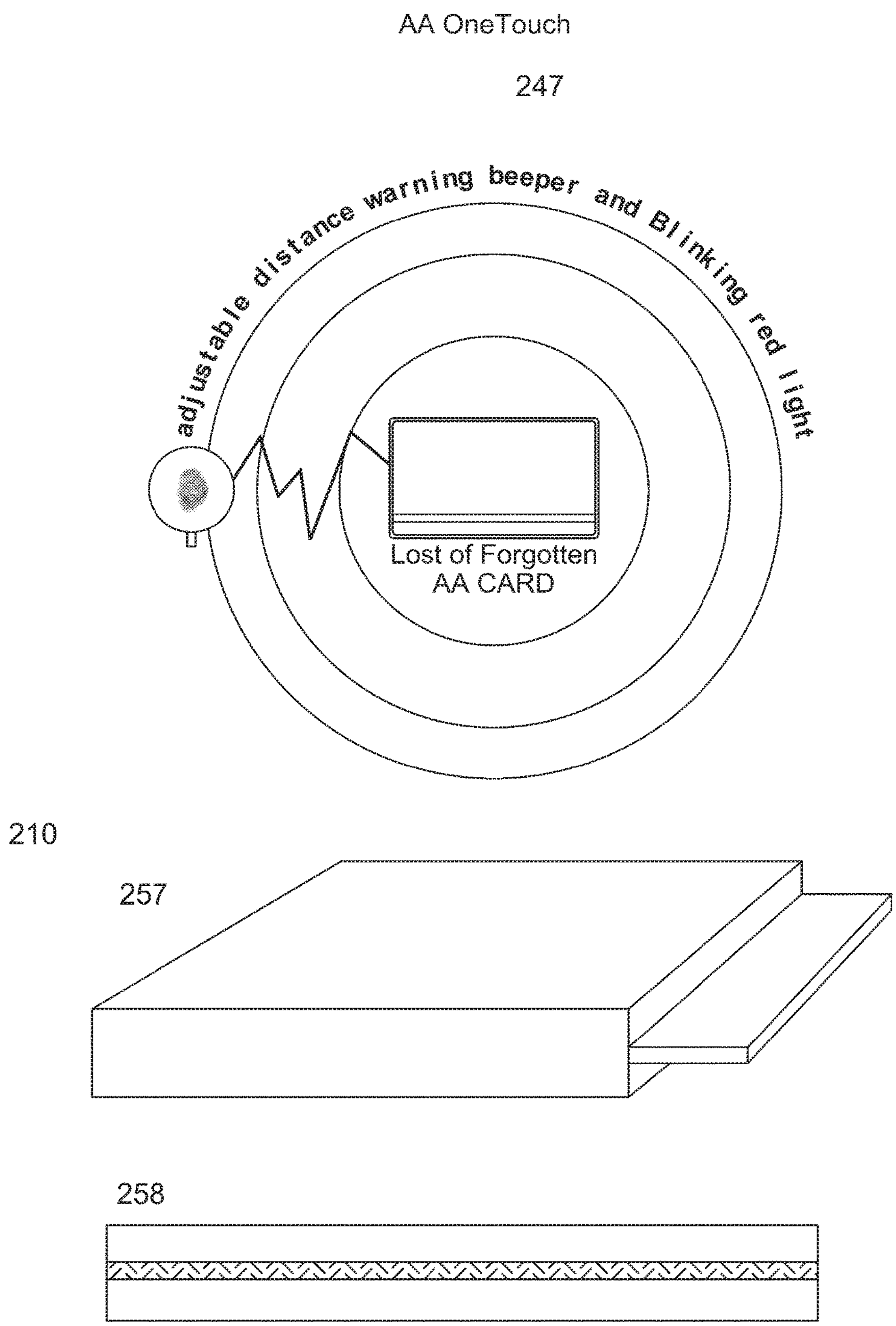
FIG. 28 shows a device that may be attached to clothing or anywhere else that beeps/rings if the OneTouch has been lost or misplaced.

The card may be structured like a sandwich. The top layer of the flexible sandwich contains the screen and the bottom layers the power source including the batteries. The optimum dimension of the sandwich is just slightly larger than a standard credit card and about six times as thick. The flexible sandwich may thus be seen as being made up of six layers each similar in size to a credit card. As shown in FIG. 28, a layer of the card may slip out of the sandwich that is the size of a credit card. The layer may be used in a credit card or ATM machine. Other layers may also be removable. For example, the OneTouch may include a removable layer that includes an identification transponder. Such a transponder could be left in the members car in a parking lot and then used to locate the car upon return of the member through communication with remaining layers of the OneTouch which the member carries. There are several ways to enable the release of one of the cards within the encased OneTouch. When the card is released, it can come out for use by older systems that cannot accept the size or technology of the OneTouch card.

Power Cells. The power cells 226 and 227 are rechargeable lithium ion batteries or similar sized batteries of other materials that clip or are embedded into or onto the back of the card. Because of the very low power requirements of the OneTouch due to its size, the batteries are very thin. In another embodiment, the batteries can be recharged in three or more ways. First, a solar cell 220, located on the back of the OneTouch, supplies power and recharges the battery. Second, the RB (ringer/beeper device 230 and 233), explained in more detail below, can clip onto the OneTouch and provide power to it when the ringing device is plugged into a power outlet with an adaptor cable. Third, the ringing device has an additional built-in battery.

Figure 27:
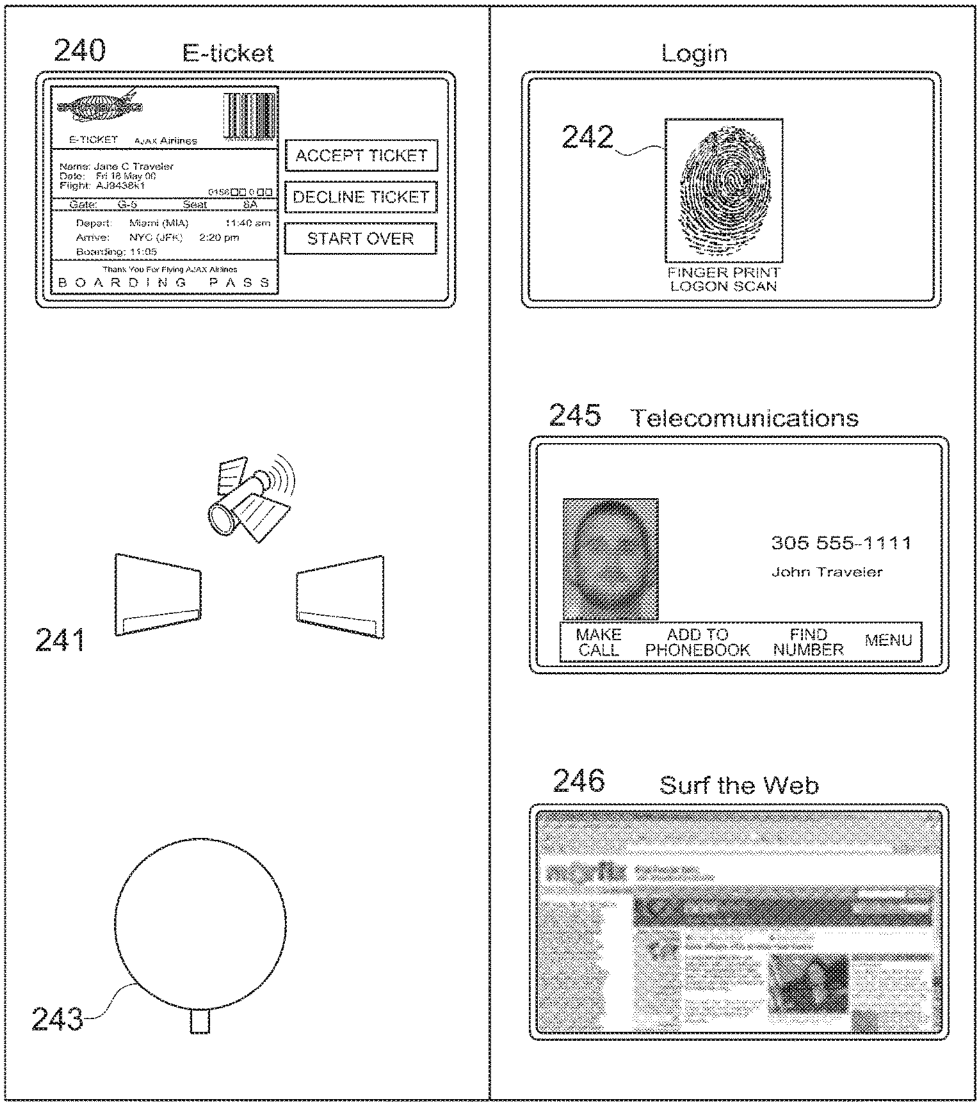
FIG. 27 shows additional screens of the OneTouch as well as how the OneTouch can morph into multiple views.

Display Screen. The display screen is flexible, durable, thin and requires very little power. Electronic ink technology can be used in place of a traditional LCD screen. This technology allows flexible screens taking up only half the thickness of the OneTouch. The screen allows the OneTouch to change the appearance of the card, as shown in FIG. 27. For example, the screen may display ticket information 240, login commands 242, stored information such a phone records 245, and web-pages 246 including those provided by AA. The screen allows the OneTouch to provide the information regarding the traveler and the traveler's plans at the time that it is required. For example, access to information on the OneTouch is secured as discussed below, accordingly OneTouch may function as a passport or other identification card by using the screen to display secured passport data stored in the OneTouch chip as described below.

Power consumption is reduced considerably when compared to a traditional LCD screen. An LCD screen requires a lamp to provide light from behind the screen, typically known as a backlight. Electronic ink doesn't require a backlight. Additionally, once a pixel is charged it no longer needs power. So if the display needs to display a specific image, like the front of a credit card, for an extended period of time, very little power will be drawn.

Keyboard. In one embodiment, the OneTouch uses a roll-up keyboard, such as the keyboard available from Think Outside, Inc., 5790 Fleet Street, Suite 130, Carlsbad, Calif. 92008. Alternatively, the OneTouch uses Cirque's GlideTouch Micro Keyboard with the PCB (printed circuit board) in the OneTouch to allow for the GlidePoint surface to roll up, available from Cirque Corp., 2463 South 3850 West, Suite A, Salt Lake City, Utah 84120.

The OneTouch may have an overlay virtual keypad that appears on the screen with the standard numerical keyboard, alphabetical keyboard, or other functions and command buttons, all of which are hidden until called up by the AA member. The screen may be utilized for Internet viewing, as seen in FIG. 27, 245, identifying data, viewing photos, and so forth.

In yet another embodiment, a red laser diode and detector is situated beneath the lens of the projection device to provide a miniature built in optical mouse for scrolling up, down, right, and left, and for clicking functions.

Solar Panel. The solar panel is located on the back side of the OneTouch (FIG. 27, 220), requires a voltage regulator to regulate the amount of solar power distributed to the system. This will be a miniaturized version of typical solar panel voltage regulators, such as those available from High Sierra Electronics, 13355 Grass Valley Ave. C&D, Grass Valley, Calif. 95945.

Programmable Magnetic Strip. The programmable magnetic strip on the back of the card is located 3/16" from the top of the card, exactly like standard credit cards as can be seen in FIG. 27, 229. The magnetic strip provides the back up system for electronic transfer The OneTouch is compatible with existing, standard credit card and/or debit card machines.

Waterproofing. In one embodiment, the OneTouch is protected from water damage with a waterproof laminate. Only two copper contacts for each of the three ports, which provide access to a speaker, a camera, and an infrared device, will protrude out of the laminate to be able to recharge the battery. When the device is not on or detects a short circuit between the two contacts, it will open the circuit. The contacts are typically in the "open" position, preventing arcing in a moist or wet environment. The depressing of the "on" sensor 221 closes the circuit, rendering them operational.

In another embodiment, the OneTouch is non-waterproof, thus allowing for upgrading the SmartChip to models of the chip with enhanced features and capabilities. The SmartChip is the CPU and memory (random access and non-volatile) of the OneTouch. This OneTouch can also be made waterproof by enclosing it in a removable waterproof encasing like the many available for Palm devices, such as the products available form Man & Machine, Inc. 3706 West Street, Landover, Md. 20785.

Biometric Devices. The biometric devices on the card allow a card owner to prevent access to the card by anybody except himself. The biometric information can be downloaded from the AirportAmerica central server where it was entered at least once when the member signed up for the card and service.

A camera 237 on the top edge of the card is used for retinal or facial scans. The camera has sufficient resolution to clearly distinguish the 40 distinguishing facial spots. The 40 different regions of the face are compared to the highly detailed facial scans on file inside the device. The camera is used for gaining access to the card itself. A score is computed based on how closely the facial scans represent those on file. The owner of the card can set the score threshold that allows access.

A fingerprint scanner 242 is used to make sure the fingerprint es the owner of the device's fingerprint 224. Like the camera 237, the fingerprint scanner 242 is used to gain access to the card. The logon to the system can be done by simply touching the OneTouch, Any finger can be used, making it more difficult for unauthorized people to gain access.

A key point in recognizing the unique characteristic of the AirportAmerica approach to the security options is that there are multiple approaches that together can be utilized to provide multiple backup. Thus, the system is more reliable than if it relied upon a single technology. For example, if face recognition is found to be less desirable or less reliable than another supported method then the overall objective of improving the traveler experience and providing security is not compromised. In addition, AA continuously monitors improving software, new technologies, and countermeasures. As these technologies become sufficiently proven, as judged by AA, they are shipped as new chips to AA members holding non-water proof cards and in due course new cards sent to those holding waterproof cards.

Video Conferencing. The one touch contains audio/visual capabilities to communicate with other OneTouch holders and other devices communicating with compatible protocols via audio and video. As can be seen in FIG. 27, 241, it is possible to have two AA members communicate with one another via their OneTouch's. In FIG. 27, 245, you can see the image of a person to whom another member may be communicating. In another embodiment, an add-on device will be available to connect to the OneTouch (via the data port, 232) to a TV. This will allow OneTouch owners to display their screen on a bigger device like a monitor, TV or even projection TV. This will also facilitate video conferencing. By receiving a video feed over the wireless internet connection, a OneTouch can use its internal video camera to communicate with others by audio and video.

In one embodiment, the ITU H.323 standard for audio and video conferencing will be used for handshaking, call control protocols, sequencing and compression. The audio portion of the H.323 protocol and aa's video conferencing system can be turned off to maximize video bandwidth. Conference members can then communicate by voice through the OneTouch's cell phone.

Voice Recognition. The OneTouch uses standard voice recognition software; thus, voice commands are translated to text and entered as if the user had typed the text in. A member may say, "phone," and the OneTouch will load up the phone application because that is what happens when "phone" is typed while the user is not inside any specific application. The OneTouch voice recognition is based on technology where speech can be translated to text. However, the card recognizes the speech patterns, style, and voice of the user. The user simply selects simple voice commands from among a pre-programmed vocabulary and the computer interactively responds with the voice that the user selected from a set of voice styles. A wide variety of styles are available through the Valet4u feature described below. In addition to text or voice, a set of "short cuts" or commands will enable direct access to frequently accessed places. For example, a user will be able to not only say "Phone", but will be able to combine that with "Phone Dave". A large vocabulary of short-cuts will be provided based on frequently requested transactions of a traveler.

If the presenter is attempting to access the information and services stored on or via the OneTouch and there is a match, then the presenter proceeds to the next protocol, if there is a match, the protocol "AA—Voiceprint-IDU" opens with prompt "VoiceIDU" and the member responds with his audio code name, and if there is a 3 way match the screen opens to the various categories and the member retrieves the necessary information from the screen.

Phone Functionality. The OneTouch may function as a phone, similar to existing cell phone/personal digital assistant (PDA) combination devices and uses existing software for this function. When calling AA using the OneTouch for making reservations or other reasons, AA assumes the cardholder's profile based on the caller id information indicating the cardholder's OneTouch number. The OneTouch includes a transceiver such as an integrated phone for communicating with the central server through a wireless communications network, such as a cell phone network. The card also provides Internet access similar to existing PDA devices. The cardholder has the option to access the system web-sites by using the card's built-in Internet browser. When the cardholder uses the card to access the Internet, the card automatically logs the cardholder into the system using the member's identification and password, and cross checks that information with the member's pin number, which are stored in the card. This can be seen in FIG. 27, 246. When the cardholder uses the card to make travel reservations, the process is expedited because the cardholder's preferences and payment settings are already stored and ready for use.

Data Transfer. In another embodiment, AirportAmerica OneTouches can communicate and transfer data to other AirportAmerica OneTouches via infrared. This function is similar to the technology used in PDAs, using the similar software.

The OneTouch may be placed in a cradle which connects to a computer with a USB port. This type of cradle is similar to the type that PDAs use to share and transfer data. The chosen handheld operating system and the OneTouch are mutually compatible.

The OneTouch may communicate with the Global Positioning System (GPS). The inclusion of a GPS receiver permits the OneTouch to function as a GPS device. The GPS system tells the OneTouch where the OneTouch is located. The OneTouch continually polls the AirportAmerica central server for email and to inform the server of its coordinates. The central server can then send it appropriate travel notifications, by email, instant message, beeper, phone or other similar methods based on its location. An extension of the OneTouch GPS positioning is the enabling of pinpointing exact locations of a targeted person or place about which the traveler needs to know.

Ringer/Beeper Device. With the card, a separate device 247 is provided that clips to the cardholder's clothing and notifies the cardholder of a call, voicemail, message, or email as shown in FIG. 28. This ringer/beeper device uses a standard lithium photo battery and communicates with the smart card via a specific radio frequency. Thus, this ringer/beeper device allows the cardholder to receive notifications even when storing the card in a purse or wallet. This can be seen on FIG. 26, 233, and FIG. 27, 243.

In one embodiment of the invention, the ringer/beeper device is a clip-on device that attaches to a watch or an article of clothing. In another embodiment, the ringer/vibrator is also used as a wired interface 233 with other systems as shown in FIG. 26. This feature is possible since the ringing device communicates with the OneTouch wirelessly and can take on different shapes. In yet another embodiment, the ringer/vibrator device will have a built in USB port and power connector. The power connector allows the ringing device to recharge itself and recharge the OneTouch by clipping on to the OneTouch while plugged in.

The ringing device can also function as a speaker and microphone to make phone calls while the OneTouch is inside a wallet. For secure access to the telephony features of the ringing device, a fingerprint mechanism is present as on the OneTouch. The telephony features of the ringing device are used through voice information and voice commands that are communicated with the OneTouch wirelessly.

Figure 35:
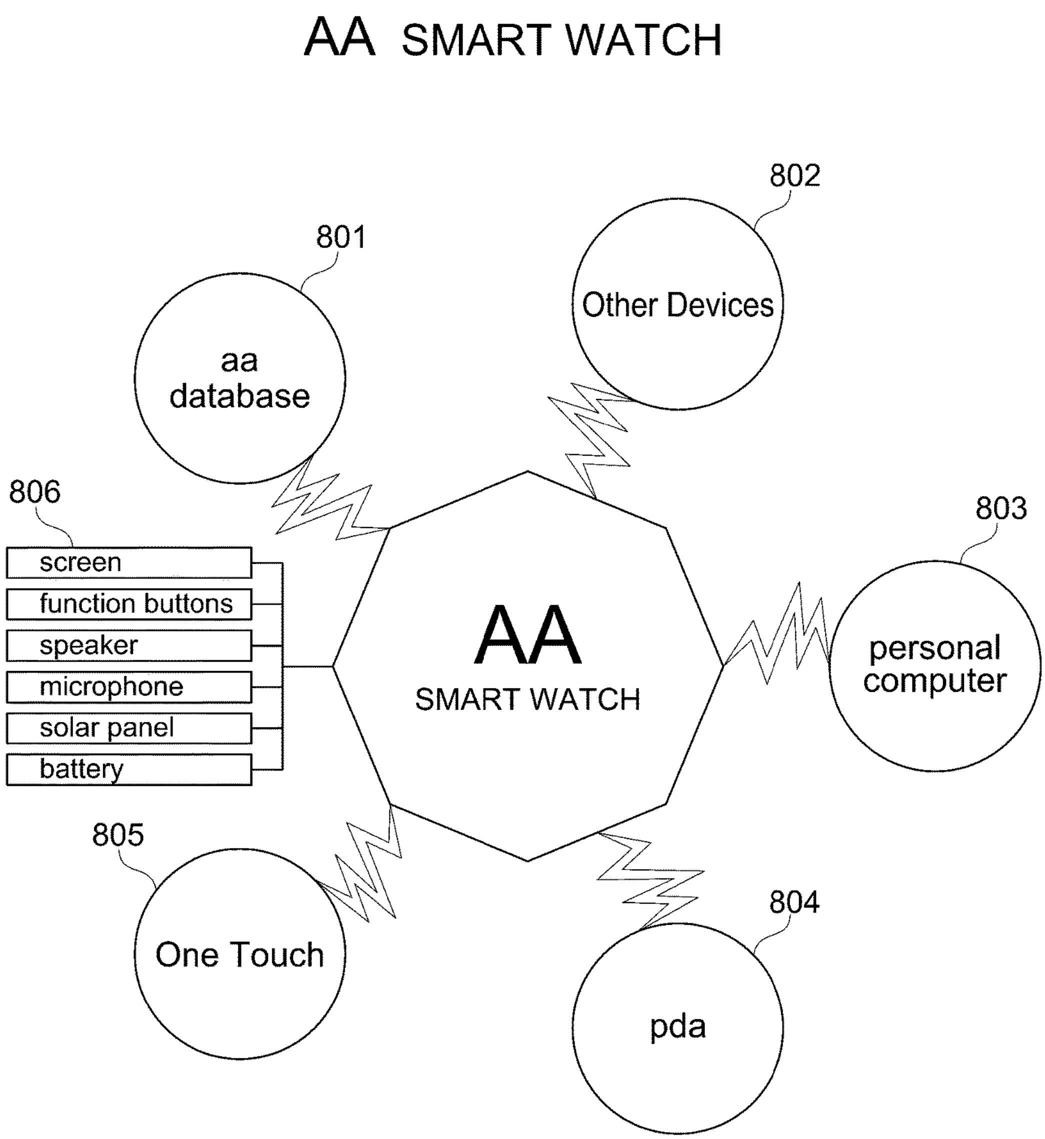
FIG. 35 shows a variation on the OneTouch represented as a smart watch.

To hide the appearance of the ringer/vibrator device and to make it more appealing to wear, the device will also be available in the form of jewelry such as an earring. A watch can be used for the ringer/beeper device as well. Because the watch can be directly viewed by the wearer, video conferencing can be relayed from the OneTouch to the watch along with the other information being communicated between the two devices. See FIG. 35.

In another embodiment, the piece of jewelry is simulated by the ringer/beeper device. The device is a pin, and the face of the Smart pin has a display feature that is adaptable, changed or altered such that various displays can be transferred from the Internet or from the OneTouch or from other devices to suit the member's preferences. The pin becomes decorative and can simulate jewelry or other devices.

To help prevent the loss of the ringer/vibrator device or the OneTouch, both devices will ring when they are separated beyond the distance through which they can communicate. One embodiment of this feature includes either radar or ultrasonic sensors and a digital readout indicating departure distance. The sensors activate an alarm, such as by ringing the ringers on the OneTouch and on the ringer device, when they are separated by more than a preset distance. Both the ringing device and the OneTouch continuously poll each other to obtain their status. In another embodiment, if the other device does not respond, the polling device rings a specific tone. The OneTouch can be set to not ring in situations when ringing device is not used. Each device may be calibrated to ring when the devices are in excess of the calibrated distance (FIG. 28). For example, the calibrated arc may be set at 125 feet, so that when the card and ringer device are 125 feet apart, the ringer device rings in short bursts, a reminder to turn back and retrieve the card.

Compatibility with Other Devices. The OneTouch can interact with other mobile devices in an intuitive way. It can team up with the cell phone by simply dropping it in a slot behind the battery of a cell phone which has been retro-fitted with a snap-on-cradle that snaps over the cell phone and flexes back into place, firmly grasping the phone in a bear hug. The OneTouch is compatible with leading OneTouch scanner software systems, codes and most other data transfer devices. It can be connected to the AA-member's PC with a cable via OneTouch adapter which crimps down via an alligator clamp connection over the fitting on the side of the OneTouch. The OneTouch is a USB plug and play device and recognizes other plug and play devices.

Wireless Transactions. The OneTouch has the capability of making payments over the internet when connected to a computer and of wirelessly transmitting data when presented to the point of sale terminal.

SmartChips. The OneTouch may accept two specialized chips. These chips segregate, store, and process data managed by the OneTouch. The chips enable the OneTouch to be easily upgraded and replaced by providing chips that implement improved procedures, protocols, and technologies and respond to changing conditions. The OneTouch is thus fully adaptable to emerging technologies and changing environments by replacing these removable chips.

These chips can be removed from the OneTouch card and used in converters that attach to other devices such as cell phones, iCell and other wireless integrated interactive internet devices. In this way, a popular cell phone can be used as a partial OneTouch.

The SmartChip is the CPU and memory (random-access and non-volatile) of the OneTouch. The memory included is sufficient for the operation of the functions of the OneTouch. For example, additional memory may be required to support the valet4u option described below. The SmartChip controls all the functions of the OneTouch including encryption. Both the SmartChip and the second MyData chip can control the OneTouch. To solve conflicts between the two chips, a switch is on the OneTouch to switch between them.

The technology in this area is dynamic and the OneTouch, like AA itself, is dynamic, flexible so as to take advantage of improvements in technology and other changing conditions. For this reason, the OneTouch is modular and AA, ever vigilant, replaces modules, except in the case of the sealed waterproof card, in which event the whole card is replaced. The replacements modules contain the latest upgraded chips or other components as appropriate. As the leading edge of technology reveals new opportunities to advance the cause of seamless air travel and seamless living, AA sends replacement chips to the AA-member who removes the outmoded chip by sliding it out of the slot and sliding the new chip into the now empty slot. The hallmark of AA is adaptation as needed to advance the cause of making the travel, airport and life experience for the AA member, aa-Airport member and the general public ever more seamless.

There is a great variety of information that may be stored as part of the member's supplementary data that could be referred to as "My IDs/Password Bank". Providing an area to store supplementary data that may be of great benefit to the busy AA member is that the system will store a set of user ids and passwords for systems that are not fully integrated with the AA system. We refer to this under Table 3 in the area described as My ID/Password Bank. This handy feature helps the members who are anticipated to need information regarding a growing number of systems with which they interact (bank PIN numbers, Internet membership site ids, etc). Now all the member needs to do is to go to My ID/Password Bank for a view of what has been provided to other systems. The information of My ID/Password Bank is stored under My Data Chip.

In an additional embodiment the OneTouch may include another CPU/memory/storage referred to as the MyData chip 222. A switch on the OneTouch is pressed to switch between the SmartChip and the MyData chip. For example, the MyData Chip may be locked and accessed by the member using a separate finger for fingerprint authentication, and in addition may either make a voice command using the voice password, and/or use a written code that the member has pre-selected and programmed. For maximum privacy and security protection the MyData chip is not internet ready and is not connectable to the internet or networked with the other chips on the card, but is connected directly to the screen through its own open connectors. An appropriate fingerprint on the MyData Chip closes the connection and opens the screen.

The MyData chip will itself authenticate the user as the cardholder to allow access to the MyData chip. The biometric template is stored on the member's MyData chip and the AA member places his finger over the embedded fingerprint on the aa-MyData chip for a match. A separate digit is used for authentication and identification at points of secure access. The member presents the appropriate digit at the access control checkpoint. A three way comparison is made to determine a match; the embedded fingerprint within the card, the corresponding digit of the presenter and the member profile on record at the AA-portal. A fourth match may be local access control, which may be used for peak security, variation, etc.

In this embodiment, the OneTouch is delivered with the MyData chip embedded in it. It contains a template with pre-defined categories, where personal information may be stored in formatted categories. AA has initially identified 13 categories (identified in Table 4 below). As the need arises, AA adjusts the number of categories accordingly. When the member receives the one touch, the member fills in personal account numbers, balances and other confidential bank account data into this category via screen input or telephony. The categories in MyData Chip are listed in table 4. The data that is stored under MyData chip that are not on the central server are not included as part of the security gradation levels for the AA member. The member can feel confident that certain personal information is exclusively available to him and not stored on the central server.

TABLE 4

Representative Portable Data Chip Data Slots

| Slot No. | Information type |
|---|---|
| 1 | Emergency Information |
| 2 | Drivers License data |
| 3 | Password storage or hint to recall password |
| 4 | Bank accounts data. |
| 5 | Critical medication information |
| 6 | Blood type |
| 7 | Voters registration information |
| 8 | Cash card information |
| 9 | Credit card and/or debit card information |
| 10 | Insurance information |
| 11 | Social security number |
| 12 | Codes for car keys, office keys, other important keys. |
| 13 | Miscellaneous |

When the cash card information of slot 8 as shown in Table 4 is stored the AA member can use the OneTouch as a cash card via links with world ATM providers such as PLUS, INTERLINK, CIRRUS, STAR, PRESTO, HONORS, etc. By inserting his card into an ATM he can access funds from his account from any banking institution or ATM in the world. Members may also elect to add a predetermined amount of money onto his card for use in his/her travel (ie, before going on trip member elects to transfer $1,500 from his personal acct onto his OneTouch and as he uses the card during his travel, expenses are automatically deducted from the $1,500 placed on the card before departure).

The AA member may elect to put credit card and/or debit card information in slot 9 of his MyData Chip, the chip is not connected to a modem and the information stored thereon can only be accessed by the AA card member. The member may bring up the stored data by first accessing the OneTouch and displaying the credit card and/or debit card information on the smart card. Information that may be displayed includes the card issuer, account number, credit limit, amount outstanding, and other account information.

The AA member may elect to put insurance information in slot 10. Such information may relate to insurance policies such as life, health, auto, homeowners, commercial, etc. The stored data may include insurance policy identification, coverage, renewal and other information as well agent or other contact information.

Slot 13 is user definable to allow the AA member to store other data on the secure MyData chip. Slot 13 may store data from whatever source the member may elect.

Point of Sale (POS) Transactions. Purchases may be made by the AA member by powering up the OneTouch through voice commands, calling up the credit card and/or debit card of choice, approaching the POS terminal and pointing the OneTouch from a distance within six inches of the POS terminal port. The OneTouch includes a transponder for interacting with the terminal and may initiate transactions with the terminal. The data required to complete the transaction is wirelessly beamed to the POS register when so presented to the POS terminal and the member may ask for a paper copy or have the receipt for the purchase beamed to the receipts section of the AA Chip or have it scanned into the MyData chip.

The card communicates wirelessly and through direct contact. It makes contact through the card's conductive micro module on the card surface with contact points through which data may be transmitted, commands may be issued, and card status and other information may be updated. As a contactless device, the card has an internal antennae for communication with the reader. This internal antennae provides a power source from electromagnetic pulses it receives. The card requires close proximity (to within 6 inches) of the reading device to exchange data and record transactions.

In addition to providing members with smart cards, the service maintains an airport employee OneTouch or i-Card system. The employee OneTouch system is virtually the same as the system for system members, and the service requires that all employee OneTouch holders comply with the same uniform security standards.

Security

Access to the OneTouch is granted after a series of verification procedures are performed to insure that person trying to access data is indeed the authorized user. Step one is the placement of a pre-selected finger on the fingerprint chip for verification and authentication. Once the identification has been verified OneTouch unlocks and grants access to system features.

The security features include embedded sensing services and biometrics, including, fingerprint detection devices, voice recognition system, and/or encrypted space that can only be accessed through positive fingerprint match.

The one touch can be fitted in a slot on the adapter provided by AA on the side or back of cell phones or other wireless internet device providing a connection from the OneTouch to cell phone or other device or attached via cable to the PC and information can be downloaded from the user's internet or PC. The software automatically encrypts and decrypts files stored on this space and a pin number which may be deactivated for the AA-Chip with the features listed below Access to the OneTouch. The owner of the card can restrict access to the card's information in several ways. First, the user may require that the fingerprint scanner obtain a fingerprint matching the owner's fingerprint before the card is activated. Second, the camera on the top edge of the card is used for facial or retinal scans. The camera has enough resolution to clearly distinguish the forty distinguishing facial spots. Finally, one can download from the central server a member's biometric information.

System Integrity. To maintain the integrity of the system, the AA system will reject membership applications from identified high security risk individuals. The system prescreens with CAPS using a secret and secured encrypted algorithm. The system compares the presented documentation of potential members (finger scan, etc) with a database of known terrorists and suspected terrorists, which may be obtained from the FBI and other governments agencies. The CAPS system selects those who will be diverted for a more comprehensive security check. The membership screening pre-clears AA-members who may then be expedited through the security checks such as at airports.

AA Application Process. The method and process of application to membership in AirportAmerica involves submission of minimum mandatory documentation for use in verifying the identity of the applicant and that the applicant's record is clean and there are no other conditions adverse to the standards of AA. The various identification processes include without limitation various biometric scans, such as fingerprinting and other tests and scans. The applicant's identification process is used to research law enforcement and other database for independent verification that the applicant has no criminal background or other conditions adverse to the minimum mandatory standards, thus creating a comfort level amongst other members, passengers, security personnel, etc. This certification by AA enhances the seamless travel experience. The AirportAmerica membership applicant fills out a membership application which includes the prospective member's agreement to submit to an FBI and or other governmental background check and governmental security clearance approval prior to the AA applicant's acceptance as member. This includes continuous submissions as necessary in order to maintain the clearance necessary for the privileges associated with the member's selected level of gradation. At the highest security clearance these privileges include expedited security clearance through airport security by using electronic scanning and other imbedded features of the one touch. The one touch operates varies AA functions including the security related functions. Expiration of the one touch is two year unless lost, stolen or upon notification by AA of earlier expiration.

The process is also used to certify employees at the travel facility. Vendors and vendor's employees may also become AA certified. In the highest security facilities no access to secure areas is provide with a OneTouch or similar card verifying AA certification. Accordingly, AA may obtain information and maintain a profile on each travel facility worker similar to records and profiles regarding traveling members. These worker are issued OneTouch or similar card for identification at the travel facility.

Access Key. The smart card also functions as an access key to a kiosk. The kiosk is an enclosed desktop computer with a web browser, which points to the system homepage. By swiping or sliding the card in the scanner at the kiosk, the member has the option to log in to the system. The web browser points to AirportAmerica's homepage. Travelers can slide their OneTouch in the kiosk to enter the traveler's login information to the website. From a kiosk, a traveler can do anything they normally do on the AirportAmerica website.

Figure 29:
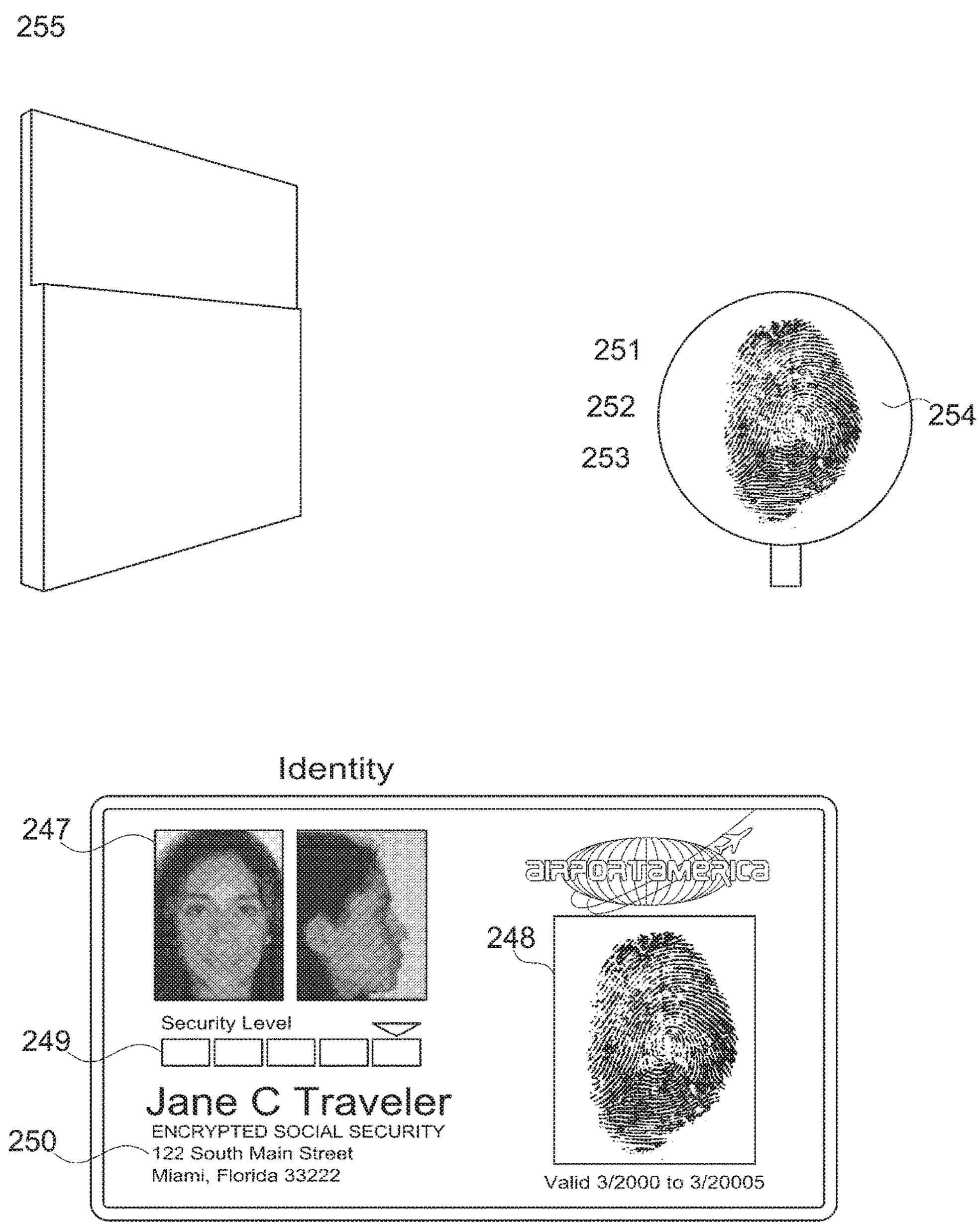
FIG. 29 shows another view of the OneTouch, approximately the size of seven credit cards combined with a view of images of the member as well as the member's fingerprint.

Security Card. Furthermore, the OneTouch may function as a security card. The service only issues a OneTouch card to a member after performing an extensive security and background check of the applicant. Each OneTouch is associated with a single individual on whom the system maintains information. The individual's identification information is stored in the memory of the OneTouch. The OneTouch includes a security screen as shown in FIG. 29. This screen includes a hologram of the member 247, a fingerprint of the member 248, indication of the gradation level of the member 249, and textual identification information on the member 250 such as the members name and address. Therefore, if security personnel can verify that a OneTouch cardholder is in fact the owner of the card, then the security personnel will have confidence that the cardholder is a safe and capable traveler in accordance with levels of gradation 249 as described earlier. In this manner, the OneTouch can also by used to verify base identification data such as passport or driver's license information and other documentation data such as ticket information. This information may be displayed on the screen of the OneTouch after being verified by the AA system.

In an example of the OneTouch used a security card, security personnel at a security checkpoint in a travel facility such as an airport checking a traveler with the highest level of gradation would follow the following procedure. The verification of the identity of the cardholder involves a three-step process. First, a the third-party security employee checks the hologram animation 247 on the back of the card to verify that the individual looks like the certified cardholder. The hologram 247 is a five to ten second, or other duration, three-dimensional video animation of the traveler looking forward, profile, then turning completely around and smiling. The third party security personnel can then ask the traveler to make the same motions. Second, the security employee places the card in a system certified terminal or card reader, similar to existing card readers. The card reader connects to a system certified third party computer, executes scans of fingerprint and/or voiceprint, depending on the protocol in place at that AA airport at that time. The third party computer connects to the AA system central server using a two-way SSL connection for both connections. The OneTouch sends the encrypted id and password to the third party computer, which then verifies that the OneTouch is in fact a genuine OneTouch issued by the service. As the third step, the terminal includes a biometric scanner or reader and the third party computer submits biometric information obtained from the traveler, using system certified biometric and other identifying, verifying and authenticating information gathering devices, to the system central server as a web CGI query to verify the authenticity of the traveler. The system compares the submitted biometric information with the certified member's biometric information stored in the system. The biometric information that may be used to identify an AA traveler may include without limitation, the following embodiments: fingerprints, facial scans, iris scans, and DNA information.

The system comparison may use three-way matching. For example, when proceeding through a security checkpoint the presenter places the OneTouch on a scanning device and the presenter's fingerprint, iris scan, facial scan, or other identification data is obtained. The system compares this data obtained from the presenter with the information stored on the OneTouch, and the member's identifying information on file with AA at the AA portal. The card can take on a different host as the card or chips are placed in other wireless devices (cell phone, PDA, etc.) so long as the minimum three-way match protocol is preserved. The determination of which mix of security checks shall be conducted is configurable to preserve the integrity, reliability and member value of the AirportAmerica system.

The three way positive security protocol of the present invention requires a match of personal identification and authentication information of the OneTouch user-presenter, AA hub, and the OneTouch. If there is a failed match of any part of any of the three match-ups, the match fails, access is denied and the card flashes code red.

- Presenter—Fingerprints, voiceprints, facial scan other scans, digital and biometric matches to enhance authentication of the card presenter as the AA member tests AA Profile at AA Portal;
- Smart Card—Fingerprints embedded as biometric template, digitized voiceprints, digitized facial scan and other digitized and biometric templates imbedded in the OneTouch and
- AA Profile—Fingerprints embedded as biometric template, digitized voiceprints, digitized facial scan and other digitized and biometric templates in the member profile on file with AA at the AA Portal 1 OneTouch.

From finger-scan chip on OneTouch or AA SmartChip to AA Portal and following receipt of this information there is a three way match of:

- Presenter—Personal positive identification, authentication (voiceprint, fingerscan, etc.) of Presenter of OneTouch, and
- OneTouch—OneTouch information on OneTouch of presentor,
- AA Profile on file at AA Portal—Information in Profile file of member matching the card being presented at access point and the information received electronically from the card presenter for authentication of the card through from information transmitted via scanner and other devices through the internet and other means to file the AA member profile on file at AA hub.

At the point of entry the OneTouch can identify the one in possession of the card as the rightful owner by making a match between presenter (by use of biometrics digitized scanners and other situational downloaded data), scans, pin numbers, trip pin and other authentication information. The system thus identifies the AA member with accuracy, while detaining the AA member no more than a few seconds. The process of positive identification of a presenter of a OneTouch as a certified AA member is completed with speed and accuracy. The presenter as a member of AA in good standing is quickly cleared to proceed through the security checkpoint.

Local authority match—A local authority match may be added in addition to the above three-way match. This protocol involves the same procedures as the three-way match described in the preceding paragraph with the additional participation of the local security attendant and or automated computer system. The security personnel have local scanners, fingerprint devices and proceeds makes a physical comparison between the holographic image on the card presented and the facial and other features of the presenter.

Hand Scan. The OneTouch provides additional security features while traveling. The iris scan, retinal scan, photo scan and profile details revealed by the bar code are on record at the AA headquarters with the central server. When a passenger in possession of a OneTouch goes through airport security the OneTouch is placed on the scanning device by the member at the valet or the ticket counter, again at the entry point to concourse, and again at the gate. This presentation is accomplished by placing the card on the glass of a mechanical device that resembles and is operated like a credit card and/or debit card device. As the member places the card on the glass face down, the passenger places an index finger on the glass of a fingerprint analysis scan device and submits to a 2-6 second photo/video scan. The handprint and photo are digitally compared to the photo and fingerprint on the card. The card scan is intended to check identification of the user against the information on file in the AA central database and the information stored in the OneTouch. Of all three matched are made then the card activates the opening of a double-door entry gate. If any of the card identification features differ from each other or the information on file in the AA database, the computer automatically rejects the card and the entry gate to concourse of gate does not open. For example, upon successful matching of card identification with information on file in the AA database by security systems, if the photo is altered on the card, when the card is placed on the identification scanning device it scans the photo and produces a digitized facial contour scan of the user. The resultant scan is compared to facial contour of user and uploaded to the AA central server and compared with photo information on file. If any of the three matches fail, the AA central server transmits a no match signal to the security station and a code red flashes on screen of the security checkpoint and an alarm is activated. The double gates remain closed. Self contained embedded fingerprint verification module in the OneTouch is compared with the user's finger scan which is simultaneously electronically submitted to the FBI or other appropriate federal agency. The facial recognition and retina-iris scans use a video camera to identify the card user, who is asked to face the camera. There must be a match of all three systems. The user scans must match prints and profiles stored on the OneTouch, the profile on file in the AA central database and simultaneously the information maintained with the FBI or other governmental agency.

Use of Deactivated Card. The OneTouch also contains a built in chip that can deactivate the card or transmit message via automatic e-mail when swiped through the card swipe device. The swipe of the invalid card automatically transmits a signal to the AA central server, triggering a code red. Upon this trigger an AA agent notifies security agent at the facility where the card was swiped (such a at an airport concourse security checkpoint) and authorities the detention of the holder of the OneTouch. The notification, for example, includes a message alarm informing the security agent "hold for interrogation and call this number." The proper law enforcement offices such as the Federal Marshall or Office of Homeland Security may also be notified. The AA system also causes the upper left hand corner of the card to flashes red. This can be seen on FIG. 26, 235.

If the card is rejected for non-payment of AA fees or other non-code rejection criteria, then "technical difficulties" or "member card is temporarily invalid, please manual check" message is flashed across screen, with no code red and card fails to open gate.

Tracing. The OneTouch has two independent imbedded customer identification numbers from independent locations unconnected with each other with firewalls that prevent tracing. Each pin # is matched by scanner with the pin # on file at these separate locations. If one location is compromised, the other location still must be located and compromised for a fraud or forgery to occur. The prospective member is run through FBI and Interpol and local police checks for all locations the user has lived for last 5 years prior to filing of the application.

Figure 36:
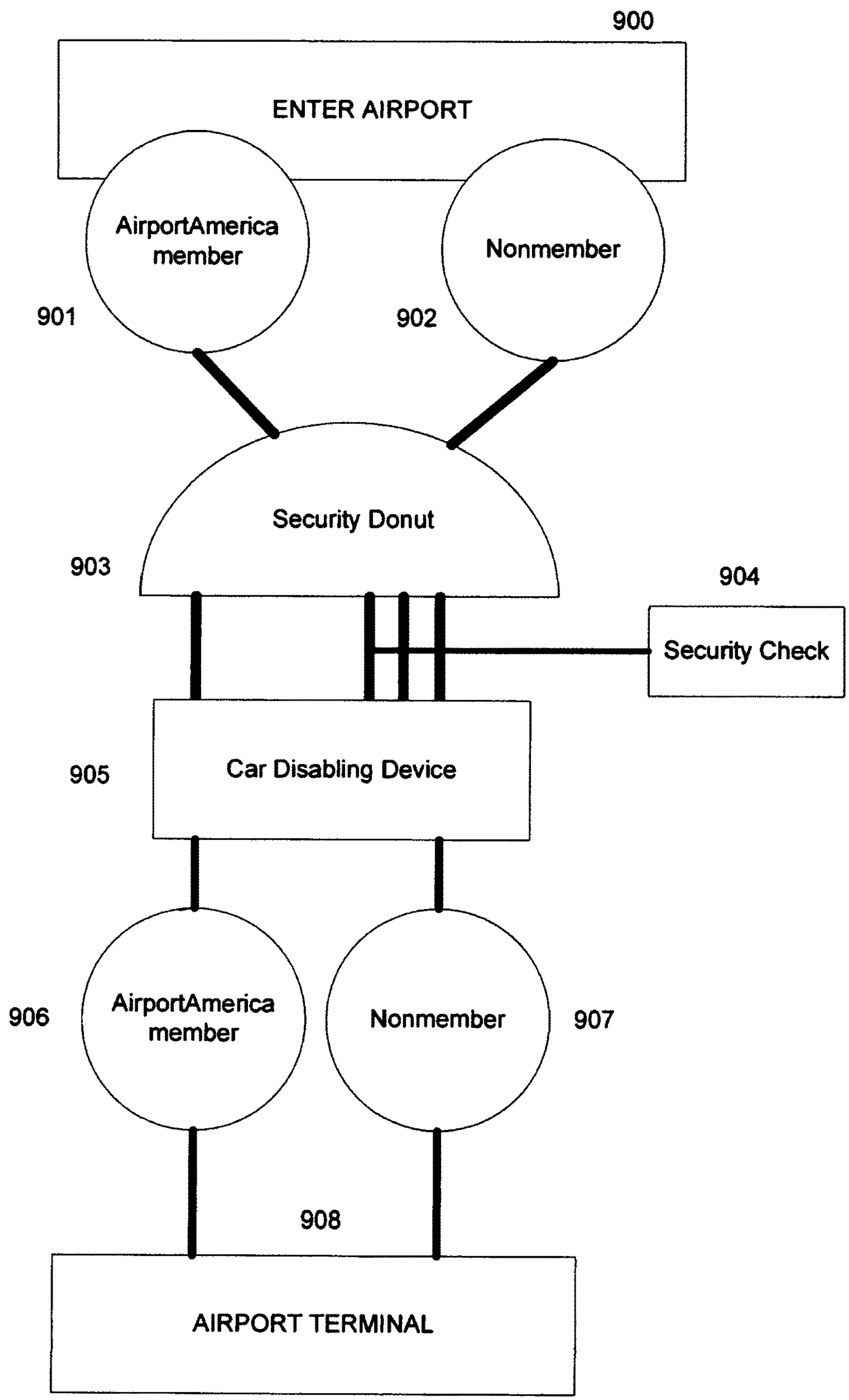
FIG. 36 shows a representation of the perimeter security system including a donut of security where all vehicles must pass to gain access to the airport.

Perimeter Security. The AA system may also be used to provide perimeter security at travel facilities such as airports. The system sets up remote monitoring for designated airport and governmental personnel of all check points, all secure entry points, and the tarmac area. The AA system may monitor all those who have business at the airport, by monitoring perimeter control points through which all those entering the airport must pass. An exemplary perimeter control point is shown in FIG. 36. All those who drive through an airport entrance 900 are routed to a auto-scan donut 903. Different paths may be provided based on preliminary security sorting. For example, a route 901 is provided for AA members and route 902 is provided for non-members. The auto-scan donut 903 is a donut shaped scan ring equipped with sensors such as circular shaped radar and explosive detection scanners. The auto-scan donut checks for explosives and weapons including nuclear, chemical, biological weapons. All vehicles proceeding through to terminal area must pass through the auto-scan donut 903. The auto-scan donut 903 analyzes cross-section images and comparing their CT properties with known explosives, weapons, weapon profiles, bomb components and other objects rejected by the automatic inspections algorithms. The remote attendant in security station 904 activates and deactivates gate and security operated tire poppers 905 as necessary. Those passing through auto-scan donut 903 may be routed based on AA criteria. For example, different routes 906 and 907 may be provided to the airport terminal 908 based on directions given at auto-scan donut 903. Security is provided in concentric rings, each successive ring providing tighter security. The highest security protocols are present at the gate and, in the case of employees and vendors, at the ramp and tarmac/runway areas.

Blue Light Emergency Wireless Phones are in blue boxes and illuminated by a blue light on top of the box are used along the perimeter of AA secured facilities. They are located every 750 feet along the perimeter of the airport and other strategic airport locations. To operate, the call box door is opened and the receiver is simply picked up, it automatically and immediately connects to security through a main control room dispatcher who is required to pick up a loudly ringing phone before the end of the first series of loud rapid rings. The call is monitored by other appropriate law enforcement agencies. The blue light phone notifies the AA hub. If not picked up locally at a predetermined number of rings, the phone switches to audio-visual through a webcam. AA then activates phone alert systems that notify local authorities, including the airport security and police departments.

Security and police Cruisers and other airport personnel in the sector of blue phone call are automatically notified by alarm signals in their phone emitted from the blue phone. Personnel arriving at the scene of blue phone alarm deactivate alarm by flipping the hidden alarm switch.

An AA-Pulsed infrared Perimeter intruder detection System is integrated into the communications and airport intranet. The AA-Pulse Infra-Red Perimeter System using infrared beams with range of approximately 1000 to 1500 feet with a self diagnostic system, for parts malfunction, to distinguishes difference between animals and birds and other environmental risks and other false alarms from intruders. Cast aluminum detection boxes and fence assemblies include sensor equipment and may be easily mounted on existing poles or new poles in the fenced or unfenced perimeter. Sensor systems are monitored from the control room and system information is displayed on a graphic map. Transmission is from the pole mounted wireless transceiver to the control room. Transmission may also be to mobile tracking maps in palms, cell phones and other hand held wireless devices. The control room enunciator panel or monitor and mobile security personnel respond when a green light at a specific station on the display graphic map is replaced by a red flashing light indicating that some non-environmental intrusion has breached the perimeter at that point. At point of intrusion tungsten or sodium vapor lights go on and adjacent red flashing bubble lamp begins to rotate. In the control room an alarm goes off. Includes tamper proof and battery pack back up. The alarm is interfaced with sector patrol unit wireless communication devices to electronically notify those personnel in the sector of the breach.

A non-lethal Electrified Perimeter System, comprising a single strand or more are interwoven in the existing fence, is also present at the perimeter. The electrical current is turned off but is self-activating. The electrified system, detects, deters, defends and denies access.

XML Interfacing. The central server uses a secure XML browser interface as well as other mechanisms to provide interfacing to disparate systems. The Central Server of AirportAmerica can interface with any system that provides an XML interface by utilizing one of several XML-translate products (such as those provided by Reference Pass Consulting or Hubx). These products enable any system to interface with any other system based on a common set of functions specifically geared for the travel industry and based on the Open Travel Alliance where possible. These interface products enable the AA system to interface to airline, GDS, and other travel provider systems if their systems provide a structured XML set of transactions, EDIFACT messages or even non-structured host based systems where screen-scraping is the only option.

Trip PIN. Each reservation has a unique AA Trip PIN # which codifies reservation, identification, etc. Each trip is provided a "trip pin number" which is an encoded e-ticket stored within the OneTouch as an encrypted hologram and as a temporary icon on the face of the OneTouch as identification. The trip pin number is only valid for the trip to the destination. The return trip requires a new trip pin number.

Data about Passenger Travel Habits

A byproduct of the AA system will be the collection of data related to passenger travel habits. This data can be useful to the member airports and airlines as well as other travel providers for planning purposes or to the airlines, travel providers and travel agencies to gain greater understanding of ways to improve the passenger experience. The data will be available in an XML type interface record to enable transferring and merging to existing Customer Relationship Management (CRM) or data warehouse applications. Each data element that can be collected will be scrutinized in terms of privacy so that there is assurance that data clearly considered personal will not be directly available for use but can indirectly be used. For example, the interface record could be defined to not transfer passport number data but could transfer age data to provide demographic information. Additional details of this are presented under Table 3, above.

Travel Information

In order to provide system members with the most current travel information, the system has an intranet component. Airport employees or employees of other approved travel facilities (such as ports) use the Intranet to inform the system about situations that affect travelers. A system member Intranet user who has received security access to the Intranet can record information about any situation that would change or alter a traveler's plans. When an airport employee records such information, the system notifies the traveler of the relevant information. In addition, based on the set of stored contacts within the traveler's individual smart cardOneTouch, the others to be notified will be notified with reliable messaging. The Intranet is accessible to those with security clearance via the system website or a system smart card.

Furthermore, the Intranet provides airport employees, security personnel and other authorized users explanations of the rights and privileges of system members and security standards for dealing with system members. Because the system also administers the airport employee smart card system, airport personnel are comfortable dealing with the procedures of the system. These procedures may also be standardized at airports that integrate the system into their security practices. Accordingly, the member thus may experience a user-friendlier environment though multiple facilities.

The following list provides a set of some of the intranet links that will be available within the Intranet to support Back of House/Airport Infrastructure processes:

Control Room (Communication, Surveillance, Security)
Communication and Technology
Security
Administration
Multi Modal Link/Coordination Infrastructure Communication (E-mail, Voice, Web Page, Wireless Links, Closed Circuit, T.V., Video Conferencing)

Planning
Development
Construction
Concession Management
Risk Management
Air Traffic Management [Air, Ground, Concourse, Gates]
Air Traffic Control and Air Traffic Services
Passenger Facilities
Passenger Relations Management [Information, Director's Office]

Control Transport
Maintenance/Waste Management
Environmental Resource Management, Noise Control
Aircraft and Cargo Handling
Ground Facilities
Gate Control
Tower
Charter and Fuel, Out Parcel Control, Real Estate
Parking
Human Resources
Legal
Community Relations
Stakeholders
Ombudsman When the member makes last minute travel plans, the member has the option of printing out an e-ticket at a system kiosk, which are located throughout the airport.

Baggage Checking and Tracking

Figure 30:
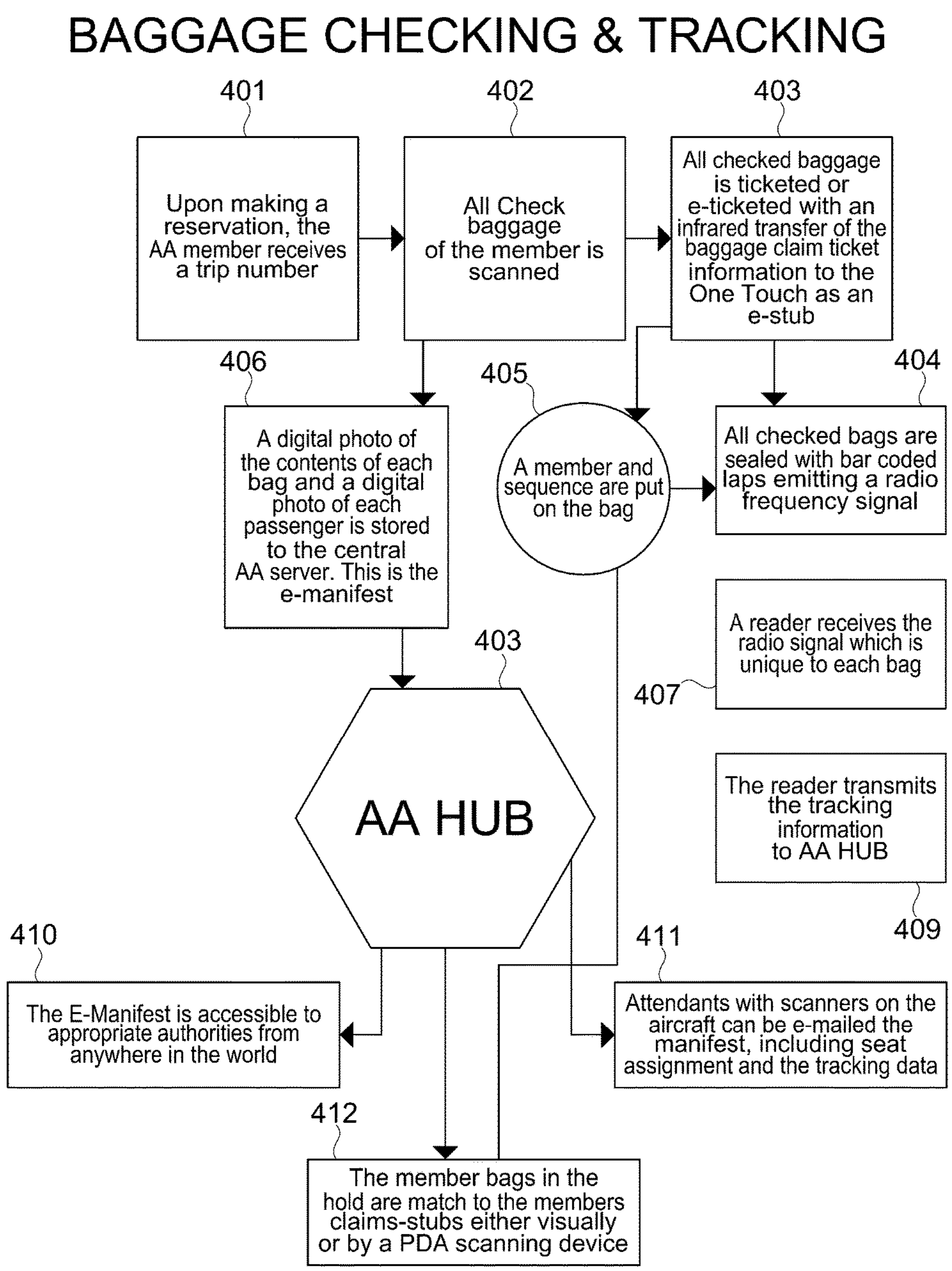
FIG. 30 shows a flowchart detailing a method for checking and tracking baggage.

The OneTouch identifies a passenger as a safe and capable traveler. Beyond that, there is a more in-depth process focused on the baggage system at the airport facility. Referring to FIG. 30, at the point of id of the member, all checked baggage of member is scanned (step 402) and ticketed or e-ticketed with an infra-red transfer of baggage claim ticket information to the OneTouch as e-stubs (step 403). A number and sequence are put on the bag (step 405). The system provides a positive id of member bags in the hold by number and sequence; this record is confirmed by a positive id of member claim stubs of passengers seated in the aircraft. This confirmation may be obtained visually or by a PDA scanning device (step 412).

The e-manifest is a quick and easy way for obtaining a complete record of passengers and passenger documents at check in. These records include digital photos of the visual contents of each bag and digital photo of passengers. Officials can access this information from web-browsers any where in the world (step 410). Bags are sealed with bar coded tape and tagged with a tag emitting a Radio Frequency (RF) signal that tracks the bag (step 404). The RF frequency is broadcast over a certain adjustable distance. The tag transmits a small part of this energy back to antennae. The radio wave is unique to that baggage tag and is its unique id code. The reader also transmits to the hub (step 409). Attendants with scanners on the aircraft can be e-mailed or transmitted this info, including the seat assignment of a bag owner, if a problem arises or if a misplaced bag is reported (step 411). Thus, the attendants may make a positive id of seat and match the photo of the person from e-manifest with the bag taken at baggage check.

AA member bags are marked with member bar code and member trip pin, good only for the duration of the trip from home port to destination or the pre determined programmed life span of that encrypted trip pin(number), which ever is earlier. This trip pin number is the member's confirmation number.

AAcart. To expedite the security clearance of the member at the airport, the system uses a portable AAcart that is equipped with a system smart card reader and with devices for scanning baggage. The AAcart bottom, where carry-on baggage is placed, may be adjustable for shifts in maximum sized carry-on baggage. Baggage is placed in the cart; if the bag does not fit in the adjustable bottom, then the bag is too large to qualify as carry-on. The carry on items are sized within the bottom of the AAcart to check for conformance with carry-on maximum regulations and standards. Carry on is then scanned with x-ray, explosive, chemical, chemical, biological scanning devices attached to the AAcart. An airport employee or designated security personnel use the portable AAcart at the gate for the final, expedited processing of AA Certified members just prior to boarding. The AAcart contains portable digital scanning devices for biometric, digital, iris, retina, voice and other identification and authorization information embedded within the OneTouch and are wired and wirelessly connected to the AA central server for a four-way match between the visual, of the presenter, embedded within the card of the presenter, the local information and the central server. The AAcart is portable and is typically used at the gate as the last security checkpoint just prior to boarding. The airport has the option of using the system portable AAcart to assist in expediting checking non-member travelers during high-traffic times.

Another component of the AAcart reads and authenticates a travel or ID document in seconds. It analyzes the document using various kinds of light, verifying identification watermarks and logos, inks, examines laminates for signs of tampering, compares photos on card with photos on various law enforcement and other watch lists. The AAcart devices read bar codes, magstripes, fingerprints, signatures, etc. The AAcart is periodically updated by governmental or other investigative audit of AA procedures and AA Certified traveler membership list. Consequently the member security check at the gate is fast and the member line moves fast. The AAcart may be integrated into existing security devices and systems at the airport or other facility and is modular for ease of maintenance and for ease of adding new and easily remove obsolete authentication, identification and authorization devices.

Passenger Ticketing and Processing

AA Certified traveler members of a certain level or gradation are pre-cleared and thus experience an accelerated and less intrusive processing. The AA certified members can pass through a Priority Lane, as they are pre-cleared through security by virtue of AA profile. The higher the gradation level, the more accelerated will be the passenger's processing. Let's provide an example of an AA member being driven to the airport. The AA member's experience begins with an expedited movement through the Perimeter Security System (FIG. 36, 901). With the higher gradation level, the AA member passes a positive (bio-metric) identification and carry-on bag check and therefore can pass through the, "Green Lane"/AKA "Priority Lane". The AA member will find expedited processing starting with the airport inbound road, curbside, terminal, concourse to gate and through to the boarding process.

Expedited Processing. If a member is in a hurry, the member can elect Expedite-expedited processing through security and ticketing. This process, called "Expedite," requires a qualified airport employee to meet the member at a point on the airport perimeter, such as at a valet. The employee performs the necessary security searches, such as scanning the member with a hand wand, and then checks the member's identity such as by taking an iris profile with a scanner built into the hand wand. The employee then electronically transmits the information obtained by the scan to the security systems at the airport and to the system. The employee then escorts the member around the lines in the airport and through a security bypass. Next, the employee places the member's baggage in a waiting system portable cart (as described above). The cart scans the baggage and the member is ready to board. Once the member passenger and his luggage are cleared at the gate, the passenger is not permitted to leave the secured gate until boarding; otherwise, the passenger must go through the normal, non-expedited security check.

Members have standard system clearance. To elect the Expedite option, members may be required to comply with standard 6, dark green, of the gradation levels, or possibly submit additional identification information, such as a DNA sample, and to pay additional fees, which reflect the additional cost to the government, the airport, and the service of providing expedited processing.

Parking

For reserved parking in the building, AA e-mails to the member the location of the reserved parking spot, for example, "North daily 3$^{rd}$ level, any of spaces 45-56."

Through use of AA's Cartracker, a member can scroll thru a parking garage map displayed by AA on a monitor, permitting the member to palm, iCell 22 or cell phone 17 mark the location in the parking building. Upon return to a home city, and while going to the parking garage, a member can just scroll through maps of parking structures to locate a blinking light on iCell parking garage map indicating the location of car. In one embodiment, an infrared beam crosses reserved parking spaces. The beam is released by the member inserting their AA pin number in a key pad on adjacent stanchion, otherwise interruption of the beam sets off the alarm. Release of the beam is sent to an affiliate's computer in the garage, and sent on to AA local web parking page. When the member slides the member's I-card/OneTouch in the pad which transmits his trip number and Certified AA member number the beam becomes disengaged and such action notifies the parking garage computer that the space reserved for the member is occupied by someone else. If a nonmember drives a car in the space the interrupted beam sets off an alarm.

Trip Planner

Figure 31:
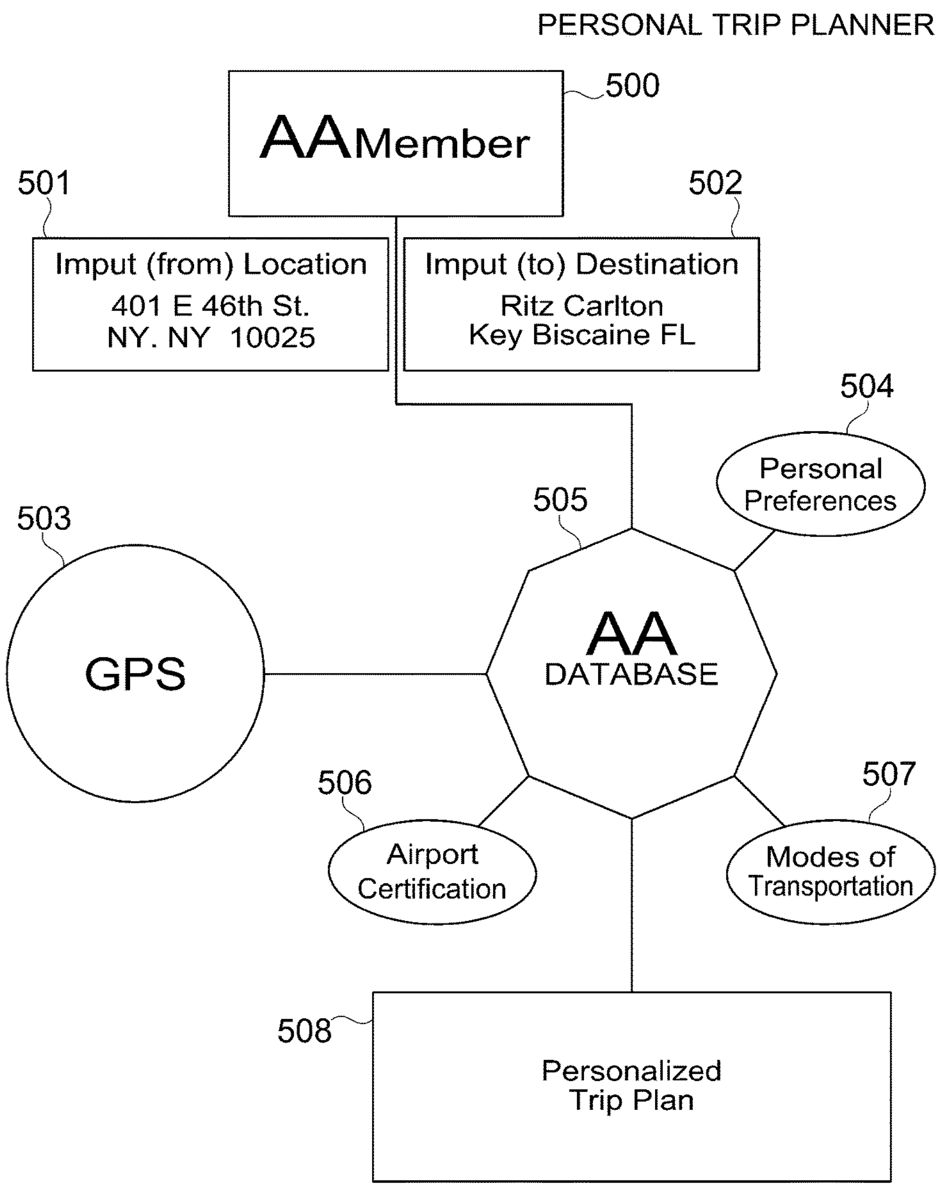
FIG. 31 shows a flow chart of a method to plan a trip for an AA member based on combining information of a geographical positioning system as well as personal preferences and other critera.

The member may know the exact airport that he wants to go but may also just supply the address of the ultimate destination where he wants to go and the origin point. The system provides an additional logistical-planning capability similar but more comprehensive than the sort of functionality provided by a system such as mapquest in that the system considers the best way to navigate the member to the desired destination. The Personal Trip Planner is referenced in FIG. 31. By knowing that the member wants to get to a specific hotel in Key Biscayne, Fla., 502, from an address in mid-town Manhattan, N.Y., 501, and that the member does not generally drive and park at the airport (based on preferences stored in the profile, 504,), the system will utilize the GPS navigation, 503, as well as its understanding of the various modes of transportation in the AA Central Database, 505, to interpret the need and convert that to a suggested trip plan. "From the shortest route perspective (other perspectives may be added later such as inclusion of the member's priority for a higher gradation level airport), suggest LaGuardia Airport in New York (LGA) and fly to Miami (MIA) which is the closest airport to Key Biscayne. A taxi will be waiting for you. Expect to pay $25 which is the standard airport fare from Miami Airport to Key Biscayne", as shown in 508 of FIG. 31. This recommendation is available in text as well as by voice by audio/visual interaction.

AIRPORTVALET4U.COM

Figure 32:
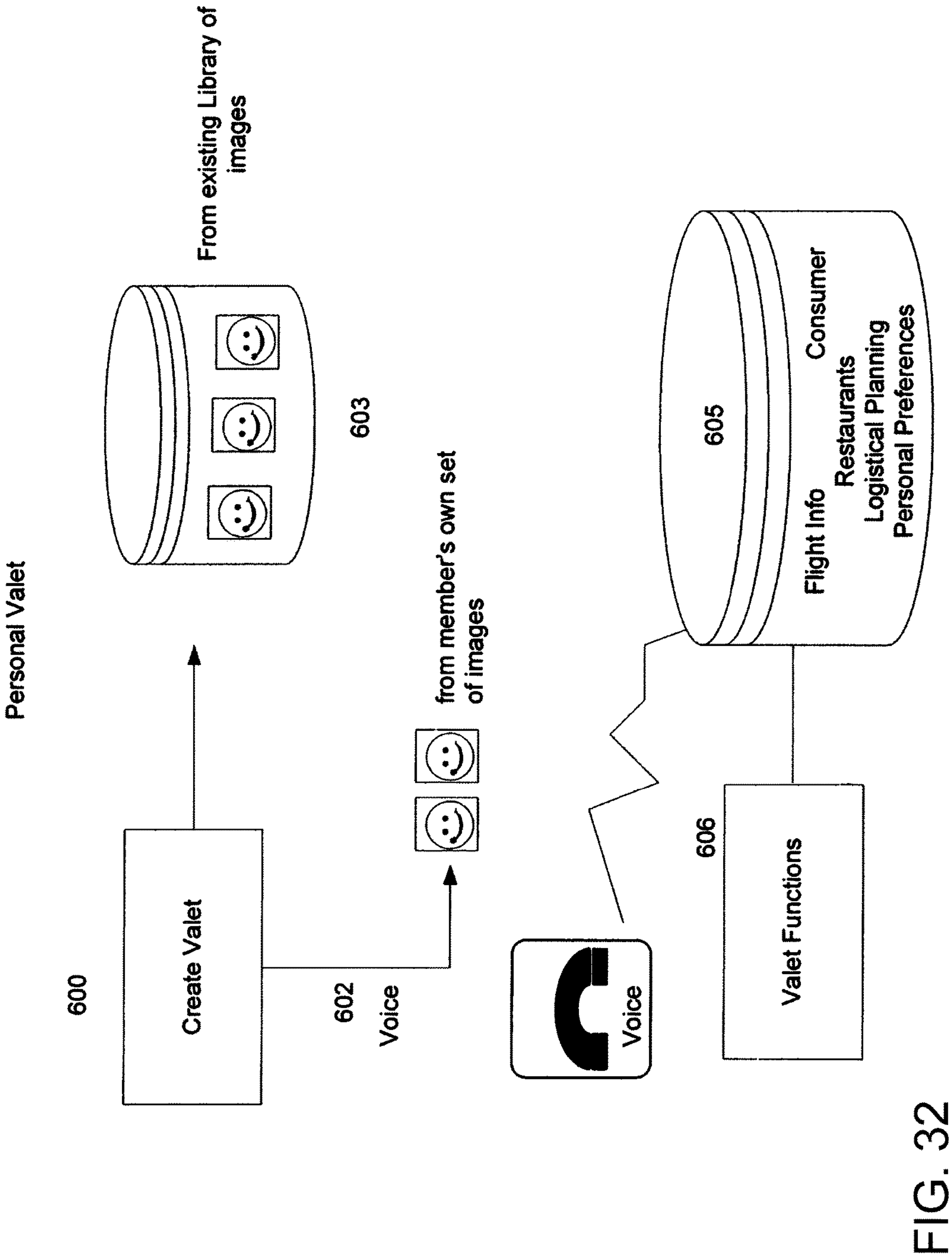
FIG. 32 shows a flow chart of the creation and utilization of a personal valet, an audio/visual assistant to the member that can assist with travel and entertainment suggestions.

In addition to the capability for a member to interact with the OneTouch and all the access points to the AirportAmerica central server, the member may opt to utilize his Airportvalet4u.com (aka valet4u). The Valet4u is a computer generated intelligent interactive personal digital assistant, as shown in FIG. 32.

The member may elect to not have a valet4u, or may elect to have an audio-only valet4u or may elect a complete computer animated digital artificially intelligent valet4u. The AA member begins by creating a personal valet, 600 of FIG. 32.

Prior to construction, the member may give facial and body preferences or select from a library of images in the AA central database, 601, or provide a set of images of a familiar person whose image the member wishes to use as his or her personal valet, 603. Then construction begins of the artificially intelligent valet4u with natural language interactive voice feature and creation of a visual digital image, 600. The digital image involves selecting a valet4u from the many animated characters presented or assembling from various computer generated components including selections of eyes, mouth, chin, forehead, cheeks, bust, torso, arms, legs, etc. and form the digital person with unique features, with assembly as directed by the member. Audio visual sync between the computer animated head selected, face selected, mouth selected and voice selection is achieved through a custom program that synchronizes visual and voice. The construction of the computer animated valet4u is by the member with the aid and assistance of an AA employee. The valet can also be a realistic re-creation of someone selected either living or dead by sending to AA three photographs, front view and both profiles as shown in 603.

The valet4u understands thousands of commands that valet4u has learned from amongst thousands of vocabulary words and phrases assembled corresponding to the various anticipated travel related and conversational commands and the user or member may elect to create an additional database inputting prompts that personalize the valet4u. The database of personal valet information as well as the voice commands that are available for use are stored in the AA central database, as reflected in 605 of FIG. 32.

The present invention is described herein mainly in association with air travel, including pre flight and post flight travel airline travel. However, the invention is not meant to be so limited, and is equally applicable in association with other forms of transportation incorporating the full range of travel options, including multiple other forms of transportation including without limitation, rail travel, ship travel, limousine travel, bus travel. With a database of the member's preferences, places that he wishes to travel, distance and time considerations, origination point and modes of transportation that are available, when prompted, the valet4u suggests alternatives to the traveler from the database built from standard templates provided by AA, the database of preferences and travel patterns downloaded from member user profile and data input from the member user. Suppose, for example, that the traveler's flight from New York to Washington, D.C. was cancelled. In addition to considering other flights, if the traveler has sufficient time, trains or shuttle services may also be offered as options for consideration.

Charter Reservation System

Figure 33:
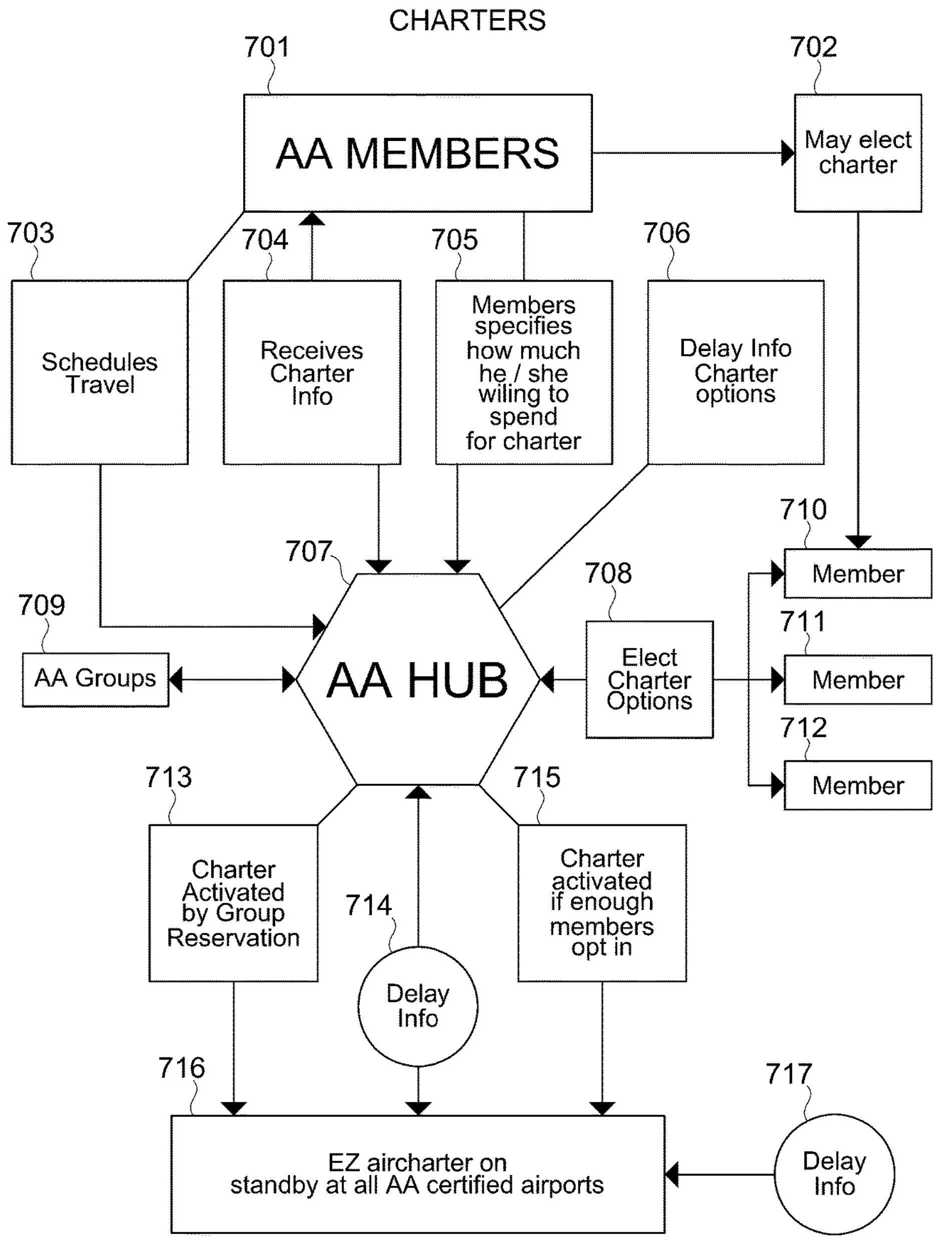
FIGS. 33 and 34 show logical schematics detailing a method for managing charter flight reservations.

Referring to FIG. 33, at step 701, members will be given charter information along with their flight information when scheduling travel. Member users electing the charter option notify AA through the plurality of devices referenced herein. Upon notification, the trip pin of the passenger is reassigned to the charter operator. When member users choose to travel along the same route at or about the same time, 702, the invention sorts and matches the subset of those travelers who are both members and traveling the same route and electronically notifies that subset (706), of the charter availability, rate, charter websites for information, location of the charter facilities and van pick up location to ferry passengers to charter fixed base operation or terminal, if not at the gate of the AA terminal, departure information (step 713 and 715) provided the charter minimum threshold is met, and real time schedule of rates as the number of charter passengers varies. The foregoing and other charter information including without limitation, weather en route and at the flight destination are posted on the charter box on the AA website and in a more limited format on airport terminal monitors. Members may elect to post an amount representing a ceiling that that member user is willing to pay for the leg of the member's travel itinerary through the use of the trip pin, affording anonymity to the member user, 705. The Charter operator may then elect to fly the passengers at a reduced rate if the ceiling of the totality of the subset electing fractional charter rate of potential passengers is less than the AA charter operator's published charter rate (step 715). In either situation, the member is required to agree to pay for the amount in full if a chartered jet is made available at the particular price point.

AA will have Ezaircharter who are AA certified air charter providers on standby at all AA-certified airports. AA will have advanced, real-time knowledge of the commercial inbound aircraft delay through its airport intranet and through that via computer notification of the delay at the airport of origination of the flight (steps 714 and 716). This information once confirmed is transmitted through to AA member OneTouch via beeper activation of blinking red light on iCell/OneTouch (FIG. 27, 243, and FIG. 28, 247) and activation of the ringer on the ringer-beeper pin, PDA, Cell phone, etc., and at the charter office and via AA vendor iCell or OneTouch (FIG. 27, 243) If sufficient numbers respond to make charter from the AA certified charter service within the range of first class ticket or member specified and charter published price, the charter is activated for immediate departure (step 515).

Groups can charter a jet from an AA certified charter service through AA's reservation system (steps 701 and 709 of FIG. 33). Chartering a plane is similar to booking a commercial flight reservation. Instead of pricing being based on the number of travelers and the class of travel, pricing is based on origin and destination according to the AA certified charter company.

Figure 34:
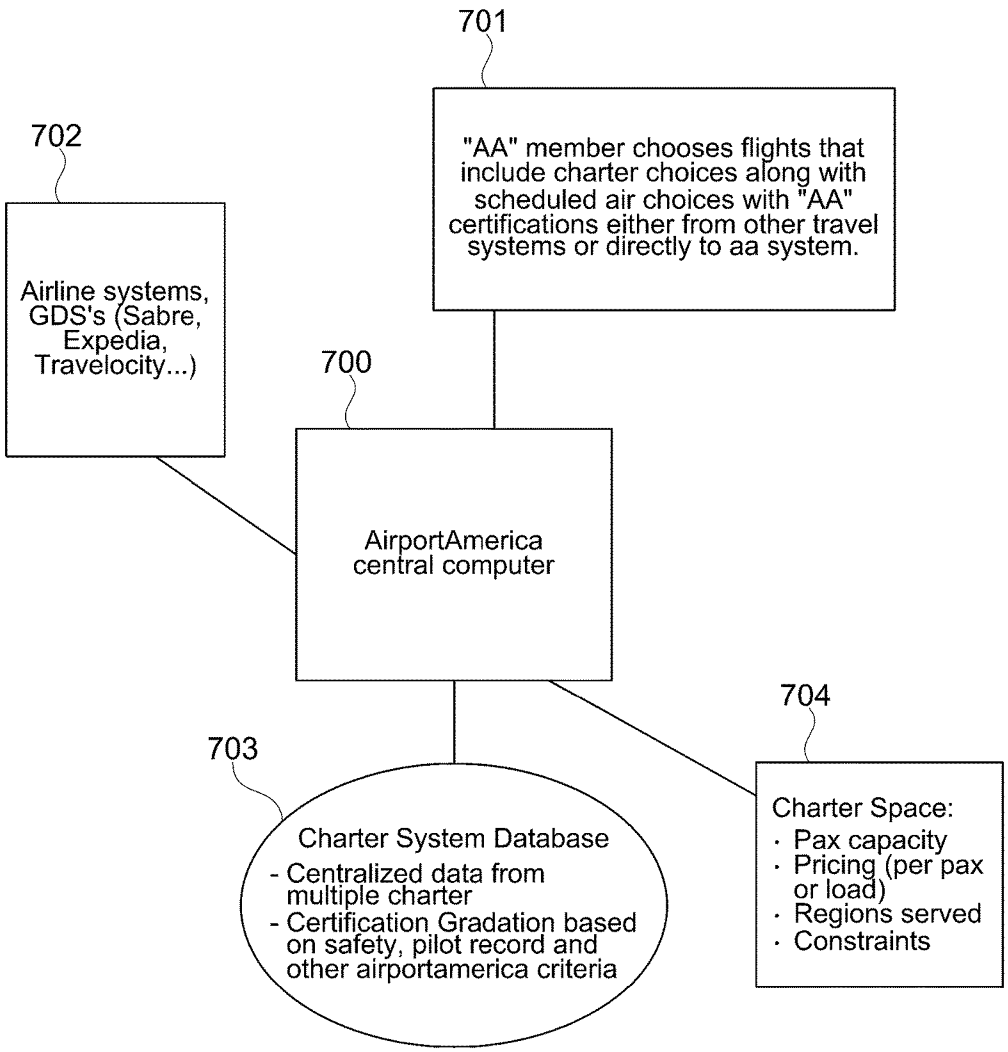

Providing group space (FIG. 33, 709) is another dimension of the AA membership concept. The group space view considers members as a party of multiple individuals. When a party wants to travel, they will be gain access to the AA EZ air charter web site of potential charter seats available, aircraft, etc. or could be made available for the specific date range that the party wishes to travel (FIG. 33 as well as FIG. 34). The main differences between the AA view of potential charter carriers and other charter space options are as follows:

- The AA membership ensures a greater sense of evaluation by utilizing the gradation concept described elsewhere. The grades/levels that are assigned to the charter operators are based on more rigorous criteria and provide a level of comfort to the groups that these charter operators are safe, reliable, and have a reputation worthy of AA acreditation.
- The AA membership ensures a greater access to the charter operators by greatly promoting the service.
- The AA membership can now be extended to traditional consolidators and companies who need blocks of space for certain destinations and dates. Cruise lines and major tour operators can become AAaffiliates to gain additional access to air space for their passengers/guests.

Valet and Other Services

The member can have rent-a-car pickup and return at an AA affiliate valet stand. The valet will have a car ready at a destination airport valet stand when the AA member deplanes in a destination city. The valet gives the member an AA stub. At the end of the trip the AA member may opt to leave the rent a car at the valet stand airportvalet4u.com. All AA affiliated Airport hotels and suites must provide pickup and return of AA member and luggage.

AirportAmerica will maintain a database of its membership and will share data in a manner that does not compromise privacy related to increased or decreased membership with the appropriate airport parking facilities. The data that will be sent will be in terms of numbers of passengers who are possibly going to need parking so that assistance is provided to forecast number of spaces to reserve.

An AA member is also eligible for lottery and AA points toward "freeairtx.com" and "giveutx.com", and can collect visa miles for AA affiliate purchases in addition to the discounts.

A courier delivery service can be used by a member to retrieve needed merchandise from local stores for delivery to a hotel or airport (subcontractors/affiliate)

A member can order a personal valet to directly pick up baggage, and drive the member to an airport from a car rental, cruise, hotel, and assist with check in. Valet service is also available to a member for courier delivery if desired.

As previously indicated, a member can connect to AA semi-official websites of the world's major airports (which are AA owned and controlled domains). AA owns at least one and usually several of the most common domain names of the fifty or more busiest airports in the world, each of which is cross-linked so that reference to any portion of an airport name by an AA member will lead to the web site and to an AA portal through metatags.

AirportAmerica is the portal to domestic and overseas AA owned websites

Members are provided discounts via AA bids to affiliates who provide rent-a-car, hotels, apartments, temporary office suites, restaurants, travel packages thru AA owned websites such as rent4cents.com, ezairportoffice.com, cheapairportoffice.com AA provides Airport Facilities and Operations Information to members via pull-down menus or choice communication for the following (this list may be expanded for airports and additional travel provider facilities such as cruise terminals/ports):

A. Flights
B. Parking
C. Airport Schedules and Guides
D. Travel Planner
Pull ↓ Down
Flight Schedules
Maps
Visitors Guides
E. Airport Guides
Airline Guide
Terminal Guide
Parking Guide
Transportation Guide
F. Air-Charter Services
G. Security
H. Lost and Found
I. Cargo
J. Capital Development
K. Businesses and Business Opportunities
L. Ground Transportation
M. Lodging
N. Airline lounges
O. Conference Center
P. Financial Services—AA sponsored ATM, cash advances on credit cards, travelers checks, money orders, foreign currency exchanges, ATM
Q. Locker Rental
R. Parking
S. Post Office
T. Visitor Info
U. Information translated into passenger's choice of 7 languages
V. Bank
W. Mall Standardization A unique function provided by the AA system is STANDARDIZATION—a complete range of services available in each member airport set out in the AA web site credited to that airport, are linked like spokes of a wagon wheel to the AA hub/portal. The AA portal is the brains. The operations center (OP. Center) is the clearinghouse. The AA OP center continuously updates all information of member airport websites, and maintains and continuously improves the website for the benefit of the airport. When a member logs on to the site the airport gets primary billing at a fraction of the cost of attempting to maintain such a site itself. All services listed are available at all AA airports. The services are accessed in an easy, familiar and consistent manner for each member airport through its AA website. The AA traveling member may thus seamlessly retrieve all the information he needs through standardized websites. This model is followed for other types of travel facilities as well. For example, all car rental agency web sites are standardized for ease of use, familiarity and consistency.

Queries are instantly transmitted to the AA OP Center via interactive computer-Kiosks 11 at the intersections of concourses, and gates and other strategic high traffic areas of the terminal. For example, assume a 1-800-400-1024 connection to AA for cell phone users for Ft Lauderdale (FLT), weather, and other information, reservation, ticketing. Any other areas can be simultaneously connected. Thru affiliate relationships with companies in the cutting edge of wireless technology, I iCell and cell phone access will become the Internet access for mobile links to aa, and all information a member requires while on the run. AA stores the information accessed thru pin numbers or cookies. Printouts of justntimeticketing.com can be obtained by downloading to the 3"×3" wireless printer which can be clipped to the waist or printed while in briefcase, at AA interactive remote-Kiosks 11 located at the intersection of each concourse and terminal and/or out in concourse or local airport information center.

FIGS. 3 through 17 show examples of pull-down menus available to a member for obtaining desired travel information, and making reservations. Other pull-down menus can be configured for expanding the usefulness of the system.

Illustration

An example of an AirportAmerica (aa) member utilizing the present system to make his/her airport, flight and travel experience easier, faster, cheaper and friendlier, will now be given. It is the inventor's understanding that the following combination of unique and non-obvious features provide what no other airport site is currently offering. AA owns at least one .com domain name of every major (top 50) airport in the world and of the largest five or ten AA owns several. For example, Atlanta: Atlantahartsfield.com, atlantainternationalairport.com, atlintlairport.com, Hartsfieldatlantainternationalairport, atlhartsfieldairport.com, atlinternationalairportcom, atlhartsfieldintlairport.com, atlintairport.com are all separate AA owned domain names. They will be separate-web sites, all linked, and all leading to the AA portal. The links are the spokes to the hub, AA is the hub. Each Atl web site or any combination of words for that airport through meta-tags, etc will lead to the standardized Atl website, and then to the AA portal.

Although various embodiments of the invention have been described above, they are not meant to be limiting. For example, those of skill in the art may recognize certain modifications to these embodiments, which modifications are meant to be covered by the spirit, and scope of the appended claims. Such a modification, for example, may be to expand the present method and system, or convert it, to include railroad scheduling, bus scheduling, ship scheduling, and so forth.

What is claimed is:

1. A travel management system for providing system members with access to a travel facility at a travel terminal, the system comprising:

a central memory that stores member profile records of the system members, the central memory being accessible over a communications network, each member profile record including central member identification information of an associated system member, the central member identification information including at least unique identifying information of the profile record and an image of the member;

a central server in communication with the central memory;

a portable access device associated with each member profile record, the portable access device including (i) a central processing unit, (ii) a local memory storing local member identification information duplicative of information in the associated member profile record, including the unique identifying information and the image of the member; and (iii) a display that is able to display at least the locally stored image of the member at the travel terminal; and a security checkpoint at the travel terminal that includes (i) an identification information input device that receives input member identification from a presenting member in possession of the portable access device, (ii) a reader that is configured to access the local member identification information stored in the portable access device, and (ii) a communication device that is configured to communicate with the central server, wherein the travel management system is configured to conduct a three-way match that includes (i) conducting a comparison of the input member identification information with the local member identification information stored in the local memory of the portable access device, (ii) conducting a comparison of the input member identification information and the central member identification information stored in the central memory, and (iii) conducting a comparison of the unique identifying information stored in the local memory of the portable access device and the unique identifying information stored in the central memory, and wherein the central server is configured to transmit a signal to the communication device that is based on a result of the three-way match.

2. The system according to claim 1, wherein, when conducting the three-way match, if there is a match between the input member identification information and the local member identification information, the communication device communicates the input member identification information and the matching local member identification information to the central server, and the central server conducts a comparison of the input member identification information and the matching local member identification information with the central member identification information stored in the central memory.

3. The system according to claim 1, wherein the central member identification information and local member identification information further include biometric information of the system member in addition to the image of the system member, the identification input device includes a biometric reader capable of obtaining biometric information from the presenting member, and the input member identification information includes the obtained biometric information.

4. The system according to claim 1, wherein the portable access device further includes an access control device for receiving biometric information and preventing operation of said portable access device unless said received biometric information matches information of said local member identification information stored in said local memory.

5. The system according to claim 1, wherein the central member identification information and the local member identification information further include an indication of a security threat assessment of the member.

6. The system according to claim 5, wherein each member profile is assigned a gradation level based on a comprehensiveness of the member profile and the security threat assessment.

7. The system according to claim 5, wherein the central member identification information and the local member identification information further include a video image of the member.

8. The system of claim 1, wherein the portable access device includes a removable chip and wherein at least a portion of the local memory is included on the removable chip.

9. The system of claim 1, wherein the local memory includes a portion for personal identification information that is separate from another portion of the local memory that includes the local member identification information.

10. The system of claim 1, wherein the member identification information is encrypted.

* * * * *